(12) United States Patent
Adiletta et al.

(10) Patent No.: US 10,922,148 B2
(45) Date of Patent: Feb. 16, 2021

(54) INTEGRATED ANDROID AND WINDOWS DEVICE

(71) Applicant: Intel Corporation, Santa Clara, CA (US)

(72) Inventors: Matthew J. Adiletta, Bolton, MA (US); Myles Wilde, Charlestown, MA (US); William R. Wheeler, Southborough, MA (US); Michael F. Fallon, Tiverton, RI (US); Aaron Gorius, Upton, MA (US); Amit Kumar, Marlborough, MA (US); Chengda Yang, Auburndale, MA (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 16/091,206

(22) PCT Filed: Apr. 26, 2016

(86) PCT No.: PCT/US2016/029362
§ 371 (c)(1),
(2) Date: Oct. 4, 2018

(87) PCT Pub. No.: WO2016/176206
PCT Pub. Date: Nov. 3, 2016

(65) Prior Publication Data
US 2019/0121682 A1    Apr. 25, 2019

Related U.S. Application Data

(60) Provisional application No. 62/152,932, filed on Apr. 26, 2015.

(51) Int. Cl.
*G06F 9/54*    (2006.01)
*G06F 9/451*    (2018.01)
(Continued)

(52) U.S. Cl.
CPC .............. *G06F 9/541* (2013.01); *G06F 9/445* (2013.01); *G06F 9/452* (2018.02); *G06F 9/48* (2013.01);
(Continued)

(58) Field of Classification Search
None
See application file for complete search history.

(56) References Cited

U.S. PATENT DOCUMENTS

2005/0027543 A1\*  2/2005  Labrou ................. G06Q 20/02
                                                                705/26.35
2008/0046678 A1\*  2/2008  Takahashi ........... G06F 11/2284
                                                                711/204

(Continued)

*Primary Examiner* — Craig C Dorais
(74) *Attorney, Agent, or Firm* — Law Office of R. Alan Burnett, P.S

(57) ABSTRACT

Techniques for implementing assess to Android applications and native Window application on Android devices and systems. A processor board includes a processor that is configured to run a full version of a Windows operating system and Windows applications. The processor board is configured to be communicatively coupled to the processor board in an Android device, such as a Smartphone or tablet. Upon operations and when the processor board is communicatively coupled to the Android device, a user of the Android device is enabled to selectively run Android applications and Windows applications, with the Windows applications being executed natively on the processor board. The processor board may be implemented in a computing card that is approximately the size of a credit card or smaller, which in turn may be coupled to the Android device via a backpack or similar means. The processor board may also be disposed within the same housing as the Android device.

25 Claims, 39 Drawing Sheets

(51) Int. Cl.
  *G06F 9/445* (2018.01)
  *G06F 13/12* (2006.01)
  *G06F 13/38* (2006.01)
  *G06F 9/48* (2006.01)
  *G06F 13/362* (2006.01)
  *G06F 13/42* (2006.01)

(52) U.S. Cl.
  CPC ............ *G06F 13/12* (2013.01); *G06F 13/362* (2013.01); *G06F 13/38* (2013.01); *G06F 13/4282* (2013.01); *G06F 2213/0042* (2013.01)

(56) References Cited

U.S. PATENT DOCUMENTS

2013/0136125 A1\* 5/2013 Jain .................. H04L 67/08
 370/392
2014/0223490 A1\* 8/2014 Pan ................ H04N 21/42224
 725/61
2016/0294918 A1\* 10/2016 Walline ................ G06F 21/606
2017/0031697 A1\* 2/2017 Lee .................... G06F 9/45545

\* cited by examiner

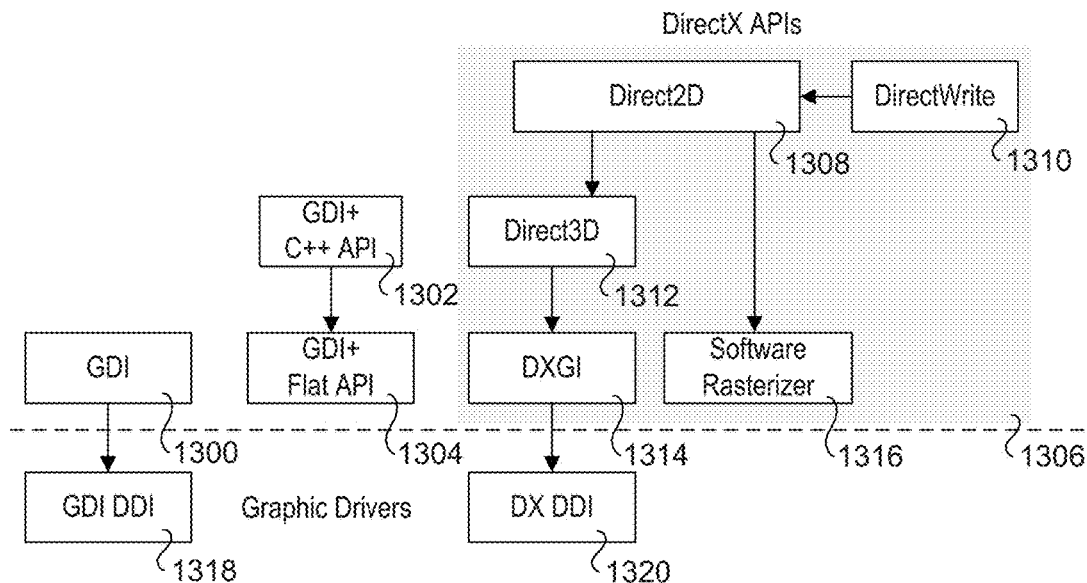
Fig. 13 *(prior art)*
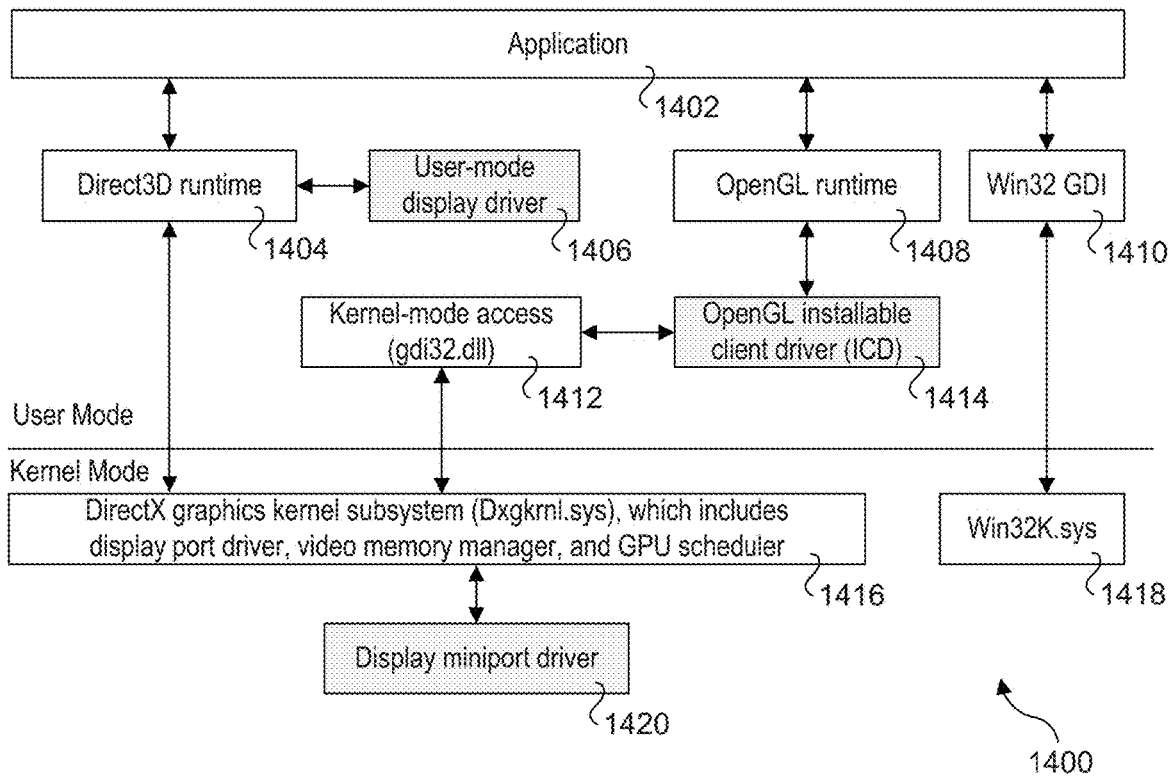
Fig. 14 *(prior art)*

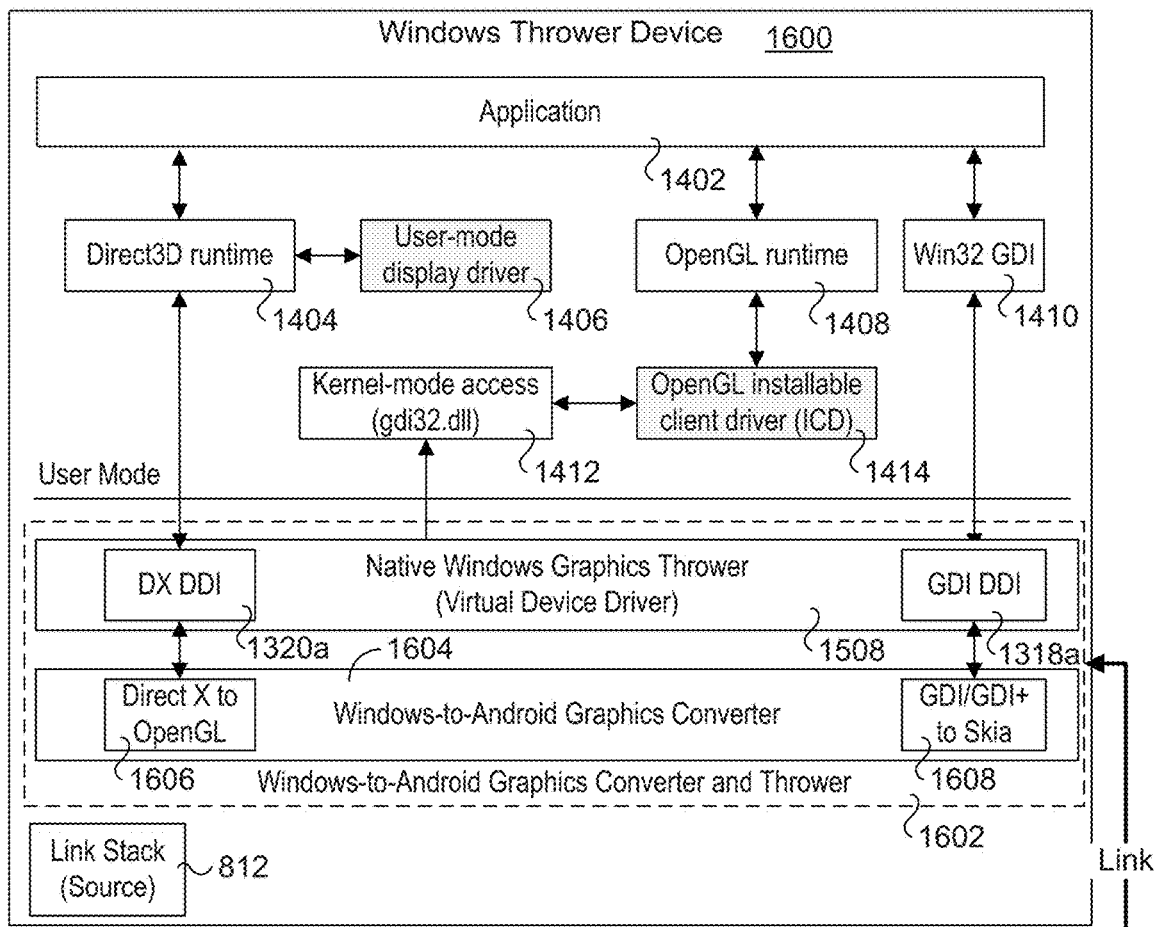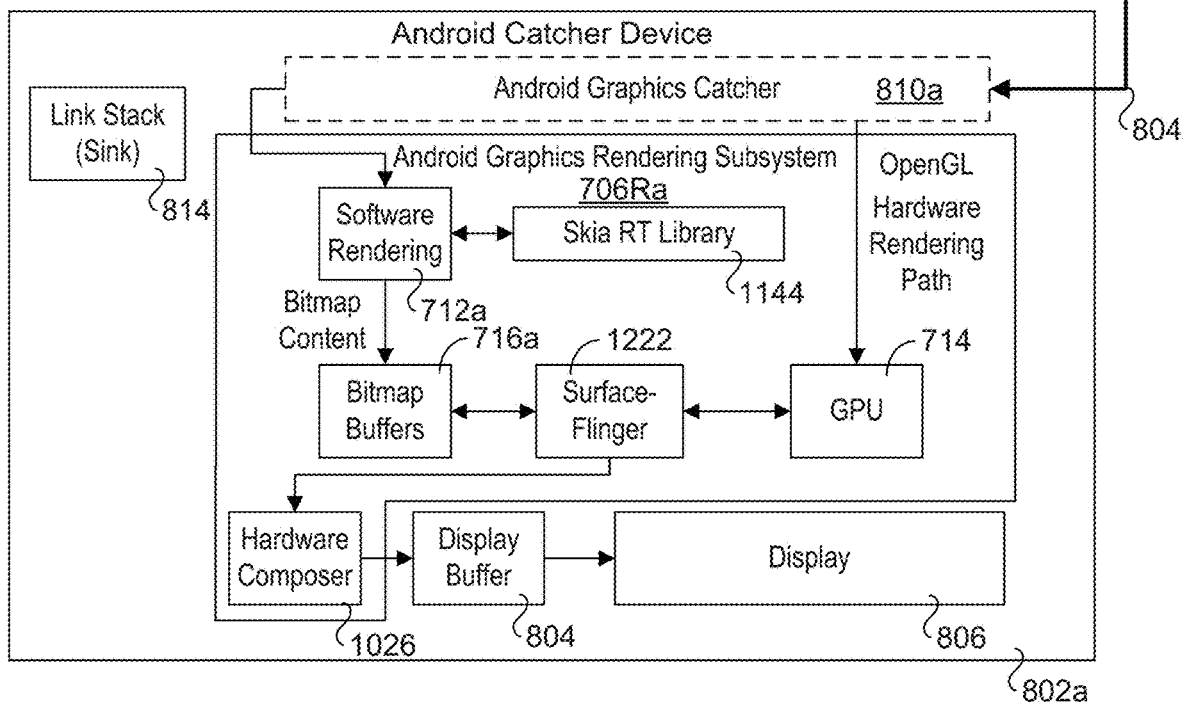
Fig. 16

INTEGRATED ANDROID AND WINDOWS DEVICE

CROSS-REFERENCE TO RELATED APPLICATION

This patent application is a U.S. National Phase Application under 35 U.S.C. Section 371 of International Application No. PCT/US16/29362, filed on Apr. 26, 2016, entitled "INTEGRATED ANDROID AND WINDOWS DEVICE" which claims benefit of provisional 62/152,932, filed on Apr. 26, 2015, which is hereby incorporated herein by reference in its entirety and for all purposes.

BACKGROUND INFORMATION

In today's ever-connected society, it is common for users to have several devices that are used for specialized purposes. For example, users typically have a smartphone for voice and electronic communication and entertainment (as well as other purposes), at least one desktop, laptop, notebook or similar type of computer for work and/or personal tasks, and may further have a tablet, netbook, or Chromebook that is used (generally) for accessing the Internet, watching videos, etc. Each of these devices provide means for connecting to the Internet and accessing data from various sources and repositories.

Software and device manufacturers have been targeting universal platforms and seamless environments, but so far have come woefully short in reaching their objectives. For example, Microsoft has been pushing for a unified platform around Windows 8 (and soon to be Windows 10) under which various classes of devices (desktop/laptop, smartphone, and tablet) share a similar user interface (UI) and provide a similar user experience (UX). The Windows 8 paradigm of using a tile-based UI that is inherently designed for use with touch-based user input has not been well-received by the business community, which is entrenched with using Microsoft productivity software applications and networking services. In particular, UI functionality, such as the start menu used in Windows 7, was stripped out of Windows 8, but added back in (with some limitations) in Windows 8.1 after a huge level of user complaints. Worse yet, for Microsoft, is the market share for Windows Phones is hovering around 2-3% in the United States, with slightly higher penetration in other markets. Microsoft's Surface tablets have a similar irrelevant market share. In view of the dominance of Android and Apple's iOS devices in the smartphone and tablet markets, it is very unlikely Microsoft will ever gain much traction in these markets. Conversely, it is likely Microsoft will continue to dominate in the business and consumer software and operating system markets.

Another aspect that is being addressed by various companies is universal access to data. This is typically facilitated via "cloud"-based data facilities, such as provided by Google (e.g., Google Docs and Google Drive), Microsoft (Office 365 and SkyDrive), Apple (iCloud), Dropbox, and others. On one hand, cloud-based data facilities provide some level of universal access to at least some user data. However, this is not without problems. Notably, you need to have access to the Internet-hosted facilities just to access the data; no Internet access means no data access. In addition, there are issues with network latencies and security concerns. While Microsoft emphasizes Office 365's ability to access documents from multiple devices, from an actual usage standpoint it is primarily being used as a subscription service for accessing Microsoft Office's productivity applications on a single device using local storage of application document data rather than using cloud-storage of the documents produced and accessed by the applications.

In addition to the foregoing, users generally prefer to have data accessed directly from their devices, a usage model under which the user has more control over their own data. First, this is what users have grown accustom to over the years, and the thought of relying on someone else to protect their data is a bit unsettling. Second, the real-time interaction provided by cloud-based applications, such as Google Docs, is less than optimal, even with a fast network connection. While Google has done a great job of implementing productivity application functionality via web pages (a daunting technical task), there is nothing like using an application running directly on your device.

Having data stored on users' devices has its own drawbacks. First, data may be stored on a different device that is currently not available to the user (e.g., left at home or at work). Second, it is very common to replicate the same data across multiple devices, wasting storage resources. For example, it is very common for iPhone and iPad users to replicate photos and videos across multiple devices, such as having the same photos on an iPhone/iPad and in iPhoto on an Apple Mac computer. While Apple has attempted to address this through the use of its iCloud service, they amount of storage space occupied by the photos in videos typically exceed the amount of iCloud storage offered per user for free, and users are reluctant to pay for the extra storage. Thus, every synching or backup operation just results in further replication of data.

To a large degree, usage models in the foreseeable future will reflect those in the recent past. A typical user will still use his or her Android or iPhone mobile phone for purposes those devices excel in, while using a desktop or laptop computer (often hooked to a second display) for productivity tasks, and possibly using other devices (tablets, netbooks, etc.) for leisure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 13 is a block diagram illustrating Windows graphics APIs and display driver interfaces;

FIG. 14 is a block diagram illustrating Windows software components for facilitating Windows rendering operations;

FIG. 16 is a block schematic diagram illustrating an embodiment of a Windows graphics thrower-Android graphics catcher architecture under which native Windows graphics commands and content are converted to native Android graphics commands and content on the Windows thrower device;

DETAILED DESCRIPTION

Figure 1:
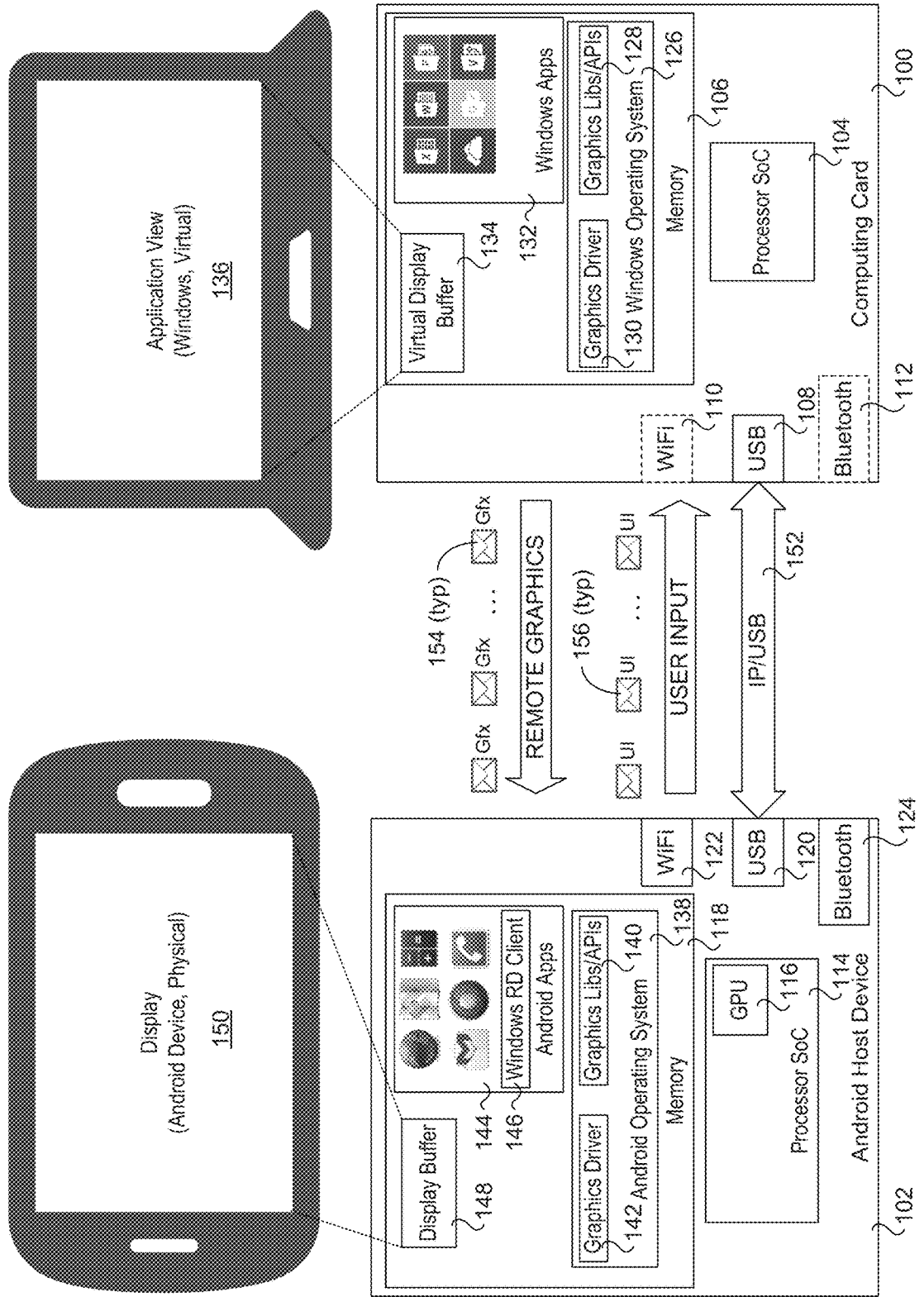
FIG. 1 is a schematic diagram illustrating an embodiment of an architecture for an integrated Android and Windows device that is capable of running both Android and Windows applications.

Embodiments of integrated Android and Windows apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The terms, "communications network," and "communications networks" are interchangeably used herein to refer to one or more systems and/or methods for sending and/or receiving a data signal. These terms encompass short range communication and long range communication. The term, "short range communication" is used herein to refer to systems and methods for wirelessly sending/receiving data signals between devices that are relatively close to one another. Short range communication includes, for example, communication between devices using a BLUETOOTH® network, a personal area network (PAN), near field communication (NFC), radio frequency identification (RFID), ZigBee networks, an INTEL® Wireless Display (WiDi) connection, an INTEL® WiGig (wireless with gigabit capability) connection, millimeter wave communication, ultra-high frequency (UHF) communication, combinations thereof, and the like. Short range communication may therefore be understood as enabling direct communication between devices, without the need for intervening hardware/systems such as routers, cell towers, internet service providers, and the like.

As used in any embodiment herein, the term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are stored in nonvolatile memory devices, including devices that may be updated (e.g., flash memory). "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a client device or an authentication device.

For the sake of clarity and ease of understanding, the present disclosure often describes mobile computing devices and screens as including one or more modules stored in a memory, wherein the module(s) include(s) computer readable instructions which when executed by a processor of the pertinent device (mobile computing device or screen), cause the device to perform various operations. It should be understood that such descriptions are exemplary, and that mobile computing devices and screens may be configured to perform operations described in association with one or more modules in another manner. By way of example, the mobile computing devices and screens described herein may include logic that is implemented at least in part in hardware to cause the performance of one or more operations consistent with the present disclosure, such as those described in association with various modules identified herein. In this regard, it is noted that "logic" as used herein may include discrete and/or analog circuitry, including for example, a general-purpose processor, digital signal processor (DSP), system on chip (SoC), state machine circuitry, hardwired circuit elements, application specific integrated circuits, combinations thereof, and the like.

The use of mobile devices such as cellular phones, smart phones, tablet personal computers, and laptop personal computers has increased dramatically. In view of the widespread adoption of these mobile technologies, microprocessor developers are increasingly focusing on the development of processors that exhibit both high performance and low power consumption. One goal of such development is to increase processing capability, while maintaining or even increasing battery life of the underlying device. In some instances, it has been demonstrated that shrinking the size of processor components can improve processor performance while simultaneously reducing power consumption. In the coming years, it is expected that manufacturing techniques will have enabled the production of processors with "desktop-like" computing performance as well as power consumption that is low enough to be used in a mobile device.

In recent years consumer demand has trended towards mobile devices that have large integral displays but which are thin enough to fit in a pocket or a small bag. Improved manufacturing techniques have allowed device manufacturers to increasingly miniaturize the driving electronics of such devices. Although this has enabled the production of increasingly thin devices, the length and width dimensions of current mobile devices is often constrained by the requirement of an integral display. While further miniaturization of the driving electronics may enable further reductions in device thickness, the length and width of a mobile device may be dictated by the corresponding dimensions of an integral display. This may limit the degree to which a mobile device may be miniaturized as a whole.

As discussed above, it is common today for users to have multiple devices, each having their own applications and data. While some types of data are relatively portable across platforms (e.g., images stored in standard formats such as JPEG and PNG), others are not (e.g., documents produced by productivity applications such as Microsoft Office products). Adding to the mix is use of personal devices in enterprise environments, often referred to as BYOD (Bring Your Own Device). This creates a massive challenge for IT (information technology) managers, as there are more types of devices and data to manage, increasing personnel costs. One approach was to simply not permit employees to use their own devices for business purposes. However, BYOD is here to stay, as employees in many industries and technologies expect to be able to use their own familiar devices, and often will not consider working for companies that do not permit use of the users' personal devices.

One of the challenges is separately managing corporate data and personal data on the same device. Operating systems do no provide inherent facilities for doing this, and application-level approaches have generally been dismal failures. In some enterprise environments, certain types of data and documents may not be permitted to be stored on personal devices (and in some cases, not even be permitted to be stored on computers provided by the companies themselves). While some device manufacturers, such as BlackBerry, have attempted to implement "dual personality" devices that separate corporate data from personal data, there has been little penetration of such devices in enterprise environments.

Another personal and enterprise usage consideration is use of cloud-based resources, both for archiving data and for facilitating active workspaces. Oftentimes, personal users may use cloud-based archiving facilities as a security blanket, when they remember to do so, that is. Cloud-based archiving facilities are also distrusted, by individual users and enterprises alike. How secure is their data? Oftentimes, uses opt for the free storage limit, which is either insufficient to meet their needs (how many users only have 5 GB of data on their devices) or too difficult to implement in a convenient manner (most users do not store their data in only a single or a few folders). Anyone who has a device that syncs will recognize that the same data end up being propagated across multiple devices.

Data organization is also a challenge for many users. How can users easily segregate personal data from business data, not only on a single device but across all devices they may use? Need to locate a particular file . . . that was created many months ago? How about a set of files that may contain related data on one level for a certain purpose, but otherwise may be unrelated for other purposes such that it would not make logical sense to store such files together. While search tools such as Apple OS X's spotlight are nice, they typically return either an over-inclusive or under-inclusive list of results, generally in a flattened format.

Many people use a Smartphone for activities such as making phone calls, sending messages, browsing the web, listening to music, taking photos, etc. These same people may also have one or more computers running a version of Microsoft Windows, and are familiar and comfortable with using certain Windows applications, such as Microsoft Office applications, as well as many applications that only run on Windows. Microsoft's attempt to capitalize on its dominance in the desktop and enterprise application market has been an abject failure by most measures, and Microsoft even entirely designed its user interface for Windows 8 to be close to that used by Windows Phone 7 and 8 to attempt get more users migrated to Windows Phone, but without success.

Recently, Microsoft has marketed its third generation Surface 3 tablet as a better device than an Apple Airbook, since it can both be operated in a manner similar to a conventional laptop when a keyboard is attached, and operated as a touchscreen tablet when the keyboard is unattached. However, the Surface 3 is still is limited to Microsoft Windows applications and has the form factor of a tablet.

The most dominant operating systems in the mobile phone and tablet space is Google's Android. Since its introduction in 2008. Android has made great advances, and is the favored mobile operating system of many users. In addition, there are literally hundreds of thousands of Android applications available from Google's PlayStore. However, the Android platform does not support running native Windows applications, nor does it support implementation of a virtual machine that might be used to run native Windows applications.

In accordance with aspects of the embodiments disclosed herein, an integrated device that supports native Android applications running on Android hardware and native Microsoft Windows applications running on INTEL® x86 hardware is provided. In one aspect, this is facilitated through the use of a "computing card" that may be either embedded within an Android device's housing, or it may be embedded within or coupled within a slot in a "backpack" to which the Android device is coupled via a built-in micro USB connector.

FIG. 1 shows an exemplary implementation of a computing card 100 and an Android host device 102. Computing card 100 includes a processor SoC 104 to which memory 106 and a USB interface 108 are operatively coupled. Depending on it intended implementation(s), computing card 100 may include zero or more wireless communication (WCOMM) interfaces, such as depicted by a Wi-Fi (IEEE 802.11) interface 110 and a BLUETOOTH® interface 112.

Android host device 102 is generally representative of various types of devices that use an Android operating system. Such devices include, but are not limited to, mobile phones, tablets, netbooks (e.g., Chromebooks), and wearable devices such as Google Glass and Android watches. For illustrative purposes Android host device is depicted as including a processor SoC 114 including a GPU 116 that is operatively coupled to memory 118, a USB interface 120, a Wi-Fi interface 122, and a BLUETOOTH® interface 124. An Android host device may further include other wireless communication interfaces, such as a mobile radio communication system (e.g., an LTE mobile radio communication system). Although GPU 116 is depicted as part of processor SoC 114, in some implementations the GPU and processor SoC may comprise separate components.

Generally, the various input/output (I/O) interfaces, such a wireless communication interfaces, shown in some of the Figures herein may be depicted as being separate components. As will be discussed in further detail below, these I/O interfaces may be implemented in a processor SoC, in which case the separately-shown I/O interfaces represent a port, a connector, or antenna.

In the embodiment illustrated of FIG. 1, computing card is configured to implement a Microsoft Windows operating system. The Windows operating system may generally include any current or future Windows operating systems, such as Windows 8.1 or (to be released in 2015) Windows 10. Moreover, the Microsoft Windows operating systems are full operating system originally designed for use on desktop computers, laptop computers, selected tables, and the like.

In further detail, selected components of a Windows operating system 126 are depicted as being loaded into memory 106, including graphics libraries and APIs (Application Program Interfaces) 128 and a graphics driver 130. Also depicted in memory 106 are icons for multiple Windows applications 132 and a virtual display buffer 134 that is used to layout and render a virtual Windows GUI (graphical user interface) 136. Windows applications 132 run in "user" space, while the term "kernel" may be used herein in the context of operating system components that are conventionally considered to be implemented in an operating system kernel, noting that under some architecture views, drivers and libraries may be considered to be in separate operating system layers that are outside of the OS kernel, or may be implemented in user space.

Android host device 102 runs an Android operating system 138 that is depicted as being loaded into memory 118 and including graphics libraries and APIs 140 and a graphics driver 142. Multiple Android applications 144 including a Windows Remote Desktop (RD) client 146 are also depicted as loaded in memory 118, as well as a display buffer 148 which is used to store pixel bitmap content that is displayed on a physical display 150 of Android host device 102.

Under one use scenario, computing card 100 is coupled in communication with Android host device 102 via one of a USB cable, a USB dock, or a USB plug-in (e.g., computing card 100 has a male USB interface connector similar to a USB flash drive), thereby forming a physical USB link. In one embodiment, the USB link is implemented as an IP over USB (IP/USB) link 152.

In one embodiment, a user is enabled to view and interact with Windows applications 132 that are running on computing card 100, while being displayed on Android host device 102's display 150. This is facilitated by "throwing" graphics content remotely from computing card 100 to Android host device 102 via IP/USB link 152, as depicted by a stream of graphics (Gfx) packets 154. User inputs provided to Android host device 102 (e.g., via touchscreen inputs) are converted to Windows inputs and provide to Windows operating system 126, as depicted by a stream of user input (UI) packets 156.

Figure 2:
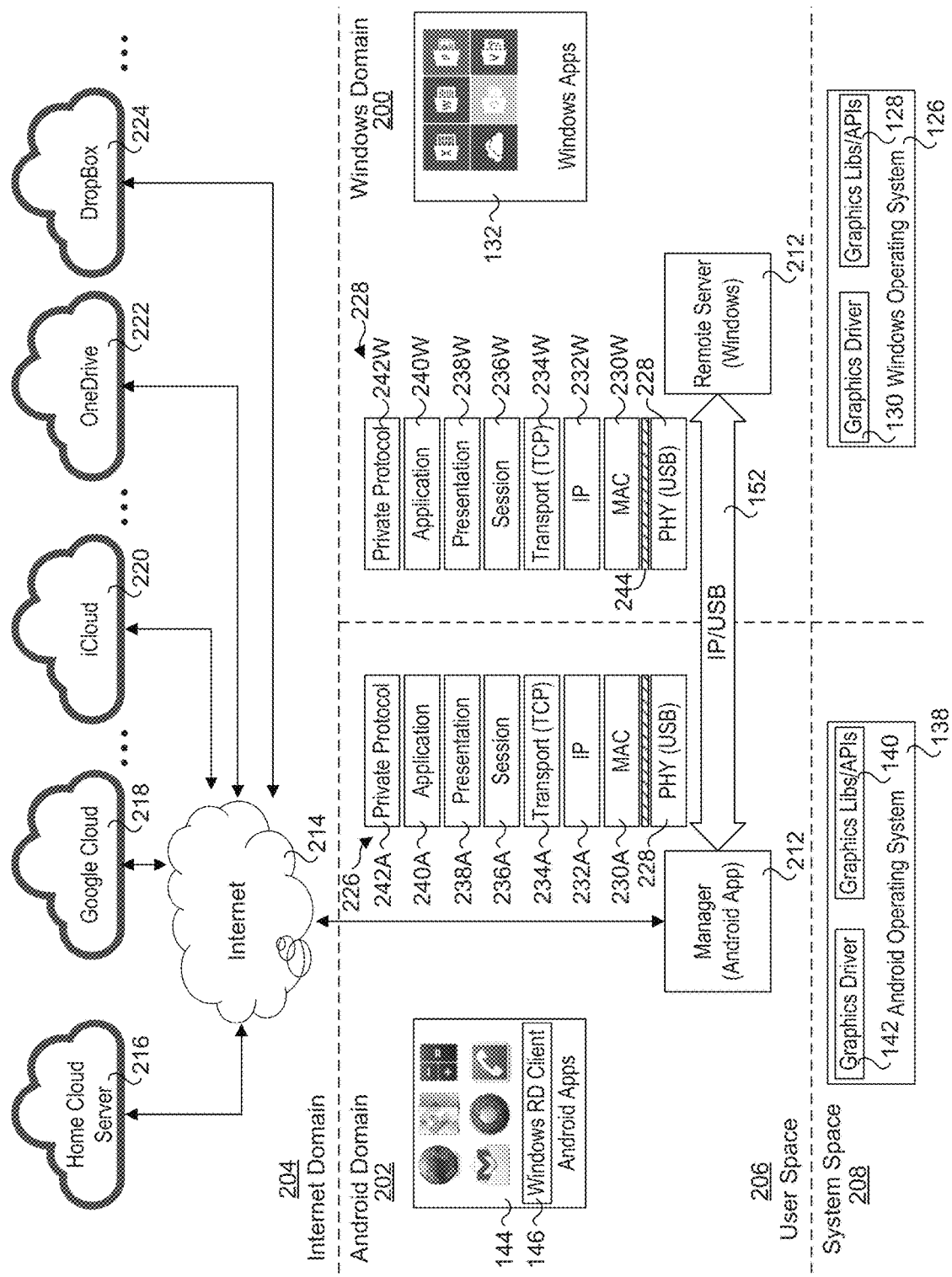
FIG. 2 is a schematic diagram of a software architecture that is implemented to facilitate use scenarios employing a computing card running a Windows OS and an Android host device.

FIG. 2 depicts selected aspects of a software architecture that is implemented to facilitate use scenarios employing a computing card running a Windows OS and an Android host device. The software architecture includes a Windows domain 200, an Android domain 202, and an Internet domain 204. Each of the Windows domain 200 and Android domain 202 are further divided into a user space 206 and a system space 208.

Windows domain 200 includes a remote server 210 that communicates with a manager 212 in Android domain 202. In the embodiment illustrated in FIG. 2, communication between remote server 210 and manager 212 is facilitated via IP/USB link 152. Alternatively, remote server 210 and manager 212 may communicate using one of the various wireless communication links described and illustrated herein.

In addition to communicating with remote server 210, manager 212 is also depicted as being able to access various Internet resources via connections facilitated by Internet 214. The exemplary Internet resources are depicted in FIG. 2 as clouds and include a home cloud server 216, Google Cloud Service 218, Apple iCloud services 220, Microsoft OneDrive services, and DropBox services 224. Under various usages, manager 212 may be used to access Internet resources for applications and services running in Android domain 202, or may operate as a gateway for enabling applications and services running in Windows domain 200 to access Internet domain 204.

For simplicity and convenience, IP/USB link 152 is shown as a direct link between remote server 210 and manager 212. However, as described and illustrated herein, an IP/USB communications link may be a logical link comprising one or more physical USB links.

In one embodiment, implementation of an IP communication link over one or more physical USB links is facilitated through existing networking software stacks in combination with built-in USB hardware interfaces. This is depicted in FIG. 2 as network stacks 226 and 228. Layer 1 comprises a USB Physical layer (PHY) 228, which is configured as a conventional USB connection using well-known standardized techniques. Generally, USB PHY 228 may corresponding to any existing and future USB link, such as a USB2.0 or USB3.0 link. The software-based networking layers in Android domain 202 include a Media Access Channel (MAC) layer 230A, an IP layer 232A, a transport layer 234A, a session layer 236A, a presentation layer 238A, and application layer 240A and a private protocol layer 242A. The software-based networking layers in Windows domain 200 include a MAC layer 230W, an IP layer 232W, a transport layer 234W, a session layer 236W, a presentation layer 238W, and application layer 240W and a private protocol layer 242W.

In one embodiment, the MAC, IP, transport, session, presentation, and application layers employ existing networking software components provided by an Android and Windows operating systems, and are implemented using well-known techniques. For example, in the context of Internet access, the IP layer employs IPv4 or IPv6 addresses, the transport layer implements one or more of the TCP and UDP protocols, the session layer is used for IP sockets, the presentation layer is used for encryption, and the application layer is used for HTTP (the Hypertext Transport Protocol). In one embodiment, the MAC layer is implemented as an Ethernet MAC layer, and from the layers above the MAC layer, the PHY layer appears to be an Ethernet link. In one embodiment, this is facilitated via USB PHY 228. Under an optional configuration, a "shim" 244 is implemented between USB PHY 228 and the MAC layer software components, wherein the shim exposes an Ethernet PHY interface to the MAC layer. As a result, the existing Android and Windows networking software components may be implemented with either no modification or with minimal changes.

Private protocol layers 242A and 242W are used to provide additional functionality, such as security measures and application functionality. Aspects of the private protocol may be considered as being implemented at one or more of the session, presentation, application layer or user/application layer.

Figure 3:
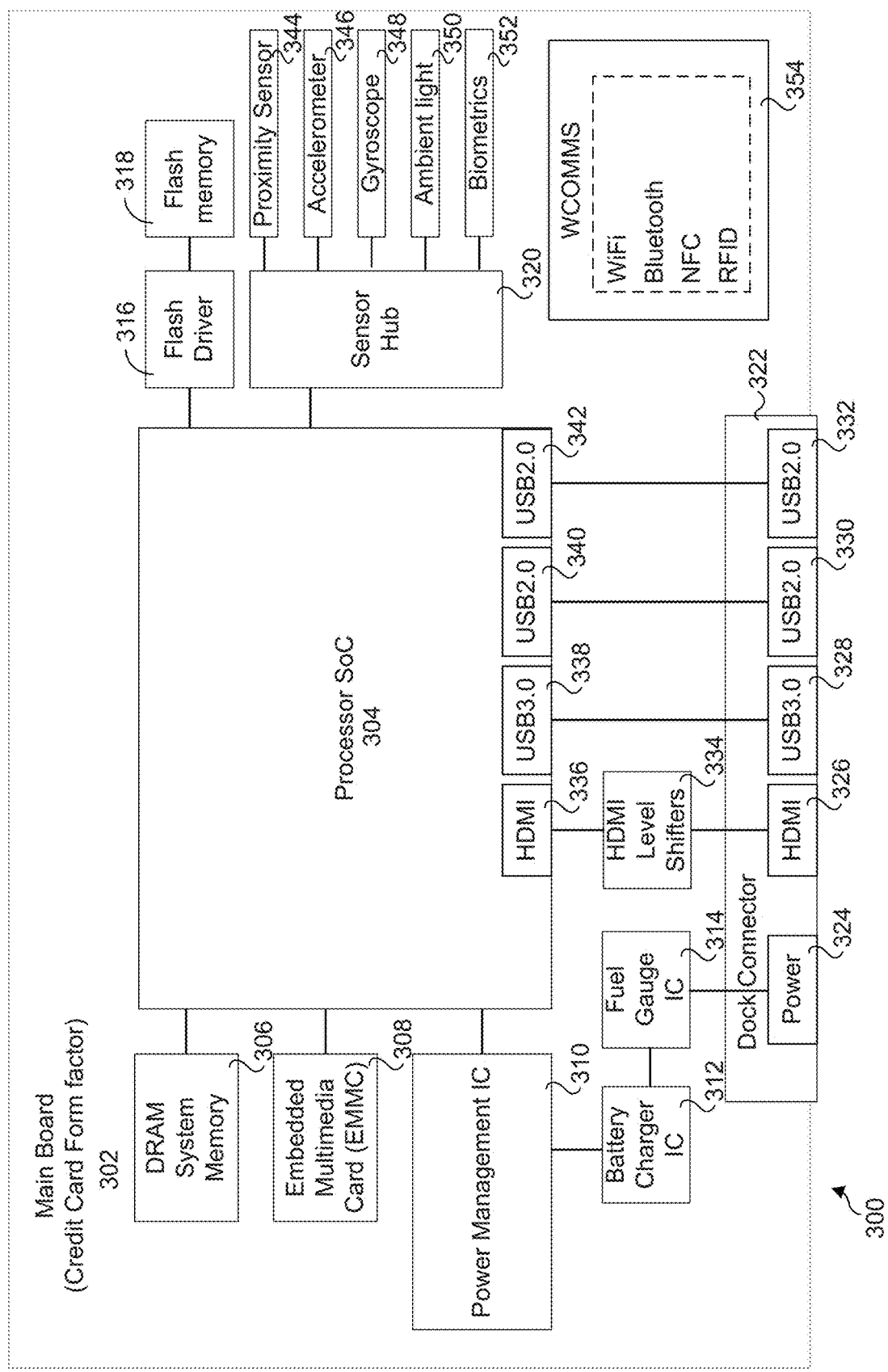
FIG. 3 is a block schematic diagram illustrating functional blocks for a computing card, according to one embodiment.

FIG. 3 shows selected components of a computing card 300, according to one embodiment. Computing card 300 includes a processor board on which various components are mounted and which includes interconnect wiring (not shown) to couple the components. The selected components include a Processor SoC 304, system memory 306, and Embedded Multimedia Card (EMMC) 308, a power management integrated circuit (IC, aka "chip") 310, a battery charger IC 312, a fuel gauge IC 314, a flash driver 316, flash memory 318, a sensor hub 320. A dock connector 322 is also coupled to an edge of processor board 302 that facilitates connection of multiple I/O signals to external components via applicable cables having mating connectors (or using a mating connector mounted to an external component) (both not shown). Dock connector 322 is depicted as including a power connector 324, and HDMI connector 326, a USB3.0 connector 330, and a pair of USB2.0 connectors 330 and 332. Power connector 324 is coupled to Fuel gauge IC 324, while HDMI connector is coupled to HDMI level shifters 334, which in turn is coupled to an HDMI interface 336 on processor SoC 304. Processor SoC 304 further is depicted as including a USB3.0 interface 338, and USB2.0 interfaces 340 and 342, which are respectively coupled to USB3.0 connector 328, USB2.0 connector 330, and USB2.0 connector 332. In addition to these interfaces depicted in FIG. 3, processor SoC 304 includes further interfaces that are not shown to avoid clutter but are discussed below in connection with exemplary processor SoCs shown in FIGS. 5 and 6.

Generally, processor 304 may be any processor configured to support the functionality of a particular implementation or set of implementations, as described herein. For example, processor 304 may be a single or multi-core processor, a general purpose processor, an application specific integrated circuit, combinations thereof, and the like. Without limitation, processor 304 is preferably one or more processors offered for sale by INTEL® Corporation, NVIDIA®, ARM®, Advanced Micro Devices (AMD®), SAMSUNG®, APPLE® or QUALCOMM®. Non-limiting examples of suitable processors include the ATOM®, Nehalem, Ivy Bridge, and Sandy Bridge lines of processors sold by INTEL®.

Generally, the connectors on dock connector 322 may comprise individual physical connectors, or multiple connectors may share a physical connector. For example, in one embodiment, dock connector 322 includes a micro-USB physical connector that is configured to support a power and I/O single interface for power connector 324, and one or more of USB3.0 connector 328, USB2.0 connector 330, and USB2.0 connector 332. The micro-USB connector may also be configured to support an HDMI signal interface that employs an MHL link (Mobile High-Definition Link).

Sensor hub 320 functions as an I/O interface for coupling various sensor data to processor SoC 302. In the illustrated embodiment, these include a proximity sensor 344, an accelerometer 346, a gyroscope sensor 348, an ambient light sensor 350, and a biometrics sensor 352.

System memory 306 preferably comprises some type of Dynamic Random Access Memory (DRAM), such as, but not limited to DDR2 or DDR2 DRAM. Flash memory 318 is illustrative of various types of non-volatile memory, and may generally include, for example, NAND or NOR type memory structures. Additionally or alternatively, one or both of system memory 306 and flash memory 318 may include other and/or later-developed types of computer-readable memory. System memory 306 may be integral with processor 304, separate from processor 304, or a combination thereof. As discussed below, flash memory 318 may store one or more modules that include computer readable instructions that when executed by processor 304 may cause a device in which computing card 300 is implemented to perform functions consistent with the present disclosure.

Depending on the particular implementation, computing card 300 may include one or more wireless communication means, as depicted by WCOMMS 354. WCOMMS 354 may include hardware (e.g., circuitry), software, or a combination of hardware and software that allows computing card 300 to send and receive signals over one or more wireless communications networks and/or via peer-to-peer communication. For example, WCOMMS 204 may include one or more antennas, transmitters, receivers, transceivers, transponders, network interface communications circuitry, and combinations thereof that enable computing card 300 to send and receive signals via one or more wireless communications protocols. Examples of such wireless communication protocols include IEEE 802.11-based protocols (aka, Wi-Fi), and BLUETOOTH® near field communication. In addition, computing card 300 may be configured to employ radio frequency identification (RFID) for authentication and related purposes, as described below.

Figure 4:
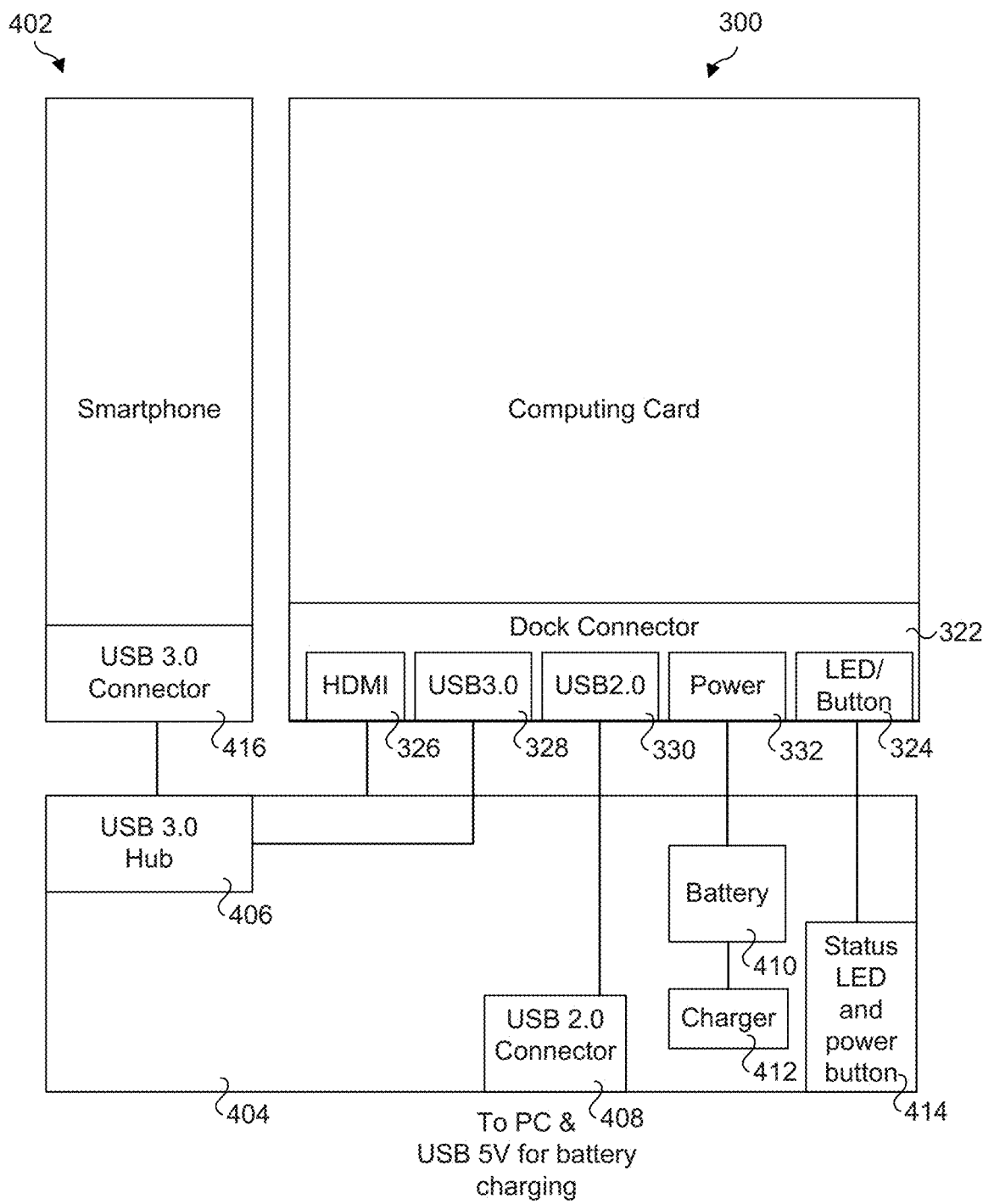
FIG. 4 is a block schematic diagram illustrating selective components for integrating a computing card in a Smartphone, according to one embodiment.

FIG. 4 shows one embodiment of a Smartphone implementation in which a computing card 300 is coupled to a Smartphone 402 via USB adapter board 404. As depicted USB adapter board 404 includes a USB hub 406, a USB connector 408, a battery 410, a charger module 412, and a status LED and power button 414. USB hub 406 is connected to a USB connector 416 on Smartphone 402. When dock connector 322 is coupled to a mating connector (not shown) on USB adapter board 404, USB connector 328 on dock connector 322, while USB connector 408 is connected to USB connector 330, battery 410 is connected to power connector 332, and status LED and power button 414 is connect the LED/button 324.

Figure 5:
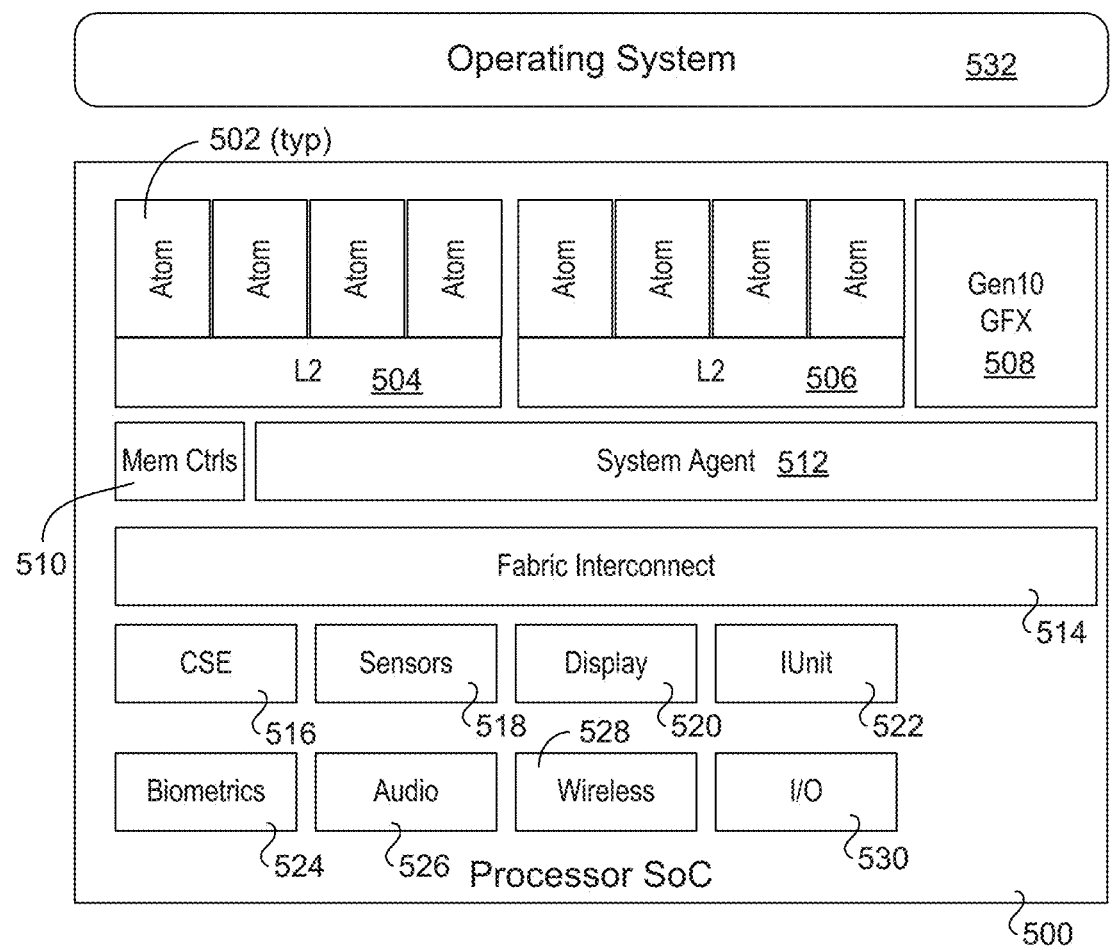
FIG. 5 is a block schematic diagram of a first processor that is suitable for implementation in one or more embodiments described herein.

FIG. 5 shows a processor 500 that may be used in one or more of the embodiments described herein. Processor 500 comprises an SoC architecture, and includes a plurality of INTEL® ATOM® cores 502 that are coupled to a pair of Level 2 (L2) caches 504 and 506, a graphics processor 508, memory controllers 510, a system agent 512, a fabric interconnect 514, CSE 516, sensors 518, a display interface 520, an IUnit 522, a biometrics block 524, an audio block 526, a wireless block 528, and an I/O interface 530. Processor 500 is configured to employ one or more of ATOM® cores 502 to host an operating system 532.

Figure 6:
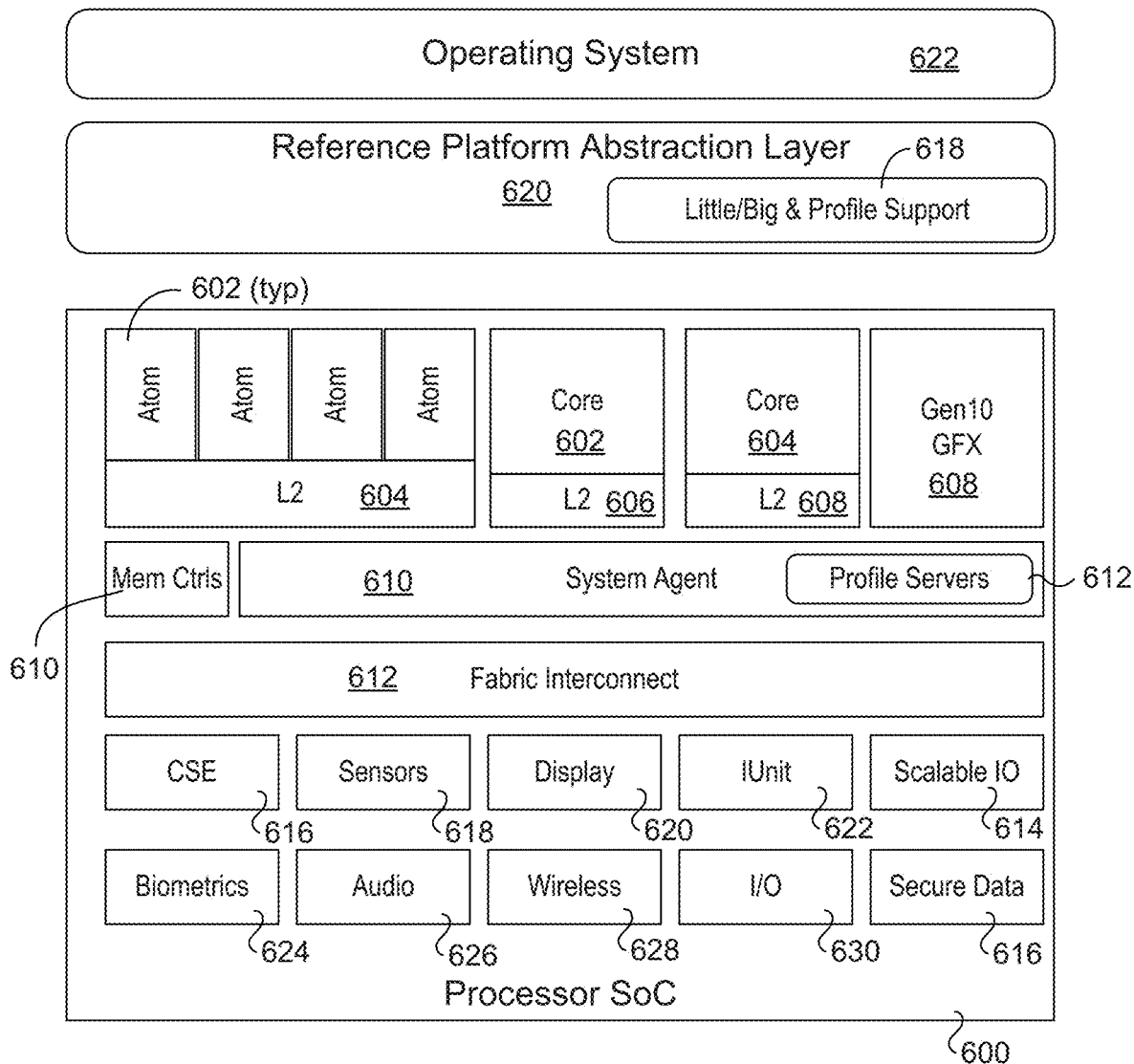
FIG. 6 is a block schematic diagram of a second processor that is suitable for implementation in one or more embodiments described herein.

FIG. 6 shows a processor 600 that may also be used in one or more the embodiments described herein. As shown, a number of components in Processor 500 with like reference numbers are also present in Processor 600. In addition, processor 600 includes two processor cores 602 and 604, each with a respective L2 cache 606 and 608, a system agent 610 including profile servers 612, a scalable I/O block 614, and a secure data block 616.

Cores 602 and 604 are termed "big" cores, and ATOM® cores 502 are termed "little" cores. A cores 602 and 604 provides substantially higher performance than an ATOM® core 602, but at the tradeoff of also consuming significantly more power. To take advantage of having both high-performance and low-power processor cores, profile servers 612 work in conjunction with a little/big & profile support module 618 in reference platform abstraction layer 620 to enable processor 600 to use cores 502 and 504 when power is available to operate in a high-performance profile, while it uses ATOM® cores 602 when operating in a reduced-power profile. Reference platform abstraction layer 620 provides a layer of abstraction between an operating system 622 and processor 600 such that operating system 622 is enabled to operate under a range of profile options without any need to modify the operating system.

Native Graphics Thrower-Catcher Architectures

Figure 7:
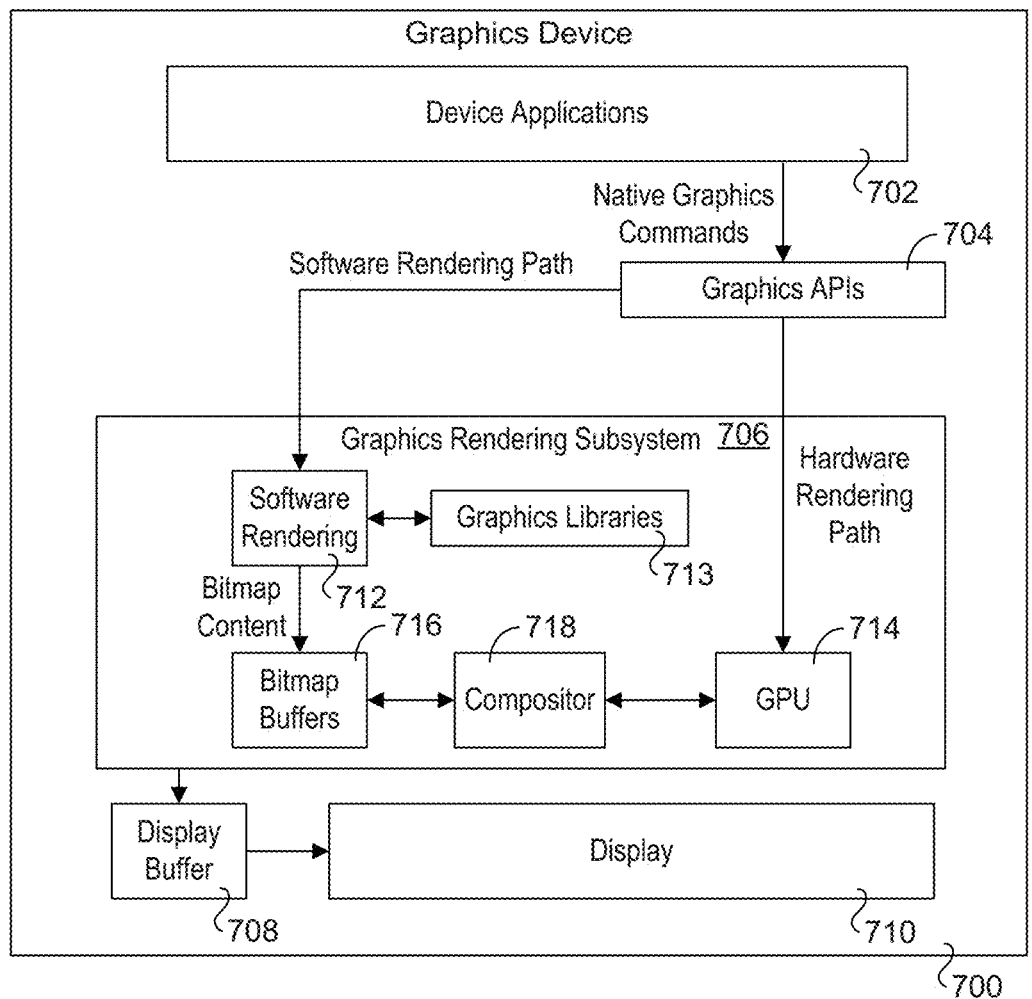
FIG. 7 is a schematic block diagram illustrating components employed by a graphics device for rendering native graphics commands and content.

FIG. 7 illustrates an abstracted graphics rendering architecture of a generic graphics device 700, which includes device applications 702, graphic APIs 704, a graphics rendering subsystem 706, a display buffer 708, and a display 710. Device applications 702 running on the graphic device's operating system issue native graphics commands to graphics APIs 704. The native graphics commands generally comprise any graphic command that may be used for rendering content on a given platform or device, and is not limited to a particular set of APIs in this graphics architecture. For example, the native graphic commands may generally include any graphics command that is supported by the operating system/device implementation; more specific details of exemplary APIs are discussed below.

Graphic APIs 704 are configured to support two rendering paths: 1) a software rendering path; and 2) a hardware rendering path. The software rendering path involves use of software executing on the graphics device's host processor, such as a central processing unit (CPU), as depicted by software rendering 712. Generally, this will be implemented via one or more runtime graphics libraries 713 that are accessed via execution of corresponding graphic APIs 704.

In contrast, the hardware rendering path is designed to render graphics using one or more hardware-based rendering devices, such as a GPU 714. While internally a GPU may use embedded software (not shown) for performing some of its operations, such embedded software is not exposed via a graphics library that is accessible to device applications 702, and thus rendering graphics content on a GPU is not considered software rendering.

Graphics rendering subsystem 706 is further depicted to include bitmap buffers 714, and a compositor 718. Software rendering generally entails rendering graphics content as bitmaps that comprise virtual drawing surfaces or the like that are allocated as bitmap buffers 716 in memory (e.g., system memory). Depending on the terminology used by the software platform for graphics device 700, the bitmap buffers are typically referred to layers, surfaces, views, and/or windows. For visualization purposes, imagine a bitmap buffer as a virtual sheet of paper having an array of tiny boxes onto which content may be "painted" by filling the boxes with various colors.

GPU 714 renders content using mathematical manipulation of textures and other content, as well supporting rendering of vector-based content. GPU 714 also uses bitmap buffers, both internally (not shown), as well as in memory. This may include system memory, memory that is dedicated to the GPU (either on-die memory or off-die memory), or a combination of the two. For example, if the GPU is included in a graphics card in a PC or a separate graphics chip in a laptop, the graphics card or graphics chip will generally include memory that is dedicated for GPU use. For mobile devices such as smartphones and tables, the GPU is actually embedded in the processor SoC, and will typically employ some on-die memory as well as memory either embedded on the SoC or on a separate memory chip.

Compositor 718 is used for "composing" the final graphics content that is shown on the graphic device's display screen. This is performed by combining various bitmap content in bitmap buffers 716 and buffers rendered by GPU 714 (not shown) and writing the composed bitmap content into display buffer 708. The display buffer 716 is then read out using a refresh rate to cause bitmap graphical content to be displayed on a display 718. Optionally, graphics content may be written to a "back" buffer or "backing store", which is then copied into the display buffer, or a "ping-pong" scheme may be used in which the back buffer and display buffer are swapped in concert with the refresh rate.

Figure 8:
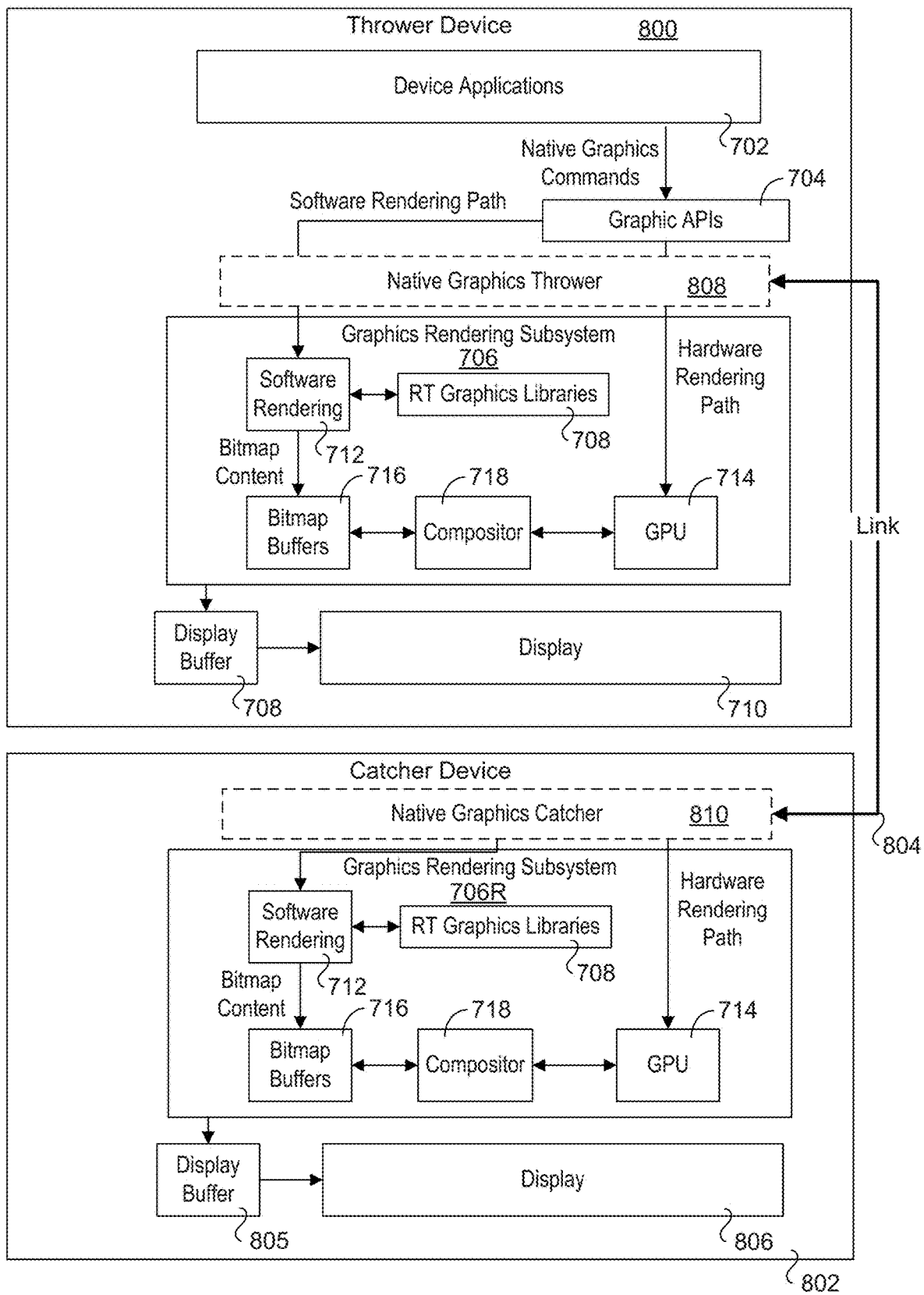
FIG. 8 is a schematic block diagram illustrating a native graphics thrower-catcher architecture, according to one embodiment.

An exemplary native graphics thrower-catcher architecture is shown in FIG. 8 including a thrower device 800 that throws native graphics commands and content to a catcher device 802 via a link 804. As indicated by like reference numbers in FIGS. 7 and 8, the graphics architecture of thrower device 800 is similar to the graphics architecture of graphics device 700. Meanwhile, components comprising graphics rendering subsystem 706 are replicated on catcher device 802, as depicted by graphics rendering subsystem 706R. Catcher device 802 further includes a display buffer 805 and a display 806 that generally function in a similar manner to display buffer 708 and display 710, but may have different buffer sizes and/or configurations, and the resolution of display 806 and display 710 may be the same or may differ.

Throwing of native graphics commands and content is enabled by respective thrower and catcher components on thrower device 800 and catcher device 800 comprising a native graphics thrower 808 and a native graphics catcher 810. These components help facilitated throwing of native graphics commands and content in the following manner.

In one embodiment, native graphics thrower 808 is implemented as a virtual graphics driver or the like that provides an interface that is similar to graphics rendering subsystem 706. Graphic commands and content corresponding to both the software rendering path and hardware rendering path that are output from graphic APIs 704 are sent to native graphics thrower 808. Depending on the operating mode, native graphics thrower 808 may be configured as a trap and pass-through graphics driver, or it may operate as an intercepting graphics driver. When operating as a trap and pass-through graphics driver, native graphics commands and content is trapped, buffered, and sent to native graphics catcher 810. The buffered commands are also allowed to pass through to graphics rendering subsystem 706 in a transparent manner such that the graphics on thrower device 800 appear to operate the same as graphics device 700. Under an intercepting graphics driver, the graphics commands are not passed through on thrower device 800.

As will be readily observed, the thrower-catcher architecture of FIG. 8 implements a split graphics architecture, with the graphics rendering subsystem "moved" to (or otherwise replicated on) the catcher device. From the perspective of graphics rendering subsystem 706R, native graphics catcher 810 output graphics commands and content along both the software (SWF) and hardware rendering paths as if this content was provided directly by graphic APIs 704. The result is that graphics content can be rendered on the remote wireless device (i.e., catcher device 802) at a similar speed to graphics rendered on a graphics device itself (when similar hardware components are implemented for graphics rendering subsystems 706 and 706R). There is substantially no latency incurred through the graphic commands and content throwing process, and the amount of lag resulting from such latency is generally unperceivable to the user, particular for graphics commands and content that is rendered via the hardware rendering path. The greatest amount of latency will typically involve throwing a large image (e.g., a large JPEG or PNG image), which may be implemented by transferring the compressed image file itself from the thrower to the catcher.

To support initialization and operation of link 804, each of thrower device 800 and catcher device 802 include a link stack modules 812 and 814. In some embodiments, thrower device 800 operates as a source and catcher device 802 operates as a sink, and there is corresponding software for facilitating a source/sink link configuration. For example, in one embodiment link 804 comprises a WiFi Direct® (WFD) link, which includes a WFD source and a WFD sink.

Android Graphics Rendering

Figure 9:
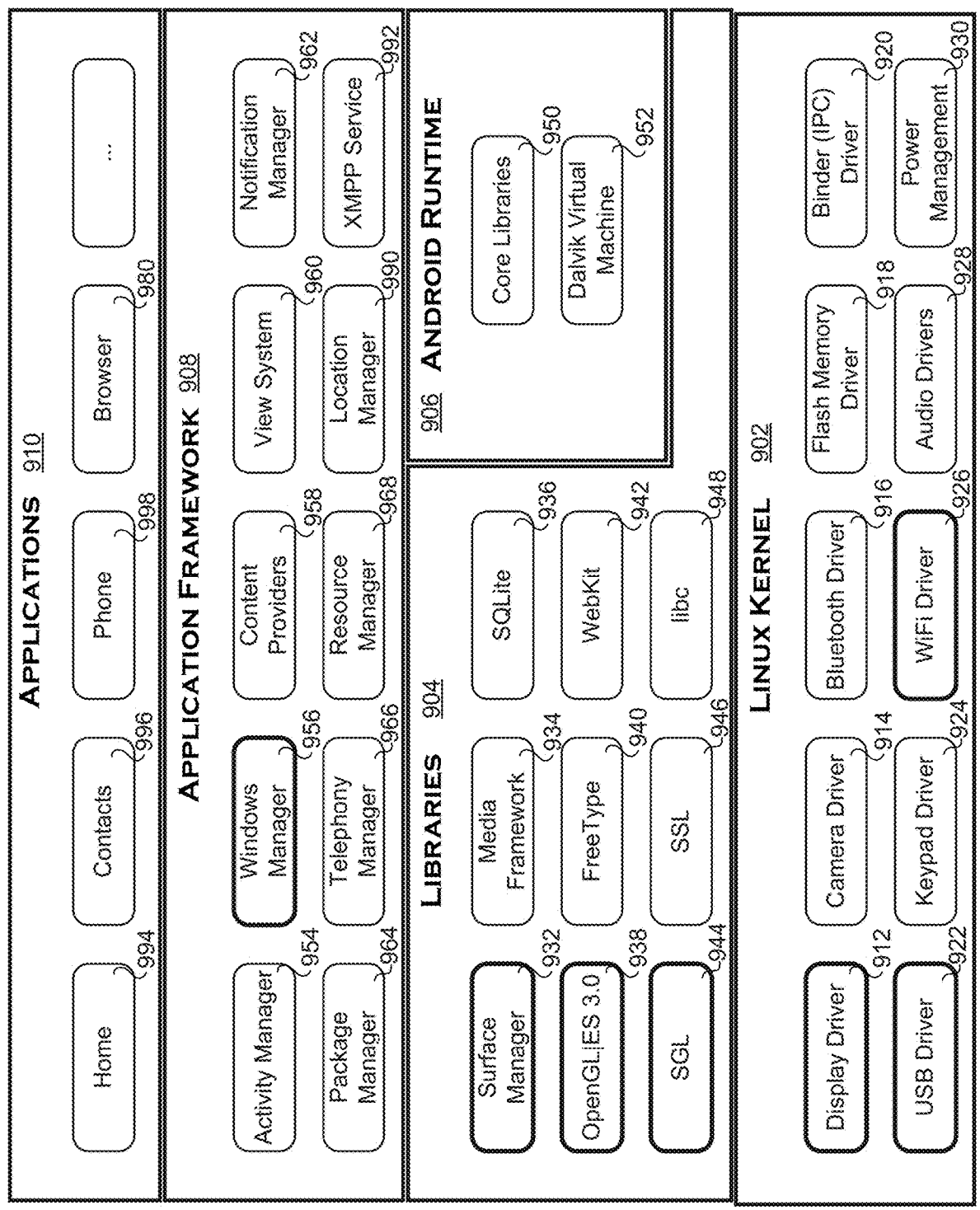
FIG. 9 is a schematic block diagram illustrating the software components as defined by the Android architecture.

FIG. 9 shows a diagram illustrating the Android software architecture 900. The Android software architecture includes Linux Kernel 902, Libraries 904, Android Runtime 906, Application Framework 908, and Applications 910.

Linux Kernel 902 occupies the lowest layer in the Android software stack, and provides a level of abstraction between the Android device hardware and the upper layers of the Android software stack. While some of Linux Kernel 902 shares code with Linux kernel components for desktops and servers, there are some components that are specifically implemented by Google for Android. A recent version of Android, Android 4.4 (aka "KitKat") is based on Linux kernel 3.4 or newer (noting the actual kernel version depends on the particular Android device and chipset). The illustrated Linux Kernel 902 components include a display driver 912, a camera driver 914, a Bluetooth driver 916, a flash memory driver 918, a binder driver 920, a USB driver 922, a keypad driver 924, a Wi-Fi driver 926, an audio drivers 928, and power management 930.

On top of Linux Kernel 902 is Libraries 904, which comprises middleware, libraries and APIs written in C/C++, and applications 910 running on Application Framework 908. Libraries 904 are compiled and preinstalled by an Android device vendor for a particular hardware abstraction, such as a specific CPU. The libraries include surface manager 932, media framework 934, SQLite database engine 936, OpenGL ES (embedded system) 938, FreeType front library 940, WebKit 942, Skia Graphics Library (SGL) 944, SSL (Secure Socket Layer) library 946, and the libc library 948. Surface manager 932, also referred to as "Surface-Flinger," is a graphics compositing manager that composites graphics content for surfaces comprising off-screen bitmaps that are combined with other surfaces to create the graphics content displayed on an Android device, as discussed in further detail below. Media framework 934 includes libraries and Codecs used for various multi-media applications, such as playing and recording videos, and support many formats such as AAC, H.264 AVC, H.263, MP3, and MPEG-4. SQLite database enjoy uses for storing and accessing data, and supports various SQL database function.

The Android software architecture employs multiple components for rendering graphics including OpenGL ES 938, SGL 944, FreeType font library 940 and WebKit 942. Further details of Android graphics rendering are discussed below with reference to FIG. 8.

Android runtime 906 employs the Dalvik Virtual Machine (VM) 950 and core libraries 952. Android applications are written in Java (noting Android 4.4 also supports applications written in C/C++). Conventional Java programming employs a Java Virtual Machine (JVM) to execute Java bytecode that is generated by a Java compiler used to compile Java applications. Unlike JVMs, which are stack machines, the Dalvik VM uses a register-based architecture that requires fewer, typically more complex virtual machine instructions. Dalvik programs are written in Java using Android APIs, compiled to Java bytecode, and converted to Dalvik instructions as necessary. Core libraries 952 support similar Java functions included in Java SE (Standard Edition), but are specifically tailored to support Android.

Application Framework 908 includes high-level building blocks used for implementing Android Applications 910. These building blocks include an activity manager 954, a Windows manager 956, content providers 958, a view system 960, a notifications manager 962, a package manager 964, a telephony manager 966, a resource manager 968, a location manager 970, and an XMPP (Extensible Messaging and Presence Protocol) service 972.

Applications 910 include various application that run on an Android platform, as well as widgets, as depicted by a home application 974, a contacts application 976, a phone application 978, and a browser 980. The applications may be tailored for the particular type of Android platform, such as a tablet without mobile radio support would not have a phone application and may have additional applications designed for the larger size of a tablet's screen (as compared with a typical Android smartphone screen size).

The Android software architecture offers a variety of graphics rendering APIs for 2D and 3D content that interact with manufacturer implementations of graphics drivers. However, application developers draw graphics content to the display screen in two ways: with Canvas or OpenGL.

Figure 10:
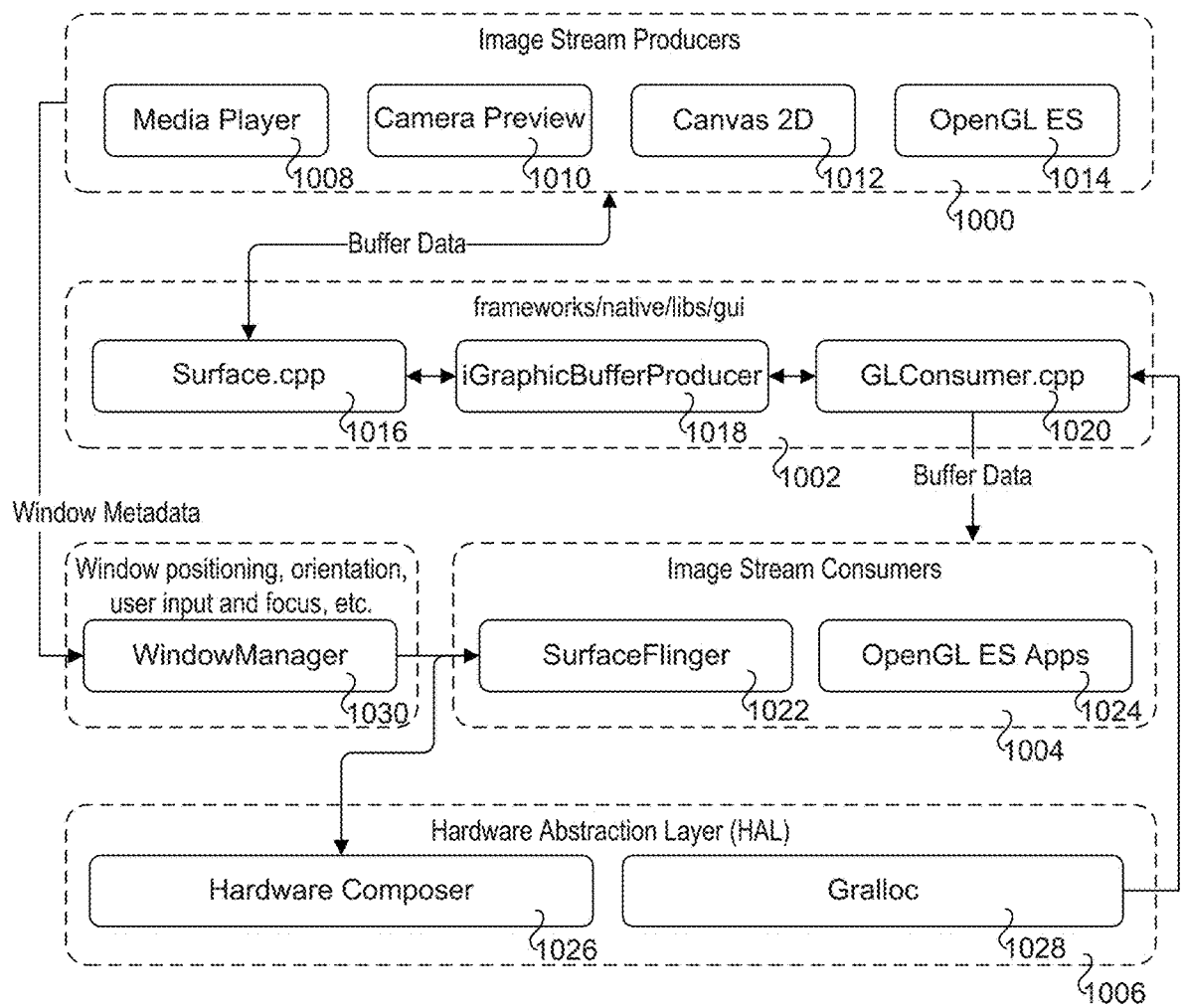
FIG. 10 is a schematic block and data flow diagram illustrates selected Android graphics components and data flows between them.

FIG. 10 illustrates selected Android graphics components. These components are grouped as image stream producers 1000, frameworks/native/libs/gui modules 1002, image stream consumers 1004, and a hardware abstraction layer (HAL) 1006. An image stream producer can be anything that produces graphic buffers for consumption. Examples include a media player 1008, camera preview application 1010, Canvas 2D 1012, and OpenGL ES 1014. The frameworks/native/libs/gui modules 1002 are C++ modules and include Surface.cpp 1016, iGraphicBufferProducer 1018, and GLConsumer.cpp 1020. The image stream consumers 1004 include SurfaceFlinger 1022 and OpenGL ES applications 1024. HAL 1006 includes a hardware composer 1026 and a Graphics memory allocator (Gralloc) 1028. The graphics components depicted in FIG. 10 also includes a WindowsManager 1030

The most common consumer of image streams is SurfaceFlinger 1022, the system service that consumes the currently visible surfaces and composites them onto the display using information provided by Window Manager 1024. SurfaceFlinger 1022 is the only service that can modify the content of the display. SurfaceFlinger 1022 uses OpenGL and Hardware Composer to compose a group of surfaces. Other OpenGL ES apps 1024 can consume image streams as well, such as the camera app consuming a camera preview 1010 image stream.

WindowManager 1030 is the Android system service that controls a window, which is a container for views. A window is always backed by a surface. This service oversees lifecycles, input and focus events, screen orientation, transitions, animations, position, transforms, z-order, and many other aspects of a window. WindowManager 1030 sends all of the window metadata to SurfaceFlinger 1022 so Surface-Flinger can use that data to composite surfaces on the display. Hardware composer 1026 is the hardware abstraction for the display subsystem. SurfaceFlinger 1022 can delegate certain composition work to Hardware Composer 1026 to offload work from OpenGL and the GPU. Surface-Flinger 1022 acts as just another OpenGL ES client. So when SurfaceFlinger is actively compositing one buffer or two into a third, for instance, it is using OpenGL ES. This makes compositing lower power than having the GPU conduct all computation. Hardware Composer 1026 conducts the other half of the work. This HAL component is the central point for all Android graphics rendering. Hardware Composer 1026 supports various events, including VSYNC and hotplug for plug-and-play HDMI support.

android.graphics.Canvas is a 2D graphics API. and is the most popular graphics API among developers. Canvas operations draw the stock and custom android.view.Views in Android. In Android, hardware acceleration for Canvas APIs is accomplished with a drawing library called OpenGLRenderer that translates Canvas operations to OpenGL operations so they can execute on the GPU.

Beginning in Android 4.0, hardware-accelerated Canvas is enabled by default. Consequently, a hardware GPU that supports OpenGL ES 2.0 (or later) is mandatory for Android 4.0 and later devices. Android 4.4 requires OpenGL ES 3.0 hardware support.

In addition to Canvas, the other main way that developers render graphics is by using OpenGL ES to directly render to a surface. Android provides OpenGL ES interfaces in the android.opengl package that developers can use to call into their GL implementations with the SDK (Software Development Kit) or with native APIs provided in the Android NDK (Android Native Development Kit).

Figure 11:
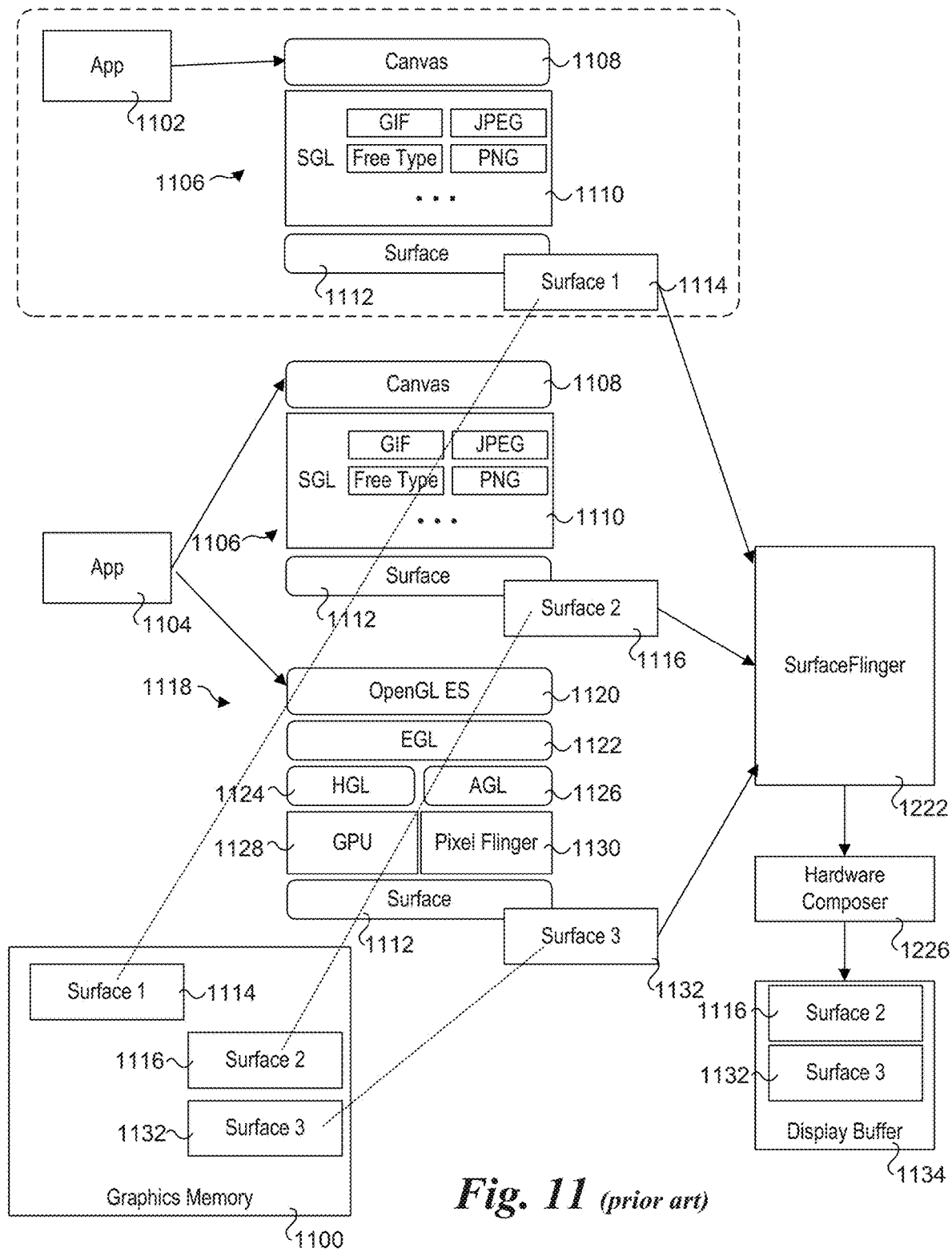
FIG. 11 is a schematic block and data flow diagram illustrating selected components of the Android graphics system and compositing of graphics content by Android's SurfaceFlinger and Hardware Composer.

FIG. 11 graphically illustrates concepts relating to surfaces and the composition of the surfaces by SurfaceFlinger 1022 and the hardware composer 1026 to create the graphical content that is displayed on an Android device. As mentioned above, application developers are provided with two means for creating graphical content: Canvas and OpenGL. Each employ an API comprising a set of graphic commands for creating graphical content. That graphical content is "rendered" to a surface, which comprises a bitmap stored in graphics memory 1100.

FIG. 11 shows graphic content being generated by two applications 1102 and 1104. Application 1102 is a photo-viewing application, and uses a Canvas graphics stack 1106.

This includes a Canvas API 1108, SGL 1110, the Skia 2D graphics software library, and the Android surface class 1112. Canvas API 1106 enables users to "draw" graphics content onto virtual views (referred to as surfaces) stored as bitmaps in graphics memory 1100 via Canvas drawing commands. Skia supports rendering 2D vector graphics and image content, such as GIFs, JPEGs, and PNGs. Skia also supports Androids FreeType text rendering subsystem, as well as supporting various graphic enhancements and effects, such as antialiasing, transparency, filters, shaders, etc. Surface class 1110 includes various software components for facilitating interaction with Android surfaces. Application 1102 renders graphics content onto a surface 1114.

Application 1104 is a gaming application that uses Canvas for its user interface and uses OpenGL for its game content. It employs an instance of Canvas graphics stack 1106 to render user interface graphics content onto a surface 1116. The OpenGL drawing commands are processed by an OpenGL graphics stack 1118, which includes an OpenGL ES API 1120, an embedded systems graphics library (EGL) 1122, a hardware OpenGL ES graphics library (HGL) 1124, an Android software OpenGL ES graphics library (AGL) 1126, a graphics processing unit (GPU) 1128, a PixelFlinger 1130, and Surface class 1110. The OpenGL drawing content is rendered onto a surface 1132.

The content of surfaces 1114, 1116, and 1132 are selectively combined using SurfaceFlinger 1022 and hardware composer 1026. In this example, application 1104 has the current focus, and thus bitmaps corresponding to surfaces 1116 and 1132 are copied into a display buffer 1134.

SurfaceFlinger's role is to accept buffers of data from multiple sources, composite them, and send them to the display. Under earlier versions of Android, this was done with software blitting to a hardware framebuffer (e.g. /dev/graphics/fb0), but that is no longer how this is done.

When an application comes to the foreground, the WindowManager service asks SurfaceFlinger for a drawing surface. SurfaceFlinger creates a "layer"—the primary component of which is a BufferQueue—for which SurfaceFlinger acts as the consumer. A Binder object for the producer side is passed through the WindowManager to the app, which can then start sending frames directly to SurfaceFlinger.

For most applications, there will be three layers on screen at any time: the "status bar" at the top of the screen, the "navigation bar" at the bottom or side, and the application's user interface and/or display content. Some applications will have more or less, e.g. the default home application has a separate layer for the wallpaper, while a full-screen game might hide the status bar. Each layer can be updated independently. The status and navigation bars are rendered by a system process, while the application layers are rendered by the application, with no coordination between the two.

Device displays refresh at a certain rate, typically 60 frames per second (fps) on smartphones and tablets. If the display contents are updated mid-refresh, "tearing" will be visible; so it's important to update the contents only between cycles. The system receives a signal from the display when it's safe to update the contents. This is referred to as the VSYNC signal. The refresh rate may vary over time, e.g. some mobile devices will range from 58 to 62 fps depending on current conditions. For an HDMI-attached television, this could theoretically dip to 24 or 48 Hz to match a video. Because the screen can be updated only once per refresh cycle, submitting buffers for display at 200 fps would be a waste of effort as most of the frames would never be seen. Instead of taking action whenever an app submits a buffer, SurfaceFlinger wakes up when the display is ready for something new.

When the VSYNC signal arrives, SurfaceFlinger walks through its list of layers looking for new buffers. If it finds a new one, it acquires it; if not, it continues to use the previously-acquired buffer. SurfaceFlinger always wants to have something to display, so it will hang on to one buffer. If no buffers have ever been submitted on a layer, the layer is ignored.

Once SurfaceFlinger has collected all of the buffers for visible layers, it asks the Hardware Composer how composition should be performed. Hardware Composer 1026 was first introduced in Android 3.0 and has evolved steadily over the years. Its primary purpose is to determine the most efficient way to composite buffers with the available hardware. As a HAL component, its implementation is device-specific and usually implemented by the display hardware OEM.

The value of this approach is easy to recognize when you consider "overlay planes." The purpose of overlay planes is to composite multiple buffers together, but in the display hardware rather than the GPU. For example, suppose you have a typical Android phone in portrait orientation, with the status bar on top and navigation bar at the bottom, and app content everywhere else. The contents for each layer are in separate buffers (i.e., on separate surfaces). You could handle composition by rendering the app content into a scratch buffer, then rendering the status bar over it, then rendering the navigation bar on top of that, and finally passing the scratch buffer to the display hardware. Or, you could pass all three buffers to the display hardware, and tell it to read data from different buffers for different parts of the screen. The latter approach can be significantly more efficient.

As one might expect, the capabilities of different display processors vary significantly. The number of overlays, whether layers can be rotated or blended, and restrictions on positioning and overlap can be difficult to express through an API. So, the Hardware Composer 1026 works as follows.

First, SurfaceFlinger 1022 provides Hardware Composer 1026 with a full list of layers, and asks, "how do you want to handle this?" Hardware Composer 1026 responds by marking each layer as "overlay" or "OpenGL ES (GLES) composition." SurfaceFlinger 1022 takes care of any GLES composition, passing the output buffer to Hardware Composer 1026, and lets Hardware Composer 1026 handle the rest.

Figure 8A:
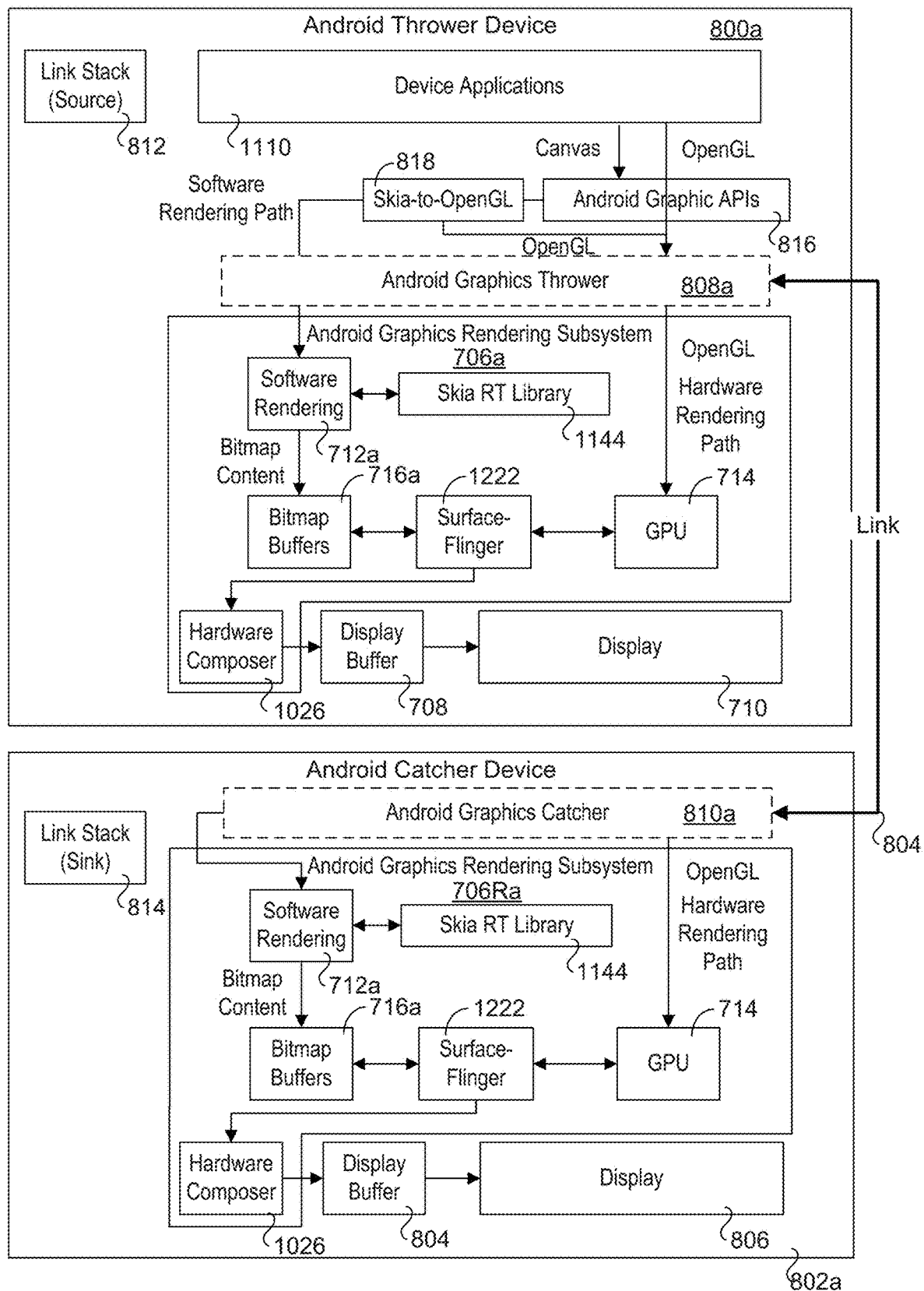
FIG. 8a is a schematic block diagram illustrating an Android graphics thrower-catcher architecture, according to one embodiment.

An exemplary Android graphics thrower-catcher architecture is shown in FIG. 8a including a hybrid Android thrower device 800a that throws Android graphics commands and content to an Android catcher device 802a via a link 804. Various aspects of the Android graphics thrower-catcher architecture of FIG. 8a are similar to those shown in FIG. 8 discussed above, including various components sharing the same reference numbers in both FIGS. 8 and 8a. Accordingly, the following will focus on implementation details that are particular to implementing an Android graphics thrower and catcher.

As discussed above, Android applications 910 use canvas drawing commands and OpenGL drawing commands to generate graphics content that is displayed by an Android application. The canvas and OpenGL commands are implemented through Android graphic APIs 816, which initially split the command along the hardware rendering path for OpenGL commands and the software rendering path for canvas commands. Selected canvas commands are converted from Skia to OpenGL-equivalent commands via a Skia-to-OpenGL block 818, and those OpenGL commands are forwarded via the hardware rendering path.

Android graphics rendering subsystems 806a and 706Ra include a software rendering block 712a that employs a Skia runtime library 944 to render Skia commands as associated content (e.g., image content) via the software rendering path. Further components include bitmap buffers 716a, Surface-Flinger 1022, a GPU 714, and a hardware composer 1026.

FIG. 8a further depicts an Android graphics thrower 808a and an Android graphics catcher 810a. These components are similar to native graphics thrower 808 and native graphics catcher 810, except they are configured to throw Android graphic commands and associated content, including OpenGL commands, and Canvas and/or Skia commands and associated content.

Figure 12A:
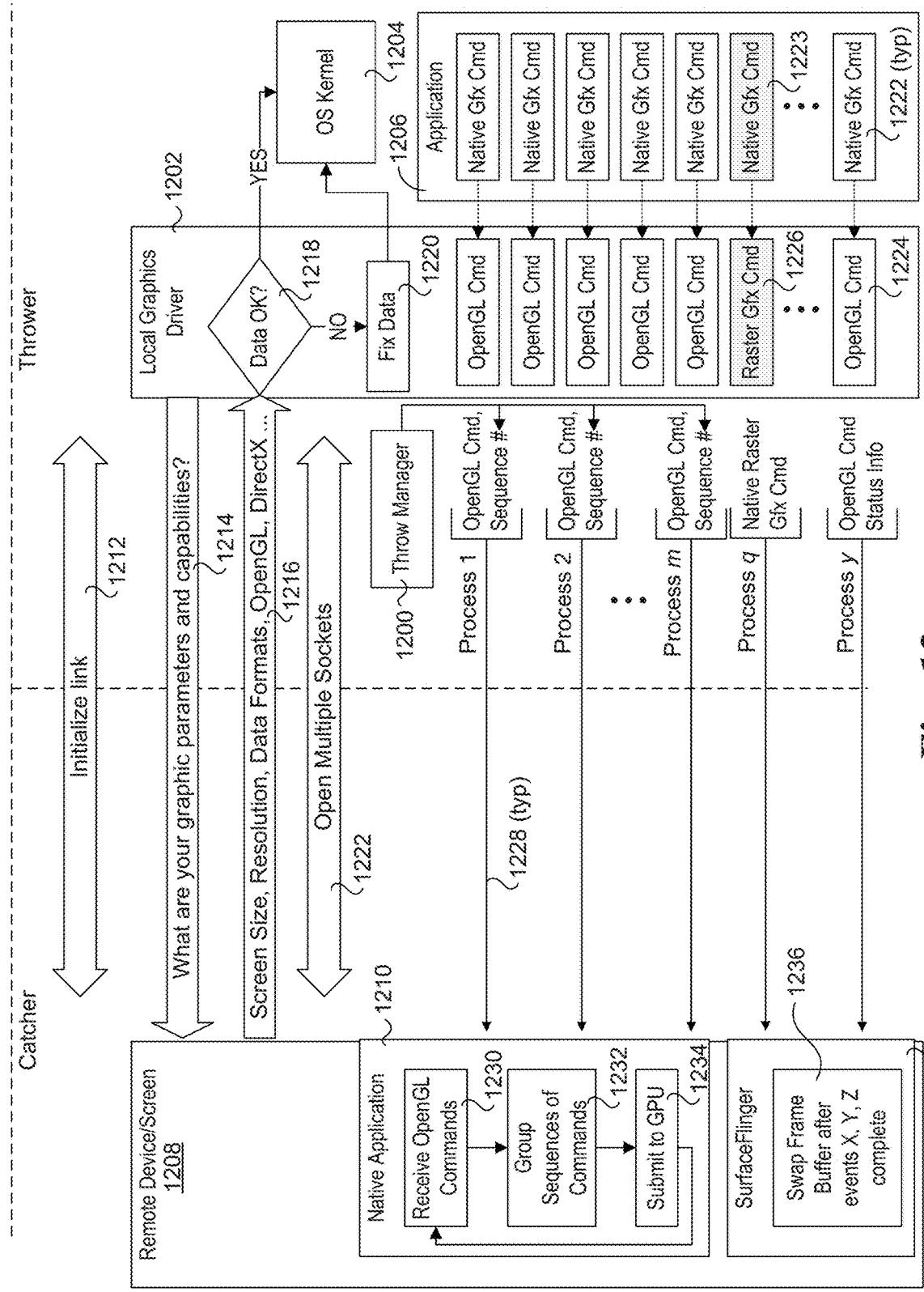
FIG. 12a is a combination schematic and message flow diagram illustrating an embodiment that throws native Android graphics commands and content to a remote Android device.

FIG. 12a illustrates an Android thrower-catcher architecture that throws OpenGL and Android Skia graphics content over multiple sockets in parallel. On the thrower side, the components include a throw manager 1200, a local graphics driver 1202, an operating system kernel 1204, and an application 1206. On the catcher side, the components include a remove device/screen 1208 including a native application 1210 and SurfaceFlinger 1022. Generally, remote device/screen 1208 is representative of any type of device that can be configured as a catcher.

In order to throw graphics, a link between the thrower and catcher must first be initialized, as depicted by initialize link communication exchange 1212, which is depicted by a double-headed arrow to indicate there is an exchange of communication between the thrower and catcher. Generally, the particular link initialization operations will be a function of the particular link physical connection and protocol being used, wherein such operations are well-known to those having skill in the communications art and outside the scope of this disclosure.

Once the link has been initialized, local graphics driver 1202 sends a message 1214 to remote device/screen 1208 asking for its graphic parameters and capabilities. For example, this might include, but is not limited to remote device/screen 1208's screen size, resolution, data formats, what types of graphics it supports, such as OpenGL and DirectX, and potentially other information relating to remote device/screen 1208's graphic parameters and capabilities, which are returned via a message 1216.

Upon receipt of message 1216, logic depicted as a decision block 1218 in local graphics driver 1202 evaluates the data and determines whether it is OK or whether it needs to be fixed. If the data is deemed OK, it is forwarded to OS kernel 1204. If not, it is fixed in a fix data block 1220 prior to being forwarded to OS kernel 1204.

As this point, multiple sockets are opened, as depicted by a message exchange 1222. The multiple sockets are then employed to transport multiple OpenGL commands and Android native raster graphics commands in parallel.

As depicted, application 1206 issues multiple Android native graphics commands 1222 and 1223 to local graphics driver 1202. Android native graphics commands 1222 may include OpenGL commands and application graphics commands that get converted to OpenGL commands by local graphics driver 1202, and native raster-based graphics commands 1223 that cannot be converted to OpenGL commands and are sent as raster graphics commands 1226 to be rendered by remote device/screen 1208 using a software rendering path.

In support real-time graphics rendering, the sending and processing of the OpenGL commands 1224 and raster graphics commands 1226 are orchestrated using a sequencing scheme in combination with status information. In one embodiment, each OpenGL command 1224 that is sent via a message 1228 to be received by native application 1210 includes a sequence number. As further illustrated by blocks within native application 1210, ongoing operations performed by the native application include receiving OpenGL commands in a block 1230, grouping sequences of OpenGL commands in a block 1232, and submitting the grouped sequences of OpenGL commands to the GPU in a block 1234.

Native raster graphics commands 1226 are sent in parallel with the OpenGL commands. These may or may not be sequenced, depending on whether multiple sockets are used for transporting native raster graphics commands. Upon receipt by native application 1210, the native raster graphics commands 1226 are handled in a similar manner to how these are rendered using a software-based rendering path on an Android host device. However, there are a couple of additional considerations.

Under a conventional approach, the Android graphics software rendering path accesses raster graphics objects in local memory, which is substantially instantaneous under today's hardware capabilities. However, the content of these same raster graphics objects is sent over the link from the thrower to the catcher, which requires some finite latency (albeit very small). In contrast, for OpenGL commands that do not contain texture data (or containing relatively small textures), the latency resulting from sending the OpenGL commands over the link is substantially unperceivable, and when combined with hardware-based rendering support for OpenGL (e.g., by a GPU), the real-time remote graphics rendering performance under the Android thrower-catcher architecture is very good, and is substantially faster than using a screen-casting approach such as Miracast.

To orchestrate the timing of the display of rendered content on the catcher, SurfaceFlinger 1022, in combination with Hardware Composer (not shown) as described above, processes OpenGL command status information, which includes VSYNC timing information, and frame buffers are swapped after events are completed, as depicted by a block 1236. For example, it is desired that each new frame buffer contain a complete set of graphics content, such as full image content and correctly ordered sequences of OpenGL command content that has been rendered by the GPU. If the graphics content of a frame buffer is incomplete, it will not be swapped to be used as the display buffer, resulting in the existing display buffer content being displayed multiple times using the display refresh rate from the remote device/screen 1208.

Figure 12B:
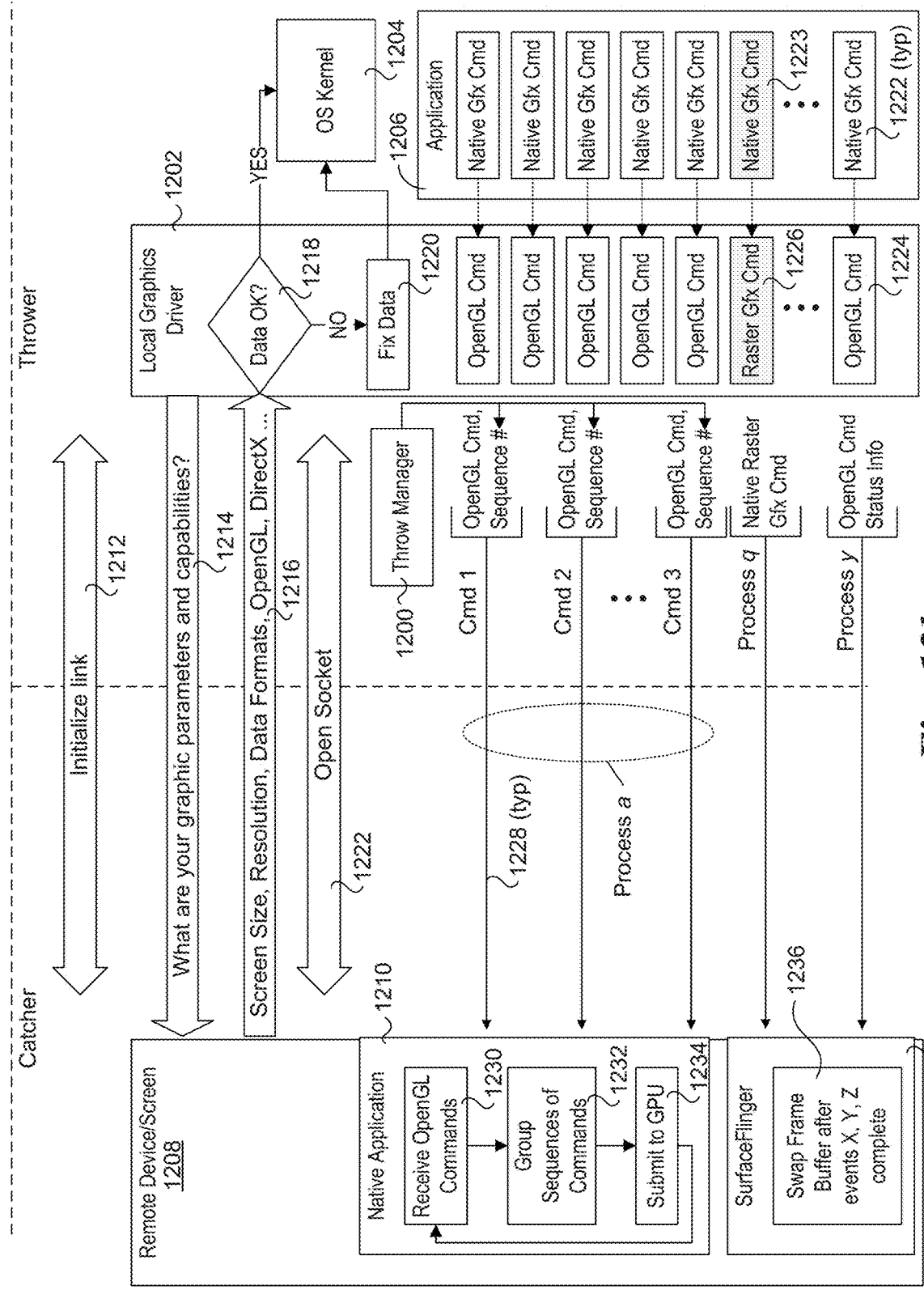
FIG. 12b is a combination schematic and message flow diagram illustrating an alternative configuration to that shown in FIG. 12a under which OpenGL graphic commands are sent using a single socket.

FIG. 12b illustrates an alternative implementation to the embodiment of FIG. 12a. Under this embodiment, a single socket is used to transport the OpenGL command sequence over the link. The native raster graphics commands and/or OpenGL command status information may be transported over the same socket as the OpenGL command sequence, or separate sockets.

Windows Graphics Architecture

In addition to throwing Android graphics content, thrower-catcher remote display schemes may be implemented that throw native Microsoft Windows graphics content. Microsoft Windows provides several C++/COM APIs for graphics, as shown in FIG. 13. At the left-hand side of the diagram is the legacy Graphics Device Interface (GDI) 1300, the original graphics interface for Windows. GDI+ 1302 was introduced in Windows XP as a successor to GDI 1300. The GDI+ library is accessed through a set of C++ classes that wrap flat C functions, as depicted by GDI+ flat API 1304. The .NET Framework also provides a managed version of GDI+ in the System.Drawing namespace.

The DirectX APIs 1306 include Direct2D 1308, DirectWrite 1310, Direct3D 1312, Direct Graphics Intrastructure (DXGI) 1314, and a software rasterizer 1316. Direct2D 1308 is an API for 2D graphics, and is the successor to both GDI and GDI+. Direct3D 1312 is employed for 3D graphics. DirectWrite 1310 is a text layout and rasterization engine. You can use either GDI 1300 or Direct2D 1308 to draw the rasterized text. DXGI 1314 performs low-level tasks, such as presenting frames for output. Most applications do not use DXGI directly. Rather, it serves as an intermediate layer between the graphics driver and Direct3D. The Windows graphics architecture also includes a graphics driver layer that includes a GDI Display Device Interface (DDI) 1318 and a Direct X (DX) DDI 1320.

While both GDI 1300 and GDI+ 1302 continue to be supported in Windows, Direct2D 1308 and DirectWrite 1310 are recommended for new programs. In some cases, a mix of technologies might be more practical. For these situations, Direct2D 1308 and DirectWrite 1310 are designed to interoperate with GDI 1300.

The modern graphics approach is to leverage graphics computations performed by the graphics processing unit (GPU), rather than the CPU. Modern GPUs are highly optimized for the types of computation used in rendering graphics. Generally, the more of this work that is moved from the CPU to the GPU, the better.

While GDI 1300 supports hardware acceleration for certain operations, many GDI operations are bound to the CPU. Direct2D 1308 is layered on top of Direct3D 1312, and takes full advantage of hardware acceleration provided by the GPU. If the GPU does not support the features needed for Direct2D 1308, then Direct2D 1308 falls back to software rendering using software rasterizer 1316. Overall, Direct2D 1308 outperforms GDI 1300 and GDI+ 1302 in most situations. Direct2D also supports vector graphics, which employ mathematical formulas to represent line art. These formulas are not dependent on screen resolution, so they can be scaled to arbitrary dimensions. Vector graphics are particularly useful when an image must be scaled to support different monitor sizes or screen resolutions.

FIG. 14 depicts the Windows Display Driver Model (WDDM) architecture 1400. The architecture is divided between User Mode components and Kernel Mode components, as shown. The User Mode components include an application 1402 (which is actually not part of the WDDM architecture, but rather provides inputs to the WDDM architecture), a Direct3D runtime module 1404, a user-mode display driver 1406, an OpenGL runtime module 1408, a Win32 GDI module 1010, a kernel-mode access dynamic link library (DLL) 1412, and an OpenGL installable client driver (ICD) 1414. The Kernel Mode components include a DirectX graphics kernel subsystem (Dxgkml.sys) 1416, a Win32K.sys module 1418, and a display miniport driver 1420. Dxgkml.sys 1416 includes a display port driver, a video memory manager, and a GPU scheduler.

Figure 15:
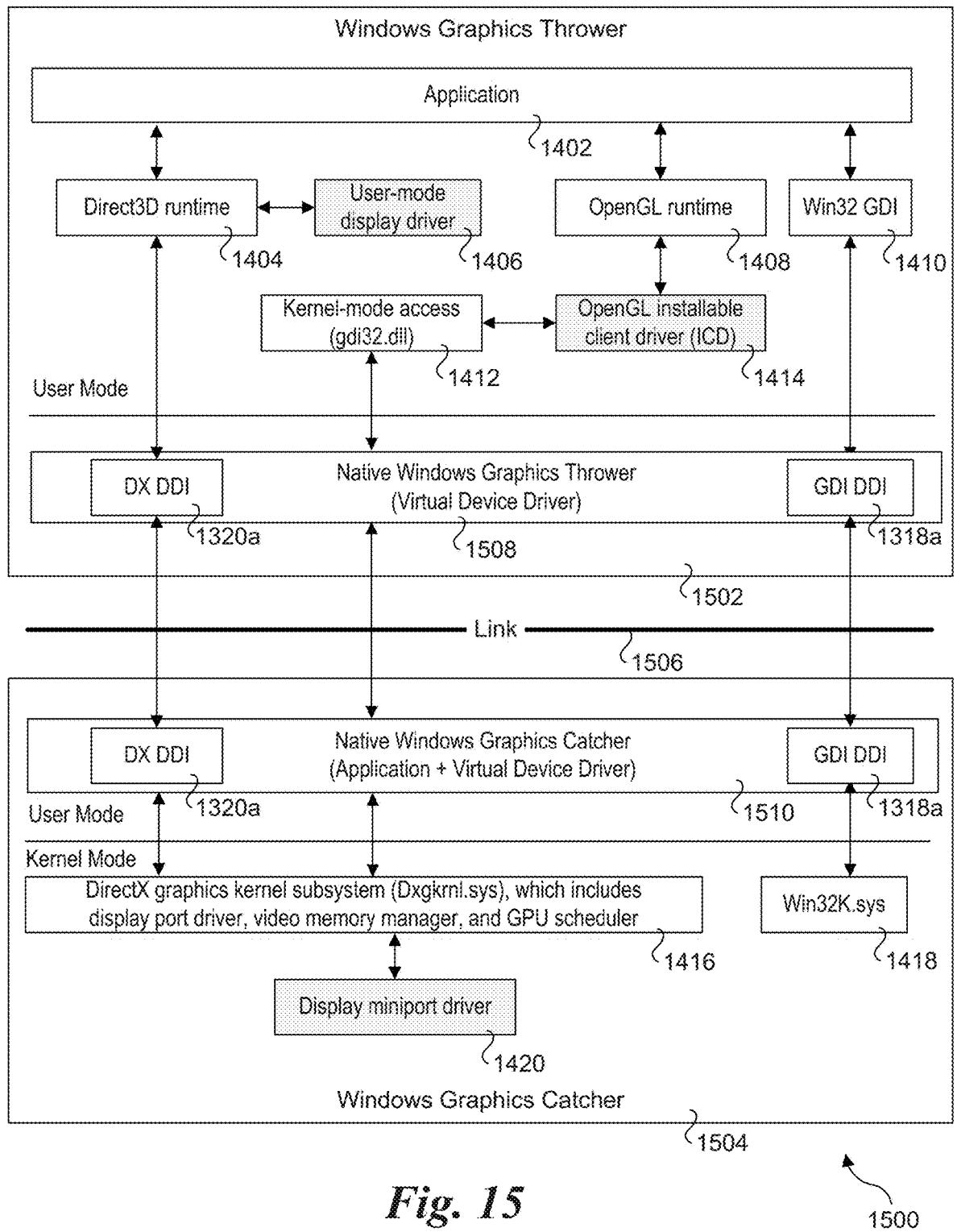
FIG. 15 is a block schematic diagram illustrating an embodiment of a Windows graphics thrower-catcher architecture under which a Windows graphic thrower throws native Windows graphics commands to a remote Windows graphics catcher.

FIG. 15 shows an embodiment of a Windows graphics catcher-thrower architecture 1500 under which a Windows graphics thrower 1502 throws native Windows graphics commands and content to a Windows graphics catcher 1504 over a link 1506. As shown in the upper portion if FIG. 15, Windows graphics thrower 1502 includes the user mode graphics components of the Windows graphics architecture should in FIG. 14. Meanwhile, under this split graphics architecture implementation, Windows catcher 1504 includes the kernel mode graphics components of FIG. 14.

To facilitate throwing of native Windows graphics content, Windows graphics thrower 1502 includes a native Windows graphics thrower 1508, while Windows graphics catcher 1504 includes a native Windows graphics catcher 1510. In the illustrated embodiment, native Windows graphics thrower 1506 is implemented as a virtual device driver that is configured to appear, from the perspective of the user mode components, to operate as a conventional Windows graphics device driver that includes GDI DDI 1318 and DX DDI 1320 of FIG. 13. However, an augmented GDI DDI 1318a and DX DDI 1320a are implemented instead, which are configured to forward the graphics content they receive to mating augmented GDI DDI 1318b and DX DDI 1320b on native Windows graphics catcher 1510. GDI DDI 1318b and DX DDI 1320b are virtual device drivers that are configured to interface to the kernel mode Windows graphics components depicted at the bottom of FIG. 15. In the illustrated embodiment, native Windows graphics catcher 1510 is implement as a Windows application that either includes software modules for implementing virtual GDI DDI 1318b and DX DDI 1320b, or interfaces with software modules that are implemented separately (such as services).

FIG. 16 shows another embodiment of a native graphics thrower-catcher architecture under which Windows thrower device 1600 throws Android graphics commands and content to an Android catcher device 802a. Under one embodiment Android catcher device 802a in FIGS. 8a and 16a share the same components (as applied to Android graphics catching and rendering). As illustrated, the user mode components for Windows thrower device 1600 are the conventional Windows user mode graphics components shown in FIGS. 14 and 15 as discussed above. A Windows-to-Android graphics converter and thrower 1602 is used to convert Windows graphic commands and content to corresponding Android graphics commands and content, and then throw the converted Android graphics commands and content. Windows-to-Android graphics converter and thrower 1602 includes an augmented native windows graphics thrower 1508a, which includes DX DDI 1320a and GDI DDI 1318a. It also includes a Windows-to-Android graphics converter 1604 including a Direct X to OpenGL converter 1606 and a GDI/GDI+ to Skia graphics converter 1608.

As its name implies, Direct X to OpenGL converter 1606 receives Direct X commands that are passed through DX DDI 1320a and converts those commands into corresponding OpenGL commands. One or more of various existing Direct X to OpenGL converters may be used for this purpose. For example, in one embodiment, Valve corporation's Dota 2's open source Direct3D to OpenGL translation layer may be used. The code, names "ToGL," is available from GitHub. Another open source Direct X to OpenGL converter is available from graphics chip maker ATI Techologies.

GDI/GDI+ to Skia graphic convertor receives GDI and/or GDI+ graphics commands via GDI DDI 1318 and converts them into equivalent Skia graphic commands. Generally, the GDI/GDI+ graphic commands will tend to concern raster content, such as images, although it may include other content, as well. Image content is typically based to a DDI as either a pointer to bitmap content that is already written to a bitmap buffer, or a pointer to the image content in its stored form, which may typically comprise a conventional graphics standard such as, but not limited to JPEG, PNG, GIF, etc. The image content may also be stored in a proprietary compressed format, such as a wavelet-based compressed form. Some applications, such as Google Chrome, internally employ Skia for rendering content. When these applications are deployed on Windows platforms (such as Windows 7, Windows 8.1, etc.), the Skia commands are converted to Windows drawing commands, which may include GDI/GDI+ drawing commands. Converting the other way (e.g., from GDI/GDI+) generally involves the reverse process.

Windows-to-Android graphics converter and thrower outputs OpenGL commands and Skia graphics commands (as applicable) and throws them to Android graphics catcher 810*a* on Android catcher device 802*a*. Android graphics catcher 810*a* then passes the OpenGL and Skia graphics commands to Android graphics rendering subsystem 706Ra in a similar manner to that discussed above with reference to FIG. 8*a*.

Figure 17A:
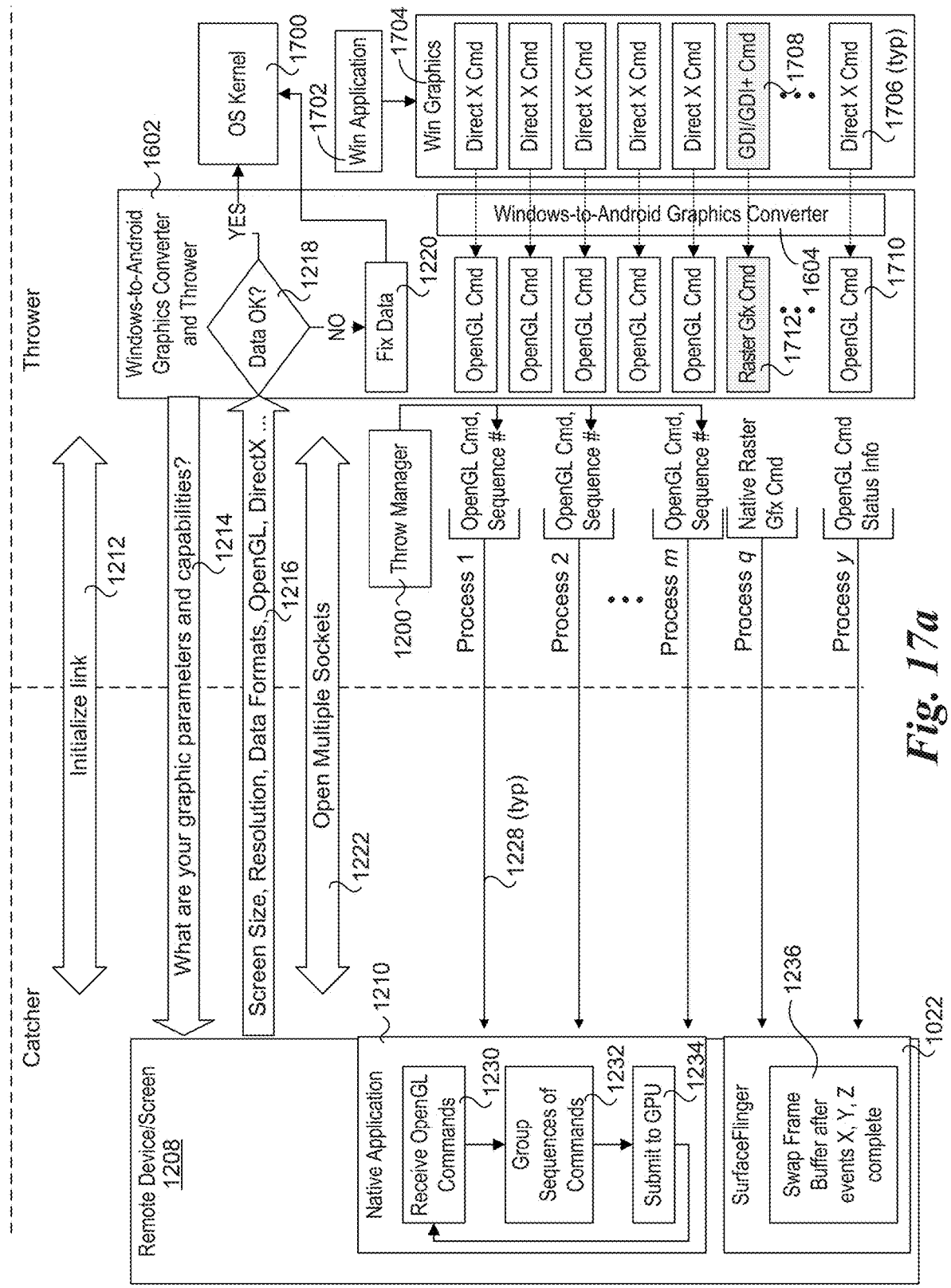
FIG. 17a is a combination schematic and message flow diagram illustrating an embodiment that throws native Android graphics commands and content from a Windows host device to a remote Android device using multiple sockets, wherein native Windows graphic commands and content are converted to Android graphics commands and content on the Windows host device.
Figure 17B:
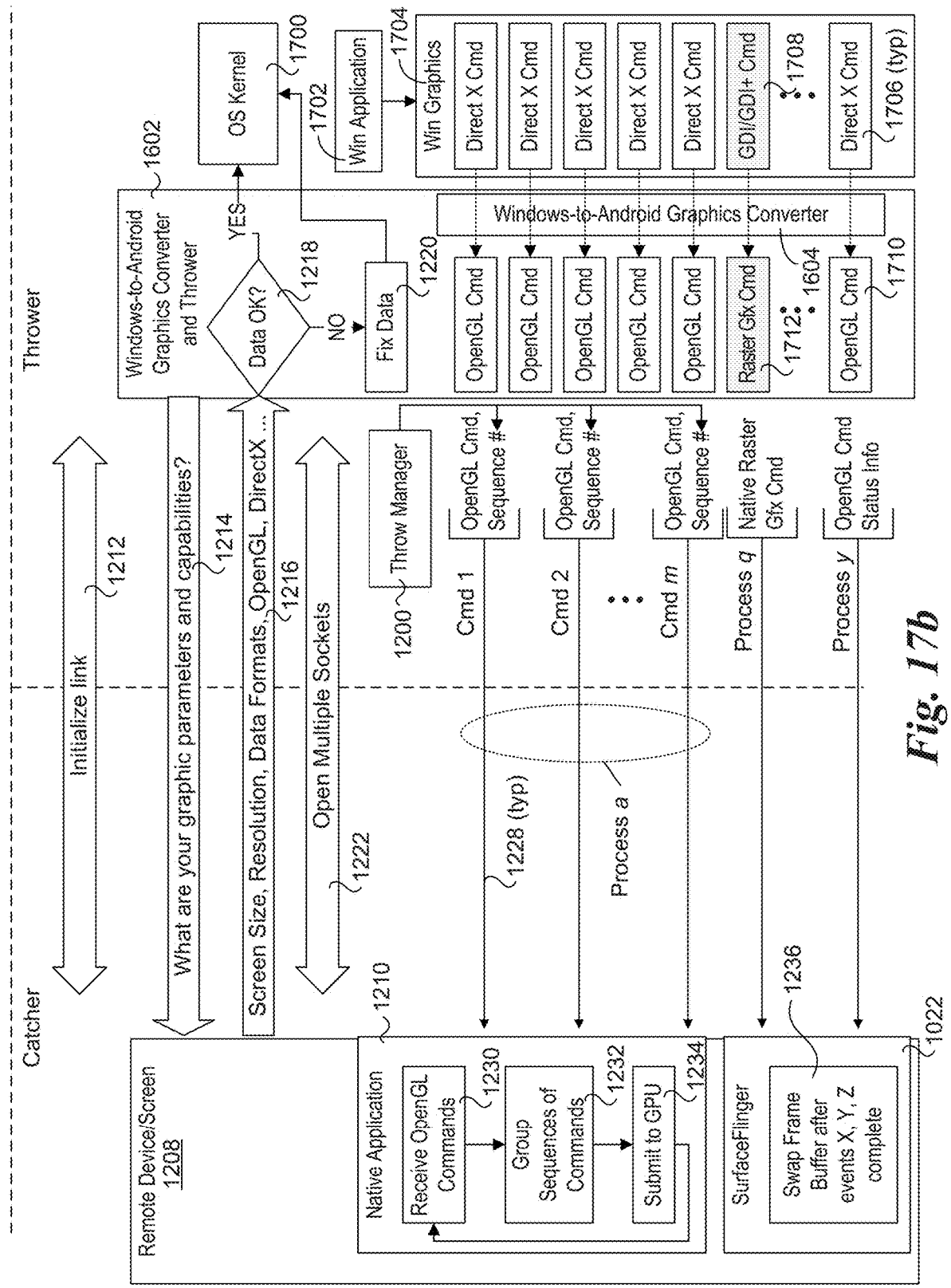
FIG. 17b is a combination schematic and message flow diagram illustrating an alternative configuration to that shown in FIG. 12a under which OpenGL graphic commands are sent using a single socket.

FIGS. 17*a* and 17*b* show alternative embodiments for setting up a link and throwing native Android graphic commands and content in accordance with the embodiment of FIG. 16. As depicted by like-numbered components in FIGS. 12*a*, 12*b*, 17*a*, and 17*b*, many of the components in FIGS. 17*a* and 17*b* are similar to those discussed above with reference to FIGS. 12*a* and 12*b*. In addition to these components, FIG. 17*a* shows a Windows-to-Android Graphics Converter and thrower 1602 including a Windows-to-Android graphics converter 1604, an OS kernel 1700, a Windows application 1702, and Windows graphics commands 1704 including DirectX commands 1706 and GDI/GDI+ commands 1708.

Windows-to-Android graphic converter is configured to convert Direct X commands 1706 into OpenGL commands 1710 and GDI/GDI+ commands 1708 into native Android native raster graphics commands 1712 (e.g., Skia commands) in the manner described above with reference to FIG. 16. The OpenGL commands 1710 and Android native raster graphics commands are then sent to remote device/screen 1208 in a similar manner to that described above for FIGS. 12*a* and 12*b*, wherein the embodiment of FIG. 17*a* uses multiple sockets to transport OpenGL commands 1710, while the embodiment of FIG. 17*b* uses a single socket.

Figure 18:
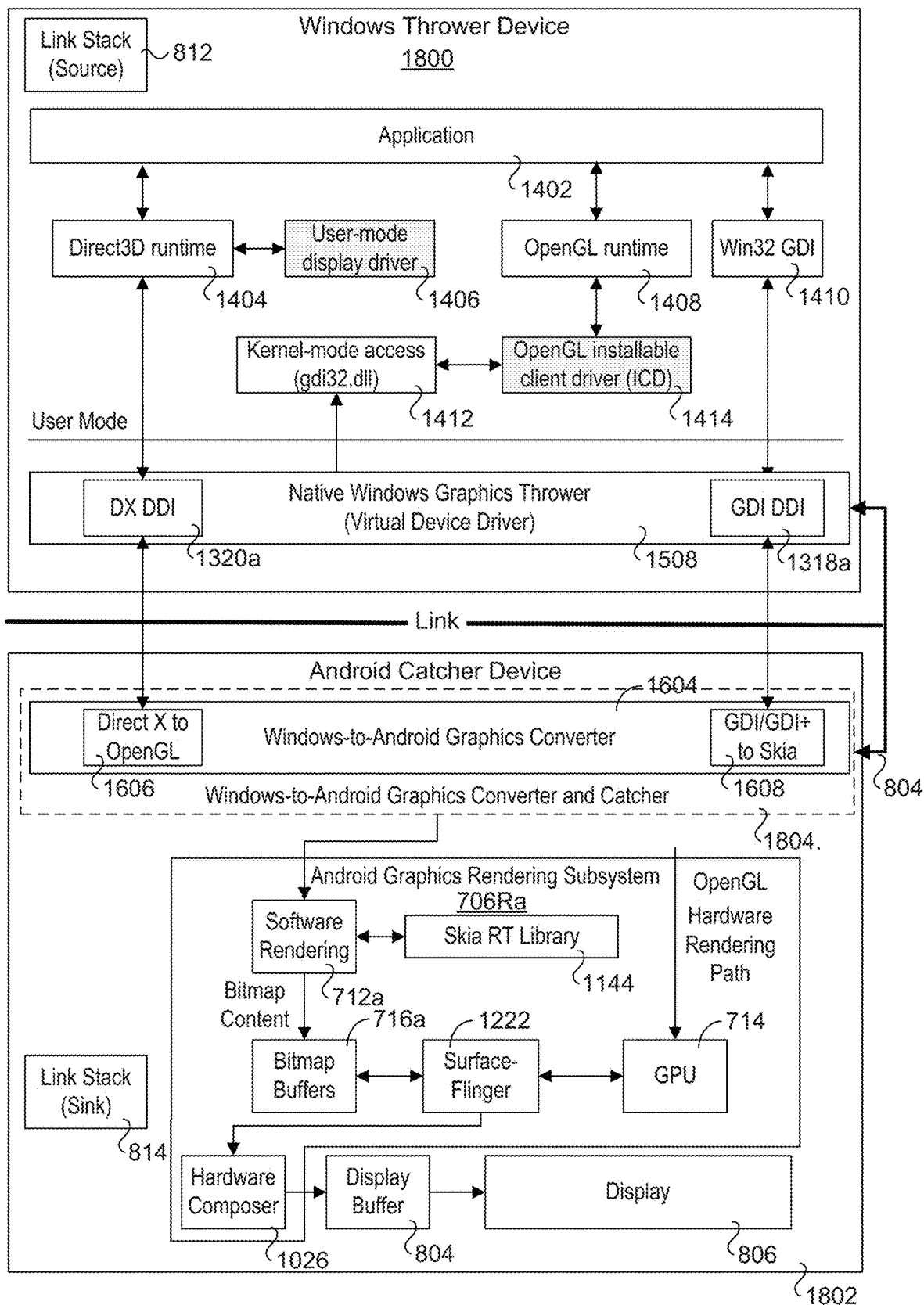
FIG. 18 is a block schematic diagram illustrating an embodiment of a Windows graphics thrower-Android graphics catcher architecture under which native Windows graphics commands and content are converted to native Android graphics commands and content on the Android catcher device.

As an alternative to having the Windows-to-Android graphics command and content conversion done on the thrower, in one embodiment these operations are performed by the catcher. An exemplary implementation of this approach is shown in FIG. 18, wherein a Windows thrower device 1800 throws DirectX and GDI/GDI+ graphics commands and content to an Android Catcher device 1802 that includes a Windows-to Android graphics converter and catcher 1804. This component includes the same Windows-to-Android graphics converter 1604 as shown in FIG. 16, except that now the Windows-to-Android graphics converter is on the catcher device rather than the thrower device.

Display and Interaction of Windows Applications on Android Device

As discussed above with reference to FIGS. 1 and 2, Android device 102 is configured to enable a user to view and interact with Windows applications 132, while also functioning supporting conventional Android applications and functionality. In one embodiment this is facilitated through the use of Windows remote desktop components, including Android remote desktop client 146 GPU and a remote desktop server 1900 that is a component in Windows OS 126, as shown in FIG. 19.

Windows remote desktop employs a server-client model under which the server captures windows display content on a "remote" computer the server is implemented in, and sends this remote display content to a remote desktop client application that is running on a "local" host computer, which renders the remote display content. To enable a user to interact with the remote computer, the remote desktop client detects user inputs made via the remote desktop client application on the local computer, converts those into corresponding input device commands/events, and sends them to the remote desktop server on the remote computer. The remote desktop server then provides the inputs to Windows OS 126 as if the inputs were made by one or more input devices coupled to the remote computer. Thus, a user is enabled to view and interact with Windows applications running on a remote computer.

Figure 19A:
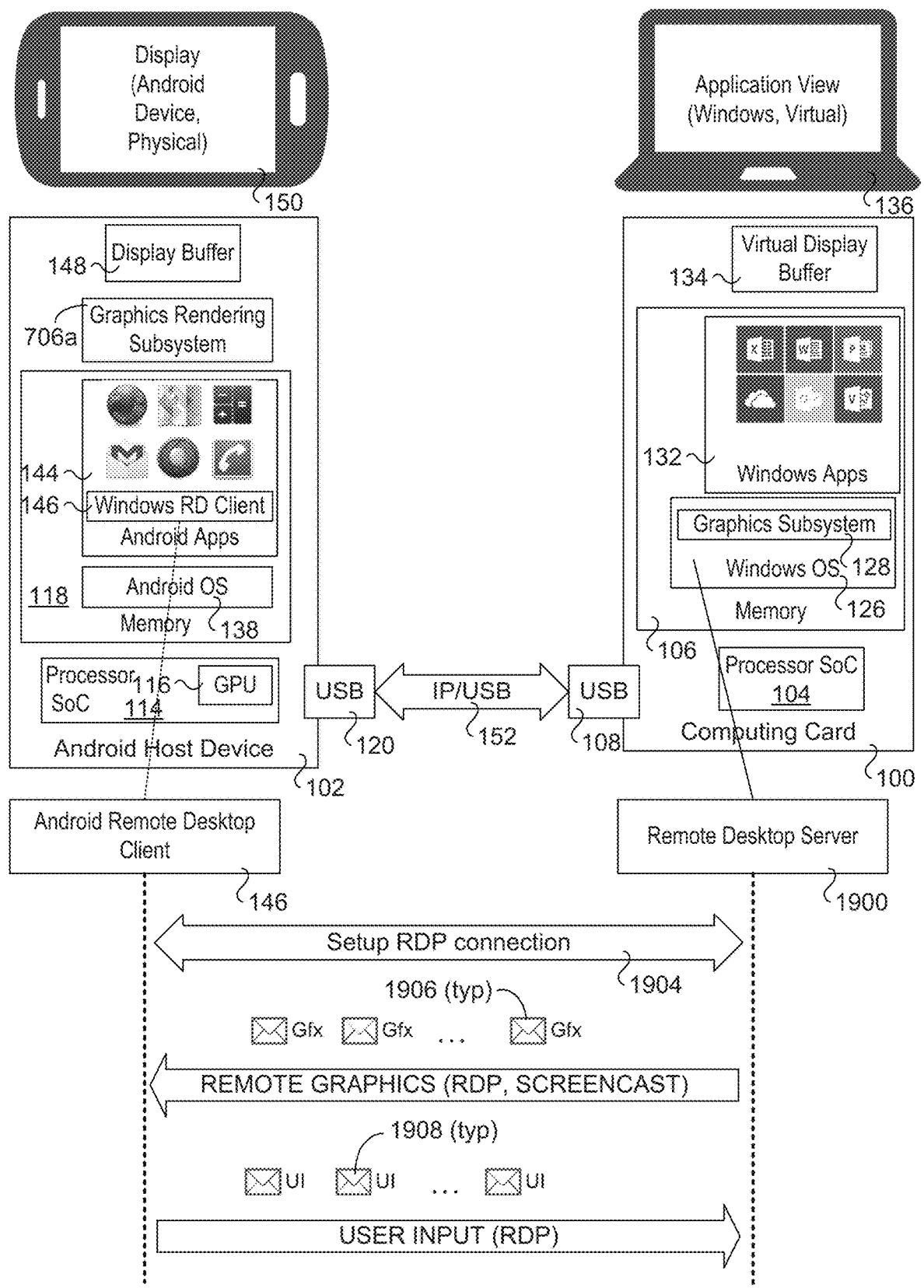
FIG. 19a is a combination block schematic and message flow diagram illustrating an embodiment of an integrated Android and Window device that uses a remote desktop server and client to enable users to access Windows applications via an Android host device.

A similar paradigm is implemented in the embodiment of FIG. 19. However, in this instance, the remote computer is computing card 100, which is physically co-located with Android host device 102. In addition, since computing card 100 does not have a physical display, a virtual display is used instead, including a virtual display buffer 134.

Under the conventional Windows remote desktop implementation (as currently implemented), display content generated by the remote server host computer comprises frames of display content that are dynamically captured, compressed using a video codec to generate a bitstream that is encapsulated in a sequence of packets and sent to the remote desktop client application. Upon receipt by the RD client's host, the encoded bitstream is de-encapsulated, and decoded to extract the original frames, which are then rendered by the RD client application through use of the RD client's host.

In one embodiment, RD client 146 comprises an Android RD client that has been developed by Microsoft to enable users of Android devices to access remote Windows computers. Accordingly, in this embodiment, Android RD client 146 and remote desktop server 1900 are implemented in the convention manner.

The process begins by setting up a remote desktop protocol (RDP) connection 1902. RDP is a well-known protocol that is publicly available and implemented by Microsoft, as well as other software companies. For example, there are a number of RD clients that interact with a Microsoft RD server that have been developed, including RD clients that run on Android. When using RD servers and clients that have both been developed by Microsoft, facilities for setting up an RDP connection are already implemented.

Once RDP connection 1902 is established, remote desktop server 1900 may begin sending frames of display content as a stream of graphics packets 1904 to Android RD client 146. The original frames are regenerated by Android RD client 146, which issues Android graphics commands to Android graphics rendering subsystem 706*a*, which then renders the frames, thus replicating the appearance of the Windows interface on the remote computer/device. As stated above, in the implementation shown in FIG. 19 (and others herein), the Windows interface and application display content is "displayed" to virtual display buffer 134, and the frames of display content are captured from this display buffer.

To enable user interaction with RD servers 1900'*s* host (computing card 100), Android RD client 146 captures user inputs to its application and converts the user input into corresponding Windows input device commands and events. These commands and events are then sent to RD server 1900 via RDP connection 1902, as depicted by a sequence of UI packets 1908. Once received, RD server 1900 submits the UI commands/events to Windows OS 126, which takes appropriate actions.

Figure 20:
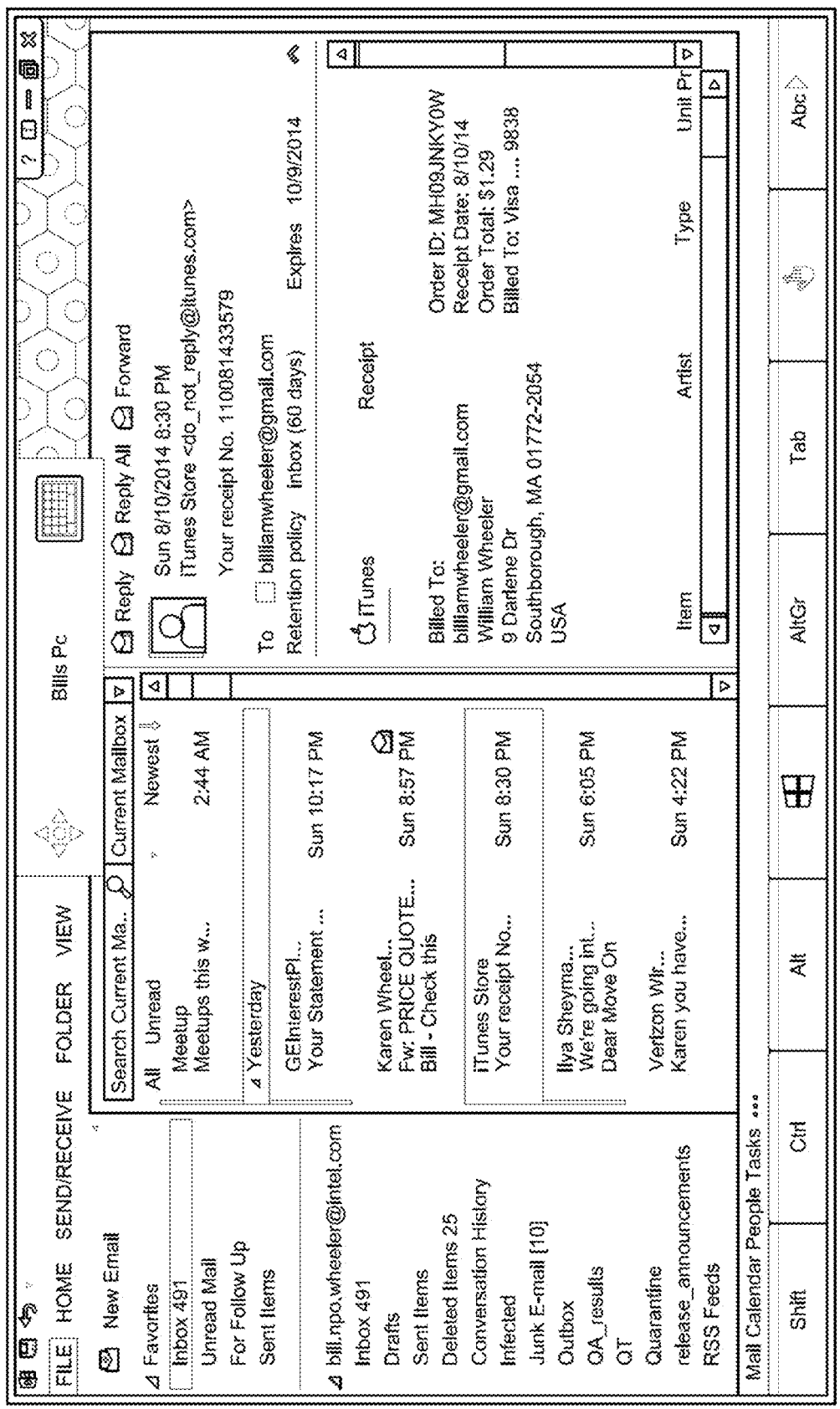
FIG. 20 shows an exemplary screen shot of a Windows application running on an Integrated Android/Windows device.

FIG. 20 shows an exemplary screen display of a Windows operating system and application that is running on a computing card 100 that is coupled to the processor board of an Android Smartphone via its micro-USB connector. As discussed above, this is facilitated through the use of Android RD client 146, and what is display in FIG. 20 is the Android RD client 146 application running on the Android Smartphone. In this particular example, the Windows application is Microsoft Office Outlook, but essentially any Windows application that can run on computing card 100 can be displayed and interacted with in a similar manner.

Figure 21A:
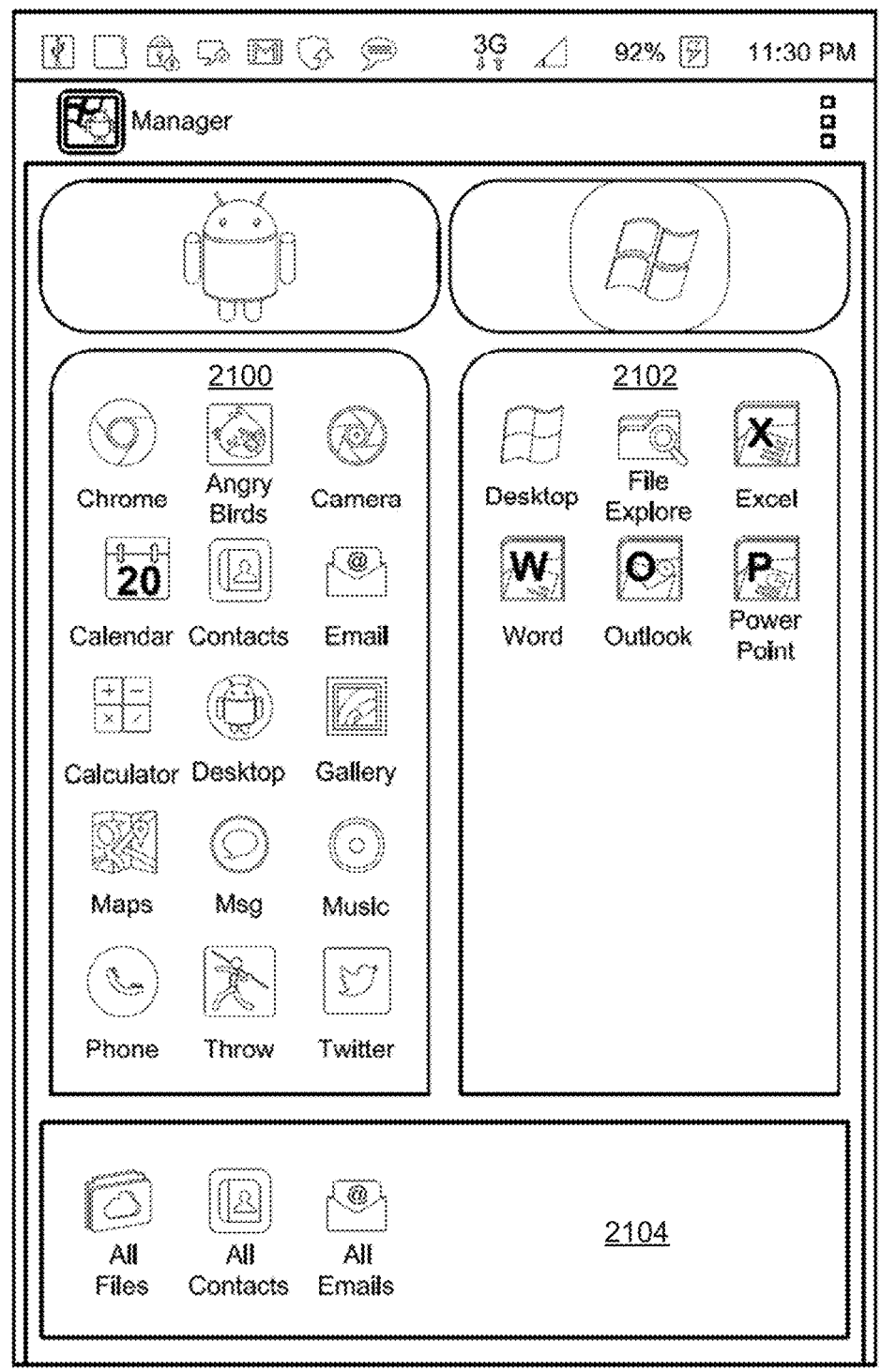
FIGS. 21a and 21b respectively depict portrait and landscape displays of a unified interface with multiple panels including a first panel having Android applications, a second panel having Windows application, and a third panel showing combined file, contact, and email folders.
Figure 21B:
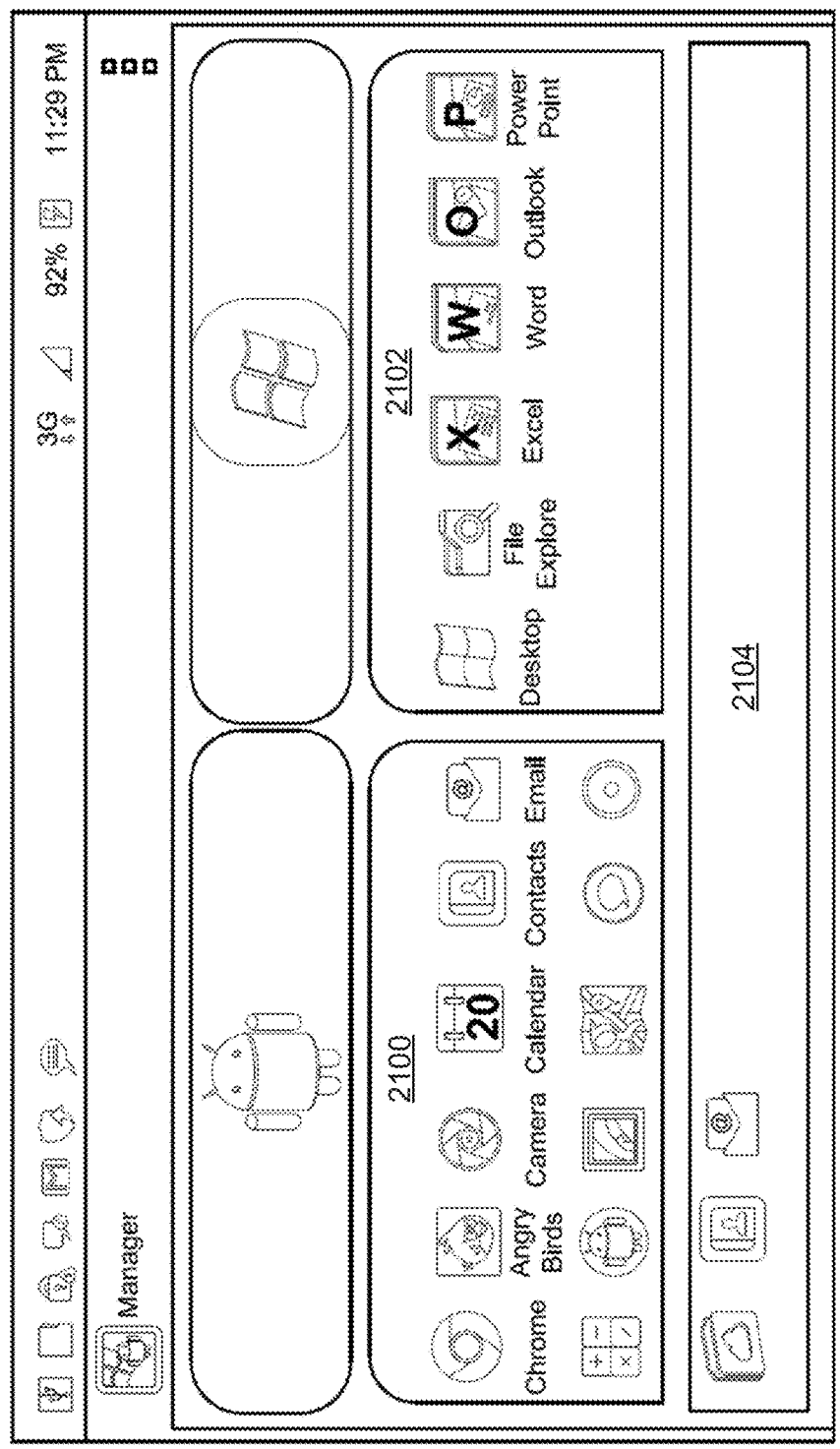

In accordance with further aspects of some embodiments, a unified interface is provided that simultaneously enables access to both Android and Windows applications. Examples of the unified interface are shown in FIGS. 21*a* and 21*b*. As illustrated, the unified interface includes a panel 2100 of Android applications, and a panel 2102 of Windows applications. In addition, a third panel 2104 contains icons for accessing aggregations of files across both operating systems, including all files, all contacts, and all e-mail.

While Windows remote desktop has been successfully used for many years, its performance leaves something to be desired for some classes of applications, particularly those with a high-level of motion. The reason for this is two-fold. As discussed above, Windows remote desktop using a screen-casting approach where frames of display content are captured, converted into a video stream format, sent over a link, and processed by the remote desktop client to regenerate the frames. Thus, the content that is transferred is essentially rasterized content that has been compressed, which is relatively inefficient when compared with native graphics commands. The second consideration relates to how the frames are generated.

When the Windows application is not a video, remote desktop uses a difference or "diff" approach. Under this technique, content comprising the difference between frames is periodically generated. This results in a very apparent lag for application with a fair degree of motion of more. Essentially, portions of frames may be generated in a given diff, and raster content for an entire frame may be periodically transmitted. Under this approach, Microsoft does not attempt to match the refresh rate of the receiving device, or even come close to it, and the amount of data transferred, even when compressed, would be overwhelming.

As a comparison, consider how video streaming works. At a basic level, streaming video content is played-back on a display as a sequence of "frames" or "pictures." Each frame, when rendered, comprises an array of pixels having dimensions corresponding to a playback resolution. For example, full HD (high-definition) video has a resolution of 1920 horizontal pixels by 1080 vertical pixels, which is commonly known as 1080p (progressive). In turn, the frames are displayed at a frame rate, under which the frame's data is refreshed (re-rendered, as applicable) at the frame rate. It is noted that many of today's Smartphones and tables have screen pixels resolutions of 1920×1080, or even higher.

At a resolution of 1080p, each frame comprises approximately 2.1 million pixels. Using only 8-bit pixel encoding would require a data streaming rate of nearly 17 million bits per second (mbps) to support a frame rate of only 1 frame per second if the video content was delivered as raw pixel data. Since this would be impractical, video content is encoded in a highly-compressed format.

Still images, such as viewed using an Internet browser, are typically encoded using JPEG (Joint Photographic Experts Group) or PNG (Portable Network Graphics) encoding. The original JPEG standard defines a "lossy" compression scheme under which the pixels in the decoded image may differ from the original image. In contrast, PNG employs a "lossless" compression scheme. Since lossless video would have been impractical on many levels, the various video compression standards bodies such as the Motion Photographic Expert Group (MPEG) that defined the first MPEG-1 compression standard (1993) employ lossy compression techniques including still-image encoding of intra-frames ("I-frames") (also known as "key" frames) in combination with motion prediction techniques used to generate other types of frames such as prediction frames ("P-frames") and bi-directional frames ("B-frames"). Similarly, H.264 also employs I-frames, P-frames, and B-frames, noting there are differences between MPEG and H.264, such as how the frame content is generated.

While video and still-image compression algorithms share many compression techniques, a key difference is how motion is handled. One extreme approach would be to encode each frame using JPEG, or a similar still-image compression algorithm, and then decode the JPEG frames to generate frames at the player. JPEGs and similar still-image compression algorithms can produce good quality images at compression ratios of about 10:1, while advanced compression algorithms may produce similar quality at compression ratios as high as 30:1. While 10:1 and 30:1 are substantial compression ratios, video compression algorithms can provide good quality video at compression ratios up to approximately 200:1. This is accomplished through use of video-specific compression techniques such as motion estimation and motion compensation in combination with still-image compression techniques.

For each macro block in a current frame (typically an 8×8 or 16×16 block of pixels), motion estimation attempts to find a region in a previously encoded frame (called a "reference frame") that is a close match. The spatial offset between the current block and selected block from the reference frame is called a "motion vector." The encoder computes the pixel-by-pixel difference between the selected block from the reference frame and the current block and transmits this "prediction error" along with the motion vector. Most video compression standards allow motion-based prediction to be bypassed if the encoder fails to find a good match for the macro block. In this case, the macro block itself is encoded instead of the prediction error.

It is noted that the reference frame isn't always the immediately-preceding frame in the sequence of displayed video frames. Rather, video compression algorithms commonly encode frames in a different order from the order in which they are displayed. The encoder may skip several frames ahead and encode a future video frame, then skip backward and encode the next frame in the display sequence. This is done so that motion estimation can be performed backward in time, using the encoded future frame as a reference frame. Video compression algorithms also commonly allow the use of two reference frames—one previously displayed frame and one previously encoded future frame.

Video compression algorithms periodically encode intra-frames using still-image coding techniques only, without relying on previously encoded frames. If a frame in the compressed bit stream is corrupted by errors (e.g., due to dropped packets or other transport errors), the video decoder can "restart" at the next I-frame, which doesn't require a reference frame for reconstruction.

Figure 22:
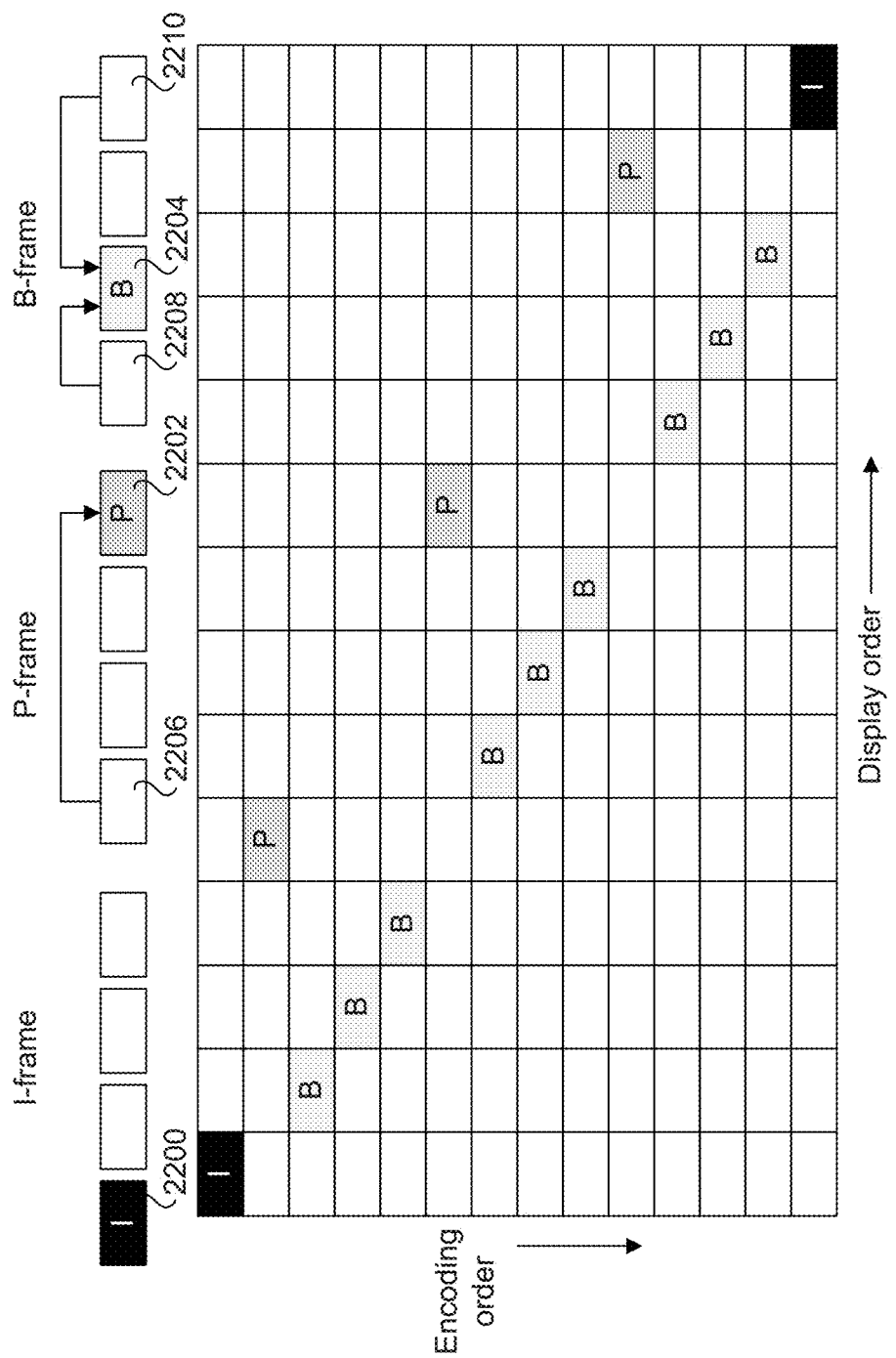
FIG. 22 is a diagram illustrating an encoding order and playback order of a sequence of I-frames, P-frames, and B-frames.

FIG. 22 shows an exemplary frame encoding and display scheme consisting of I-frames 2200, P-frames 2202, and B-frames 2204. As discussed above, I-frames are periodically encoded in a manner similar to still images and are not dependent on other frames. P-frames (Predicted-frames) are encoded using only a previously displayed reference frame, as depicted by a previous frame 2206. Meanwhile, B-frames (Bi-directional frames) are encoded using both future and previously displayed reference frames, as depicted by a previous frame 2208 and a future frame 2210.

The lower portion of FIG. 22 depicts an exemplary frame encoding sequence (progressing downward) and a corresponding display playback order (progressing from left to right). In this example, each P-frames is followed by three B-frames in the encoding order. Meanwhile, in the display order, each P-frame is displayed after three B-frames, demonstrating that the encoding order and display order are not the same. In addition it is noted that the occurrence of P-frames and B-frames will generally vary, depending on how much motion is present in the captured video; the use of one P-frame followed by three B-frames herein is for simplicity and ease of understanding how I-frames, P-frames, and B-frames are implemented.

Without even considering H.264 processing latencies, the fact that H.264 I-frames, P-frames, and B-frames are encoded in a different order than they are played back necessitates significant latencies. For example, at a nominal frame rate of 30 frames per second (fps), a high-motion section of video may require P-frames that are processed by considering 15 or more prior frames. This results in a latency just at the H.264 encoder side of ½ second or more. Adding the latencies resulting from additional processing operations may yield a delay of more than one second, or even several seconds for sources that support lower frame rates (e.g., 15 fps) and/or higher-resolution content. Such latencies, as well as noticeable artifacts in the playback display content are exacerbated for high-motion content. As a result, using conventional remote desktop techniques are impractical for remote display of content requiring real-time feedback, such as gaming applications.

Figure 19B:
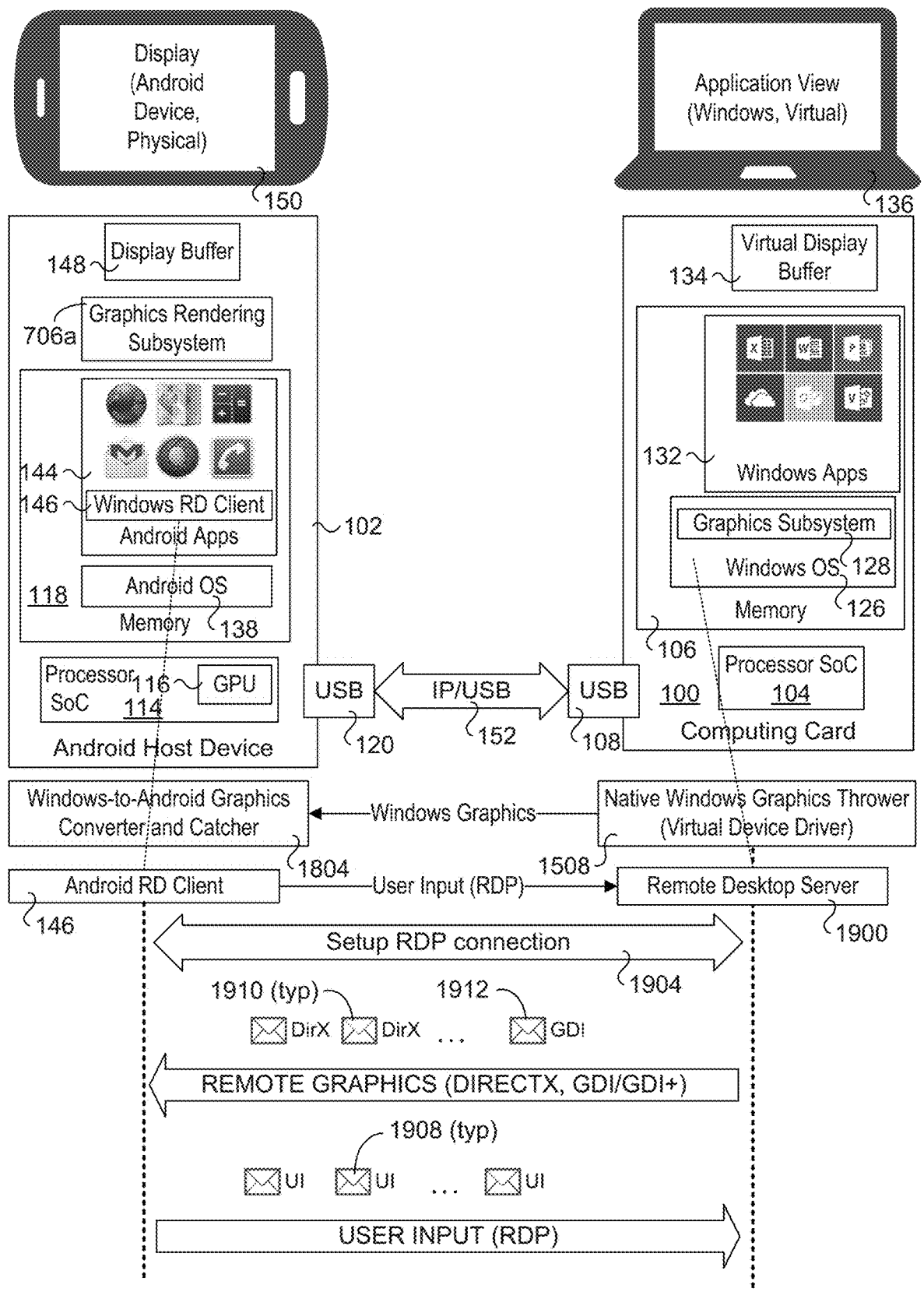
FIG. 19b is a combination block schematic and message flow diagram illustrating a first alternative implementation under which native Windows graphics commands and content are thrown from a computing card hosting a Windows operating system.
Figure 19C:
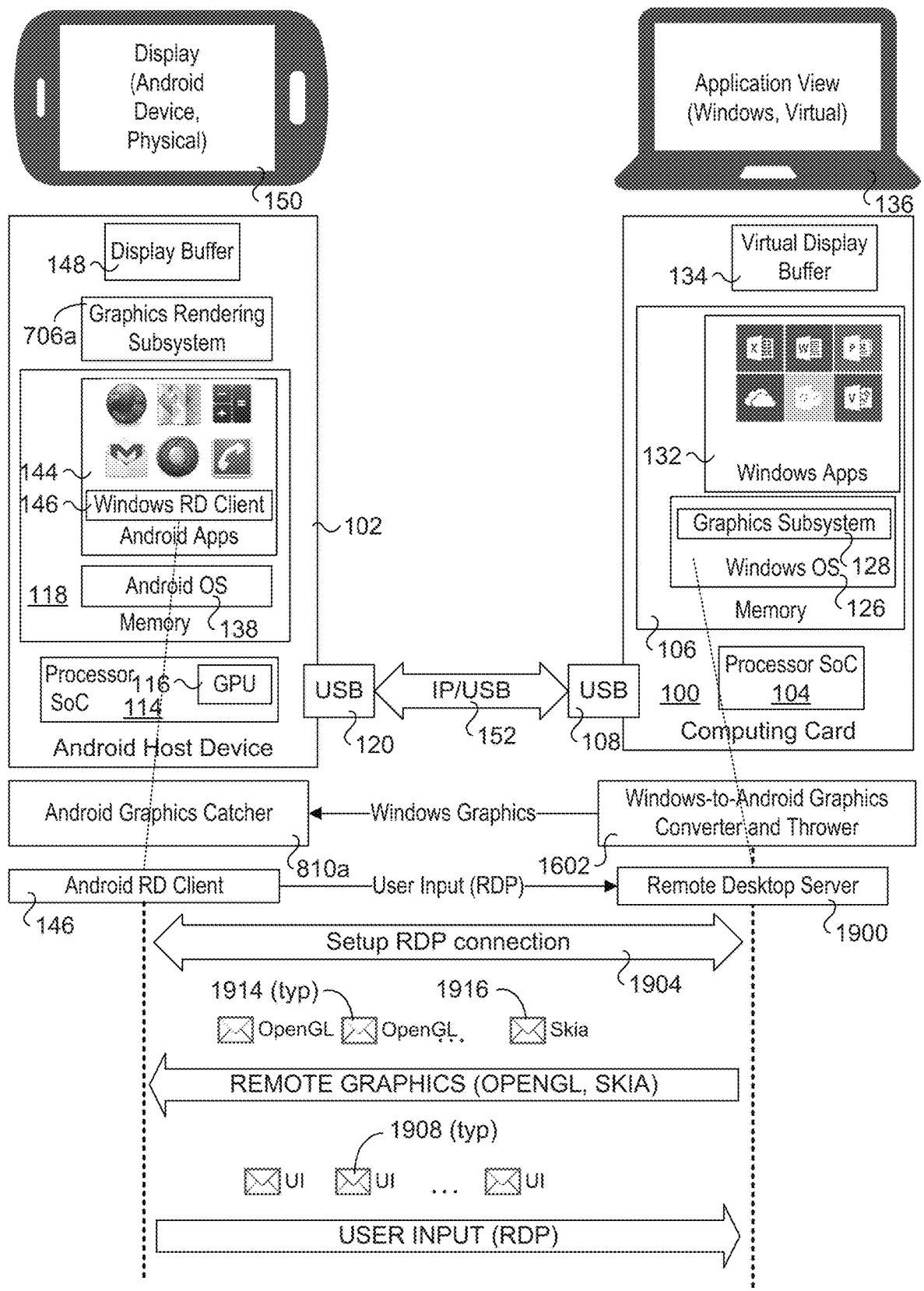
FIG. 19c is a combination block schematic and message flow diagram illustrating a second alternative implementation under which native Windows graphics commands are converted into Android graphics commands and content on the computing card and are thrown to an Android graphics catcher implemented on the Android host device.

These foregoing deficiencies are addressed by the embodiments in FIGS. 19*b* and 19*c*, which respectively throw native Windows graphics content and native Android graphics content. Each of these embodiments use a split native graphics/RDP user input scheme, wherein native graphics content is thrown using one or more applicable connections, while user input is returned using the conventional RDP scheme for returning user input to remote desktop server 1900.

As shown in FIG. 19*b*, computer card 100 implements native Windows graphics thrower 1508 to throw Windows graphics content comprising DirectX and GDI/GDI+ commands (with associated raster content, as applicable) to a Windows-to-Android graphics converter and catcher 1804, as depicted by DirectX packets 1910 and GDI packets 1912. It is noted that a given packet may contain one or more graphic commands, and they may be cases where graphics content pertaining to some types of content may be transported using multiple packets (such as a large raster image). Although not shown to reduce clutter, setting up the link and how the native Windows graphics content would be transferred is similar to that shown in FIG. 17*b* and as discussed above.

Under FIG. 19*c*, computer card 100 implements a Windows-to-Android graphics converter and thrower 1602 that throws Android graphics content depicted as OpenGL packets 1914 and Skia packets 1916 to an Android graphics catcher 810*a* on Android host device 102. Although not shown to reduce clutter, setting up the link and how the native Android graphics content would be transferred is similar to that shown in FIG. 17*a* and as discussed above.

Figure 23:
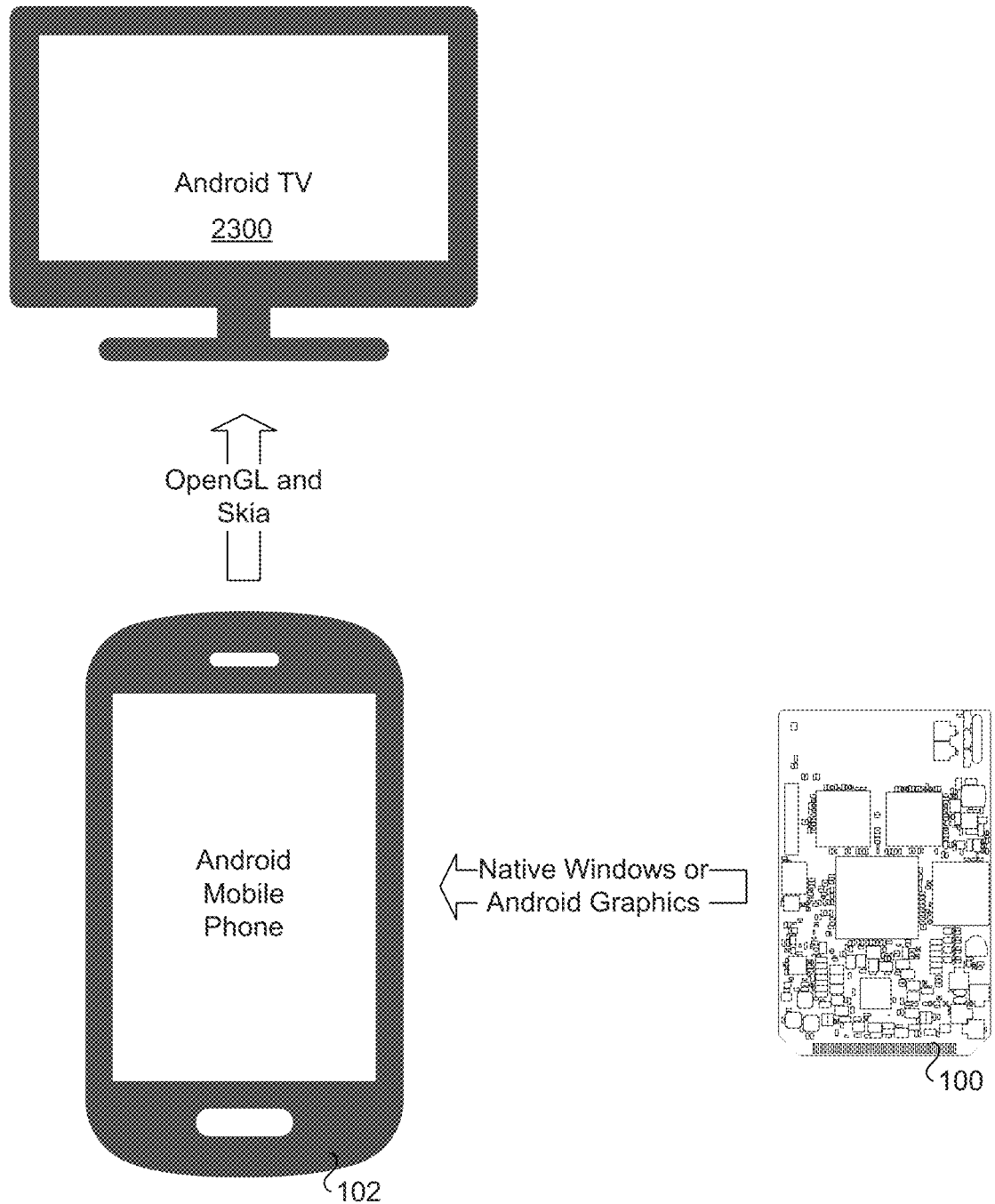
FIG. 23 is a schematic diagram illustrating native Windows or Android graphics being thrown from a computing card to an Android host device, which further is configured to throw Android graphics commands and content to an Android TV.

In addition to throwing native graphics commands and content from a computing card to an Android host device, the Android host device, is further enabled to throw Android graphics commands and content to be remotely displayed. For example, FIG. 23 depicts a configuration under which a computing card 100 throws native Windows or native Android graphics commands and content to an Android host device 102, which, in turns throws native Android graphics commands and content to an Android TV 2300.

Recently, at Google I/O 2014, Google launched Android TV. Android TVs are smart TV platforms that employ Android software developed by Google (in particular, the Android TV platforms run the Android 5.0 ("Lollipop") operating system). The Android TV platform is designed to be implemented in both TVs (e.g., HDTVs and UHDTVs), set-top boxes, as well as streaming media devices, such as Blu-ray players that support streaming media.

Under the Android TV architecture, the Android TV device is configured to receive Chromecast content sent from a Chromecast casting device, which will typically be an Android mobile device or a Chromebook. Under the Chromecast approach, a Chrome browser is implemented on the receiving device and is used to render the Chromecast content. What this means, as applied to one or more Android embodiments discussed herein, is the Android TV devices already have the Android graphics components (both software and hardware components) employed for rendering Android graphics commands and content.

Well-known HDTV and UHDTV manufacturers, including Sony and Sharp, are partnering with Google to implement and offer HDTV and UHDTV platforms in 2015, while Razer and Asus plan to release set-top boxes supporting Android TV in the near future. The first device to employ Android TV is the Nexus Player, co-developed by Google and Asus, and released in November 2014.

Integrated Packaging Examples

Figure 24A:
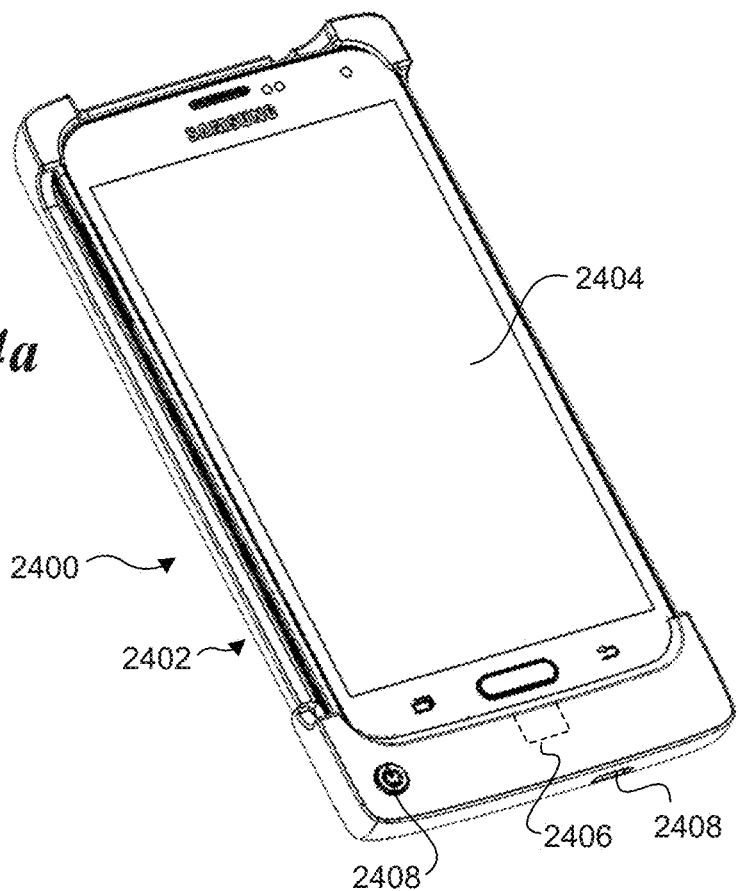
FIGS. 24a and 24b shows an exemplary implementation of an integrated Android/Windows device that includes a backpack in which an Android device is inserted.
Figure 24B:
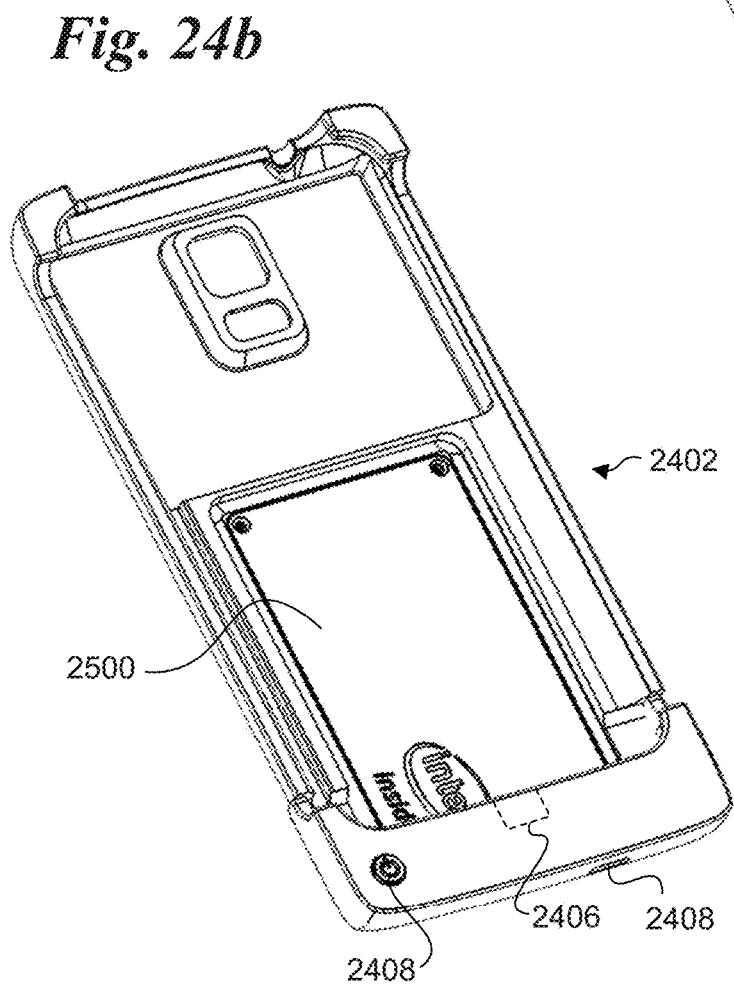

A computing card may be embedded or otherwise communicatively coupled to (the processor board of) and Android device using various packaging schemes. FIGS. 24*a* and 24*b* show an integrated Android/Windows device 2400 including a backpack 2402 in which an Android phone 2404 is installed. Generally, many Android Smartphones include a female micro-USB port that is designed to mate with a male micro-USB connector, such as when charging the Android phone. In one embodiment, a male micro-USB connector 2406 is disposed within the bottom portion of backpack 2402 and is configured to mate with a female micro-USB port on Android phone 2404. In addition, backpack 2402 further includes a female micro-USB port 2408 and a power button 2510. Female micro-USB port 2408 is coupled internally to male micro-USB connector 2406, thus enabling charging and tethering of Android phone 2404 when it is installed in backpack 2402.

In some embodiments, a processor board such as processor board 300 of FIG. 3 may be housed within a backpack, with internal connectors and wiring that couples components on the processor board to whatever connector is used to couple to the Android device. Thus, in some embodiments, a backpack may include a built-in processor board that physically mounted to the backpack.

Figure 25A:
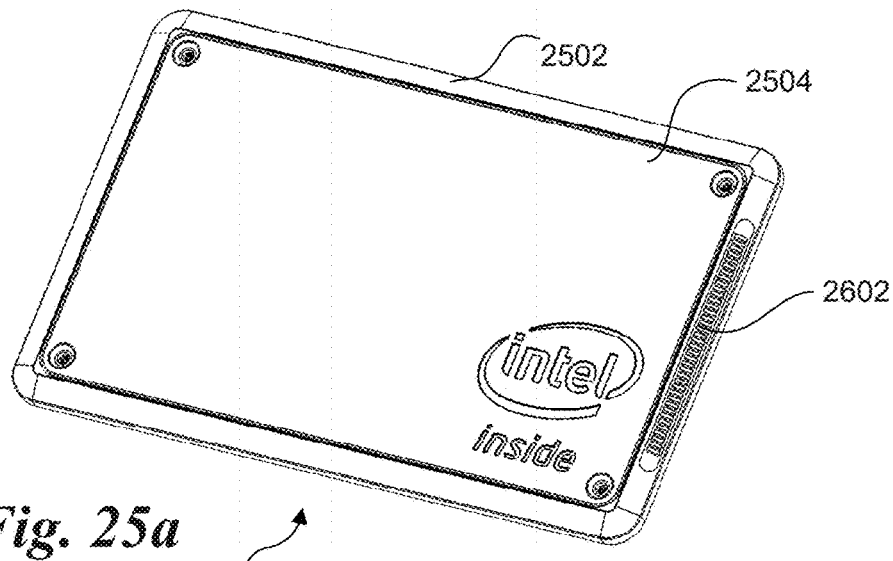
FIGS. 25a, 25b, and 25c show exemplary views of a computing card, according to one embodiment.
Figure 25B:
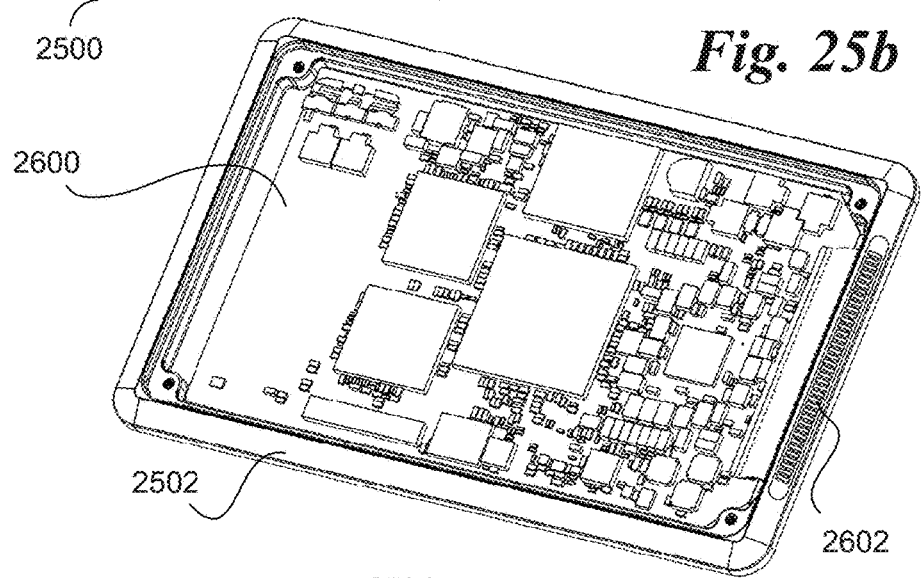
Figure 25C:
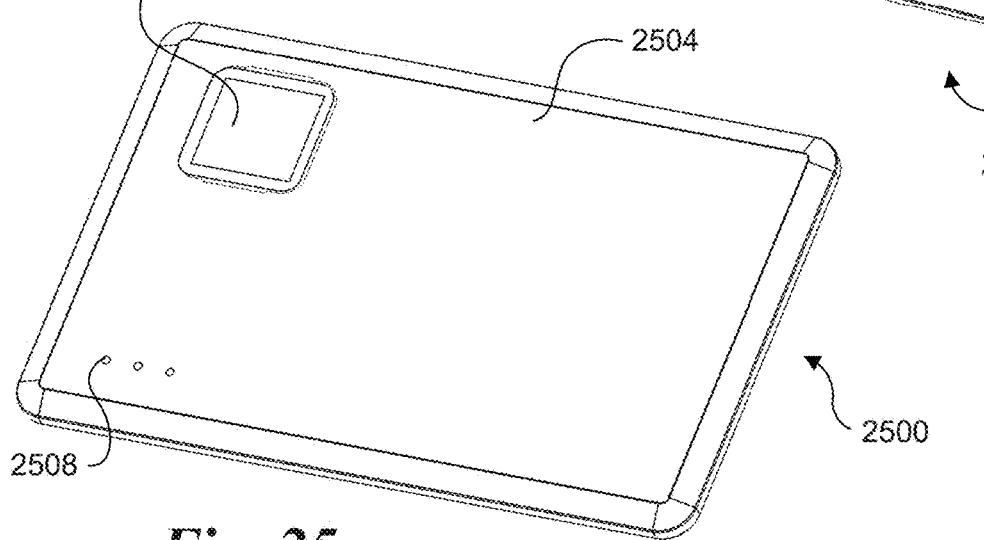
Figure 26:
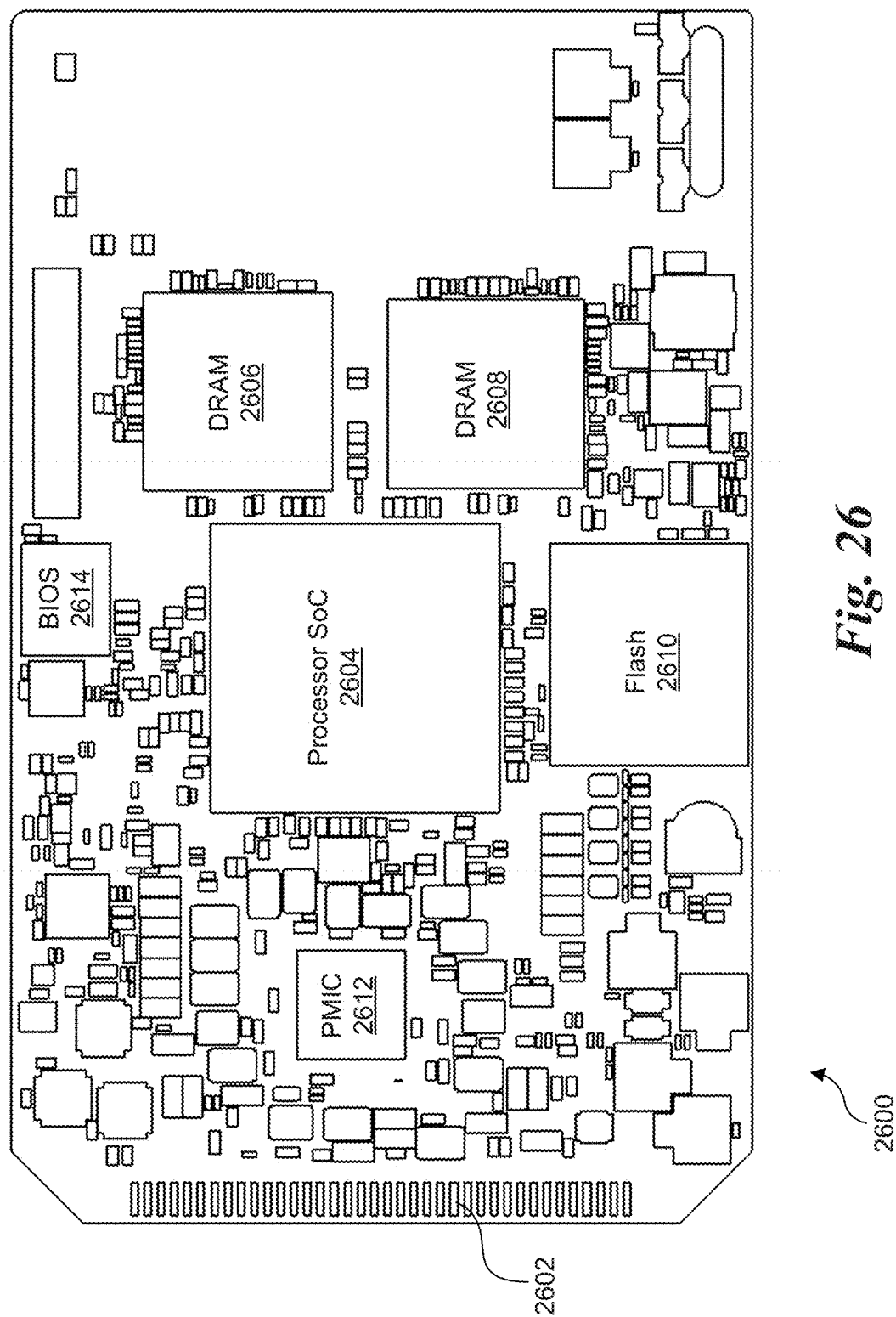
FIG. 26 shows an embodiment of a processor board that is suitable for use in the computing card of FIGS. 24b, and 25a-25c.

In other embodiments, a processor board may be disposed within a housing, such as depicted by computing card 2500 of FIGS. 25*a*, 25*b*, and 25*c*. The packaging for computing card 2500 includes a housing comprising a housing shell 2502 to which a cover plate 2504 is mounted. As shown in FIG. 25*b*, a processor board 2600 is disposed within the housing, and includes an edge connector 2602 that is externally accessible (i.e., no disposed in the housing). As shown in FIG. 25c, in one embodiment computing card 2500 includes a button 2506 and optional LEDs 2508. In one embodiment, computing card 2500 is disposed within backpack 2402, and its edge connector 2602 is coupled to a mating connector disposed within the lower portion of backpack 2402 (not shown). In an alternative configuration, a computing card may be inserted into the back of a backpack or similar device, allowing the computing card to be removed from the backpack without requiring removal of the Android phone from the backpack. Under various options, a backpack may include additional resources, such as a battery and associated battery power supply and charging circuitry. In addition, the computing card itself may include a battery FIG. 26 shows one embodiment of a processor board 2600 that is used in computing card 2500. Processor board 2600 includes an edge connector 2602 that is use to provide an I/O signal and voltage interface with other components. Processor board 2600 further includes a processor SoC 2604, a pair of DRAM chips 2606 and 2608, non-volatile storage comprising a flash chip 2610, a Power Management Integrated Circuit (PMIC) chip 2612, and a BIOS chip 2614. In addition, a processor board would include various other components and circuit elements that are well-known to those having skill in the art, and thus are not separately identified.

Little Data Engine

There are various domains where sensors and devices are established or expected to become established. With Google's acquisition of Nest the home automation company, we can expect our homes eventually will be fully-automated and connected to the clouds. Health is another big domain where wearable sensor technologies are being established. Today, most of these health-focused wearables either directly connect to the cloud or rely on an associated smartphone for part of their compute and analysis and as a connectivity medium to the cloud. Automotive IVI and vehicle efficiency is another domain where more and more companies are announcing cloud connectivity and offer to monitor various critical parameters in real time (traffic, vehicle critical operating sensors) and help users with various offers and utilities. Retail and order payment is another big domain for data collection and analytics.

Although many States are working to draft standard privacy policy for cloud computation based organizations, there is still lack of awareness and implementation of these policies, (even when they exist). Sensors and cloud connectivity have major privacy, flexibility and fairness constraints. The current industry approaches have favored functionality over privacy and security.

Collecting the data from sensors and devices in a secure way is a challenging task. Today, most of the devices push their data either to some central point (such as an associated smartphone, home gateway, etc.) Using wireless connection (e.g. BLUETOOTH) or directly talk to the cloud (e.g., Google glass) using a mobile network. Much of the data transfer happens in unencrypted form. Direct cloud connectivity requires high power consumption from the device. Also, it requires every device to have one unique internet connection. On the other hand, the central point connection (gateway model) only requires one internet connection for multiple devices and can employ a low power sensor network to connect to the gateway, hence consumes less power per device. Encryption exerts power, performance and cost taxes on the sensors.

Most of the data is stored in the cloud for two reasons: universal access and data mining. More questions have recently been asked about the privacy of the data such as: (a) who can use the data; and (b) what data can be seen by the outside community. Some of this data is very sensitive and exploitation can lead to misuse and great financial loss. An individual's health data is an example is one of the most private of data, which requires careful access control. The biggest challenge for medical industry is to mine the health data without seeing it. Some proposals for anonymous data mining have been made by both well-known and lesser-known companies and organizations. However, effectiveness of these systems still needs to be validated.

In most of these cases, not all the data must be put into the public domain in unencrypted form. For example, drivers of automobiles don't want to share their driving speed records and car maintenance records to the public domain. Many people are reluctant to share their brand preferences, recognizing this type of information is often abused by marketing companies and the like. Similarly, people may not want to share their dietary and food preferences to the public. The Little Data Engine addresses this issue in a unique manner—by local secure processing.

Data processing can be divided into two categories: First, the processing that combines the sensor data with rest of the community data and then make some interesting and sensible information out from it. For example: how one's electricity bill compares to their neighbors, who presumably are experiencing the same weather. Second, the integration of new local data with Retail, Health, Automobile, and Home previously established data.

Little data combining and integrating is one part of data processing, processing with big data is another. Big data processing can be further divided into two categories: first, local combining and processing. Second, combining with public data and processing. Depending on the user preference, one can opt for local processing on local private data and cloud or remote processing for public data. Unfortunately current systems don't provide such flexibility. All the processing is done in cloud. The Little Data Engine will enable users to opt for local processing and privacy, while providing an open innovation sandbox.

Data recommendation may be in any form, like offers, suggestion, warning etc., to make customers life more convenient. Data recommendations may be used for an individual or at a large level for a region or for community. Data recommendation can be sold to an individual or to interested buyers. The big question raised is whether individuals want to show their recommendation offers to other and let them leverage it. What sort of discretion can an end-user have on it? What sort of discretions can individuals have? Maybe it might be desired to allow some of the mining information to show to the outside community that can indirectly help individuals or groups, while it may be desired to never share other portions with the public. For example one might not want to share his below-average driving experience compared to the outside community, but at the same time want to share his above-average car maintenance record.

Current data architectures present too-many end user concerns and other constraints. Rather, an ideal data ecosystem should provide:

A highly flexible and customizable system from all the interested parties point of view.

End users may change the privacy knob based on different data.

User can change which cloud they want to store and where they want data processing (e.g., local or remote processing).

A highly secure and reliable system that is trustworthy.

Preferably, all parties could trust each other based on the system design of information flow.

Equal stake holders of all the parties to avoid any one of them getting too much attraction.

Users hold their data and may sell it to anyone regardless of whose sensors and device are installed in the personal ecosystem or having a loose binding between device and cloud.

Based on user preference, data can be stored, mined and information can be sold to multiple buyers with no restriction from the user side.

The optimum level of utilization of the connected resource into the system to drive down the cost.

Reduce the internet connection required and thus the power to transfer the data.

Most preferably one device to manage all the sensors in different domains.

Avoid misuse of the mined data in a direct or indirect manner.

All the data should pass through some central device owned and maintained by the user with strict security and preferred configured privacy, flexibility options.

The Little Data Engine (LDE) is a manager for user's sensor cloud connectivity ecosystem that manages data collection, data storage, data processing and data recommendation. It is a central device that an individual owns and maintains. The Engine is fully customizable in terms of privacy and flexibility. Based on the features required and user custom configuration data storage, processing and recommendation can simultaneously done by the LDE and in the cloud, or can be completely done locally in LDE in a user preferred defined way. The LDE respects the end-user preferences and discretions. It allows the user to connect to the various cloud as a data storage, data miner or information buyers and thus drives the fair competition to ensure optimum resource utilization and cheap solution delivery to the community.

The LDE architecture is designed to give users the maximum flexibility in terms of features, management and privacy of the system. This is supported through one engine to manage all of a user's sensors and devices. The architecture also is highly flexible in terms of privacy and features, enabling users to tailor the LDE to fit their needs. The LDE also supports offline features and functionality, enabling it to be used in unconnected environments.

Figure 27:
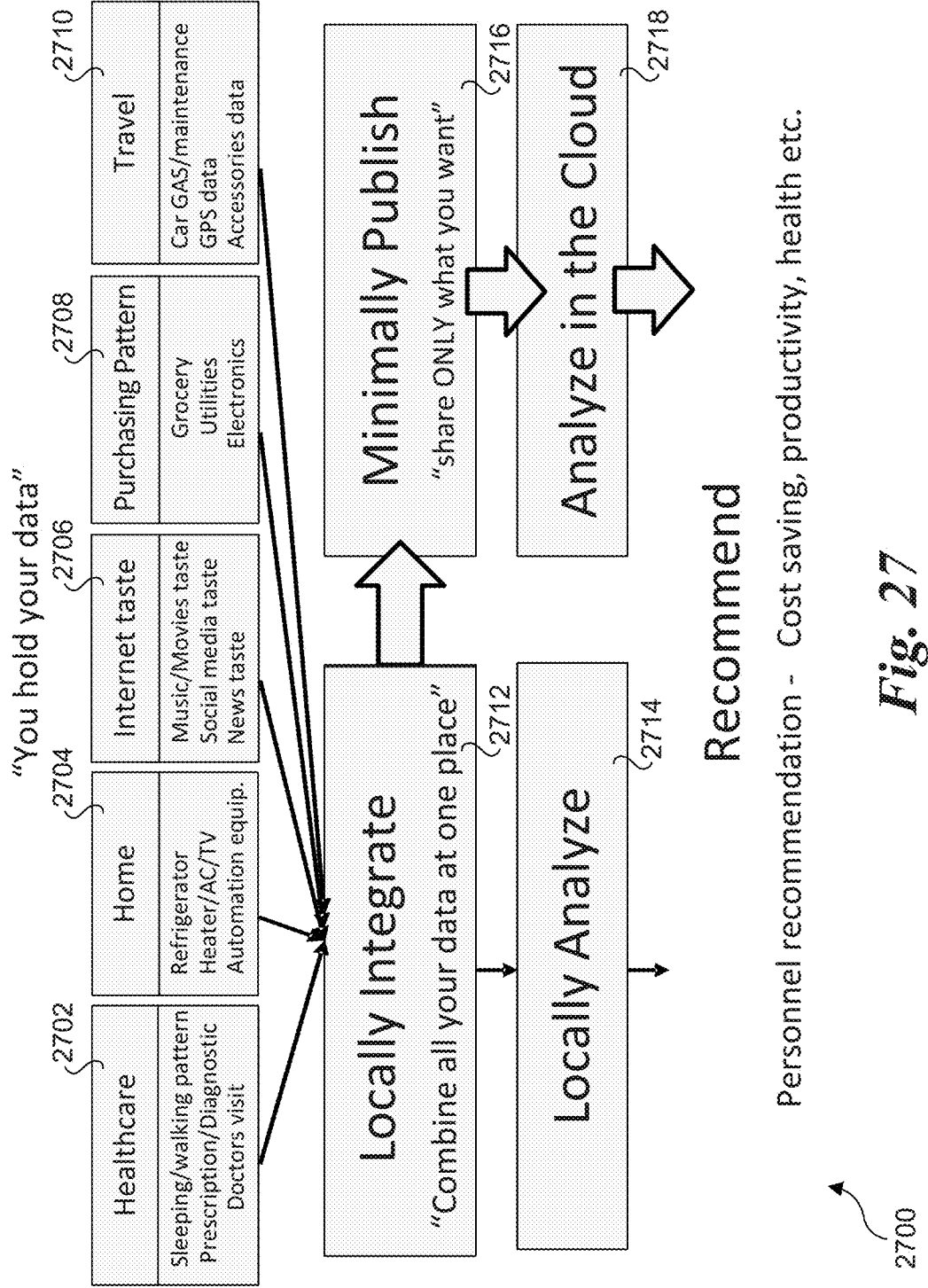
FIG. 27 is a block schematic diagram illustrating a high-level overview of selected components in a Little Data Engine (LDE) architecture, according to one embodiment.

FIG. 27 shows a high-level overview of selected components in an LDE architecture 2700, according to one embodiment. An exemplary sets of data are depicted at the top of architecture 2700, including healthcare data 2702, home data 2704, Internet taste data 2706, purchasing pattern data 2708, and travel data 2710. It will be understood that these are merely a handful of types of data that may be stored by an LDE.

As shown by a locally integrate 2712, all of the data corresponding to healthcare data 2702, home data 2704, Internet taste data 2706, purchasing pattern data 2708, and travel data 2710 and integrated in one place, e.g., on the one device. Local analysis on the data may be performed by a locally analyze block 2714, which may result in one or more personal recommendations, as described below in further detail A user may also choose to share selected data with others and/or various data services, such as cloud-hosted data services. This is supported by a block 2716 labeled "minimally publish" and a block 2718 labeled analyze in the cloud.

Figure 28:
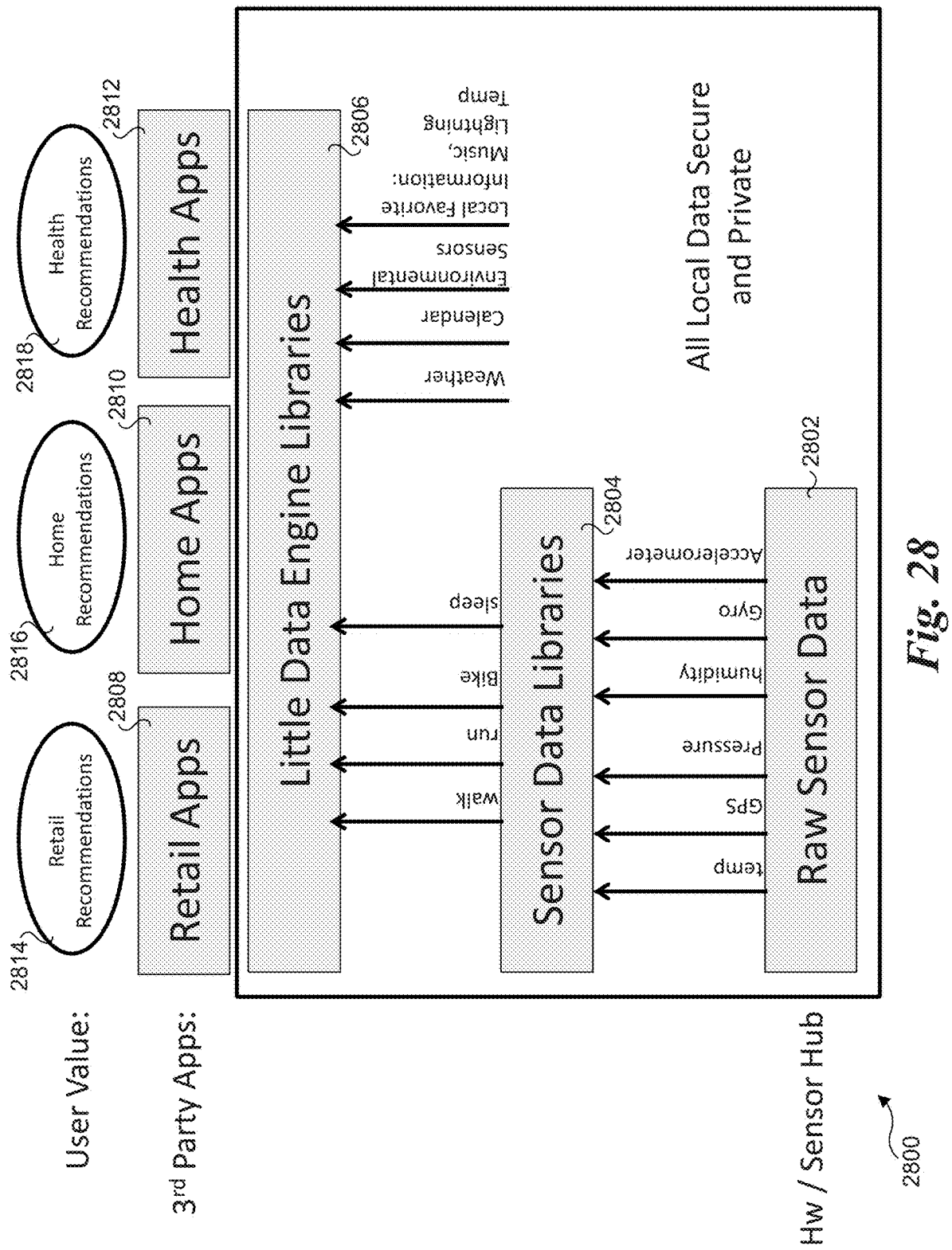
FIG. 28 is a block schematic diagram illustrating an architecture for the LDE's analytic stack relating to processing sensor data.

FIG. 28 shows an architecture 2800 for the LDE's analytic stack relating to processing sensor data. Architecture 2800 includes raw sensor data 2802, sensor data libraries 2804, LDE libraries 2806. The LDE libraries facilitate integration with third party applications including retails apps 2808, home apps 2810, and health apps 2812, each of which are shown respectively providing retail recommendations 2814, home recommendations 2816, and heath recommendations 2818.

Generally, the LDE architecture data collection from the sensors may be performed on an ongoing real-time basis and/or periodically (e.g., via polling or the like). In one embodiment, this depends upon the proximity of the LDE to the sensors. For example, a user can fetch the data from automobile sensors while in car, and from home sensors while at home. A given sensor will generally include minimum local storage for raw data or semi-processed data, depending on sensor type. In one embodiment, each sensor is preregistered with the LDE using a security authentication and authorization protocol and sensitive data is transferred to the LDE in an encrypted form.

In one embodiment, the LDE includes 1TB or more of storage in the device itself. Generally, there is no need to store the raw sensor data one the LDE; rather, just the processed data is to be stored. For example, real-time determination of calories burned throughout the day from a calorie sensor device are not stored, instead the LDE may save calories burned per day or per hour. The LDE may also act as a cache in an overall data storage architecture, including cloud-based storage. For example, data collected from sensors by the LDE is encrypted and sent to the user's preferred public cloud, and the encryption key can be stored in a security cloud, via a user's secure keychain, or other well-known techniques.

In one embodiment, the LDE includes a hardware analytic SoC engine and a well-defined API on which an app ecosystem can be built on. As shown in FIG. 27, data processing can be split into two parts, local and remote (in cloud) depending on user configuration, Internet connection, and query type. Public data processing can be done in the cloud or locally. Private data processing is always done locally. Local processing includes data integration from various sensors and performing analytics on integrated data. For example, while looking for a place to have lunch, nearby restaurants can be fetched from the public cloud while a user's dietary preference and driving speed can be fetched locally from private data and recommendations can be generating identifying which restaurants are suitable (for meeting the dietary preferences) and how much time it will take to reach them. As a mobile device, the LDE has the advantage of being able to talk to multiple domains and is able to synthesis information much better than other existing solutions.

Similar to the data processing, data recommendation can be taken from a public cloud or from the LDE or it can be a mix of both. Based on the query type, the LDE will push the processing to the cloud or locally for analysis, and take the recommendation from cloud and integrate it with local recommendation data and send it to the user.

Figure 29:
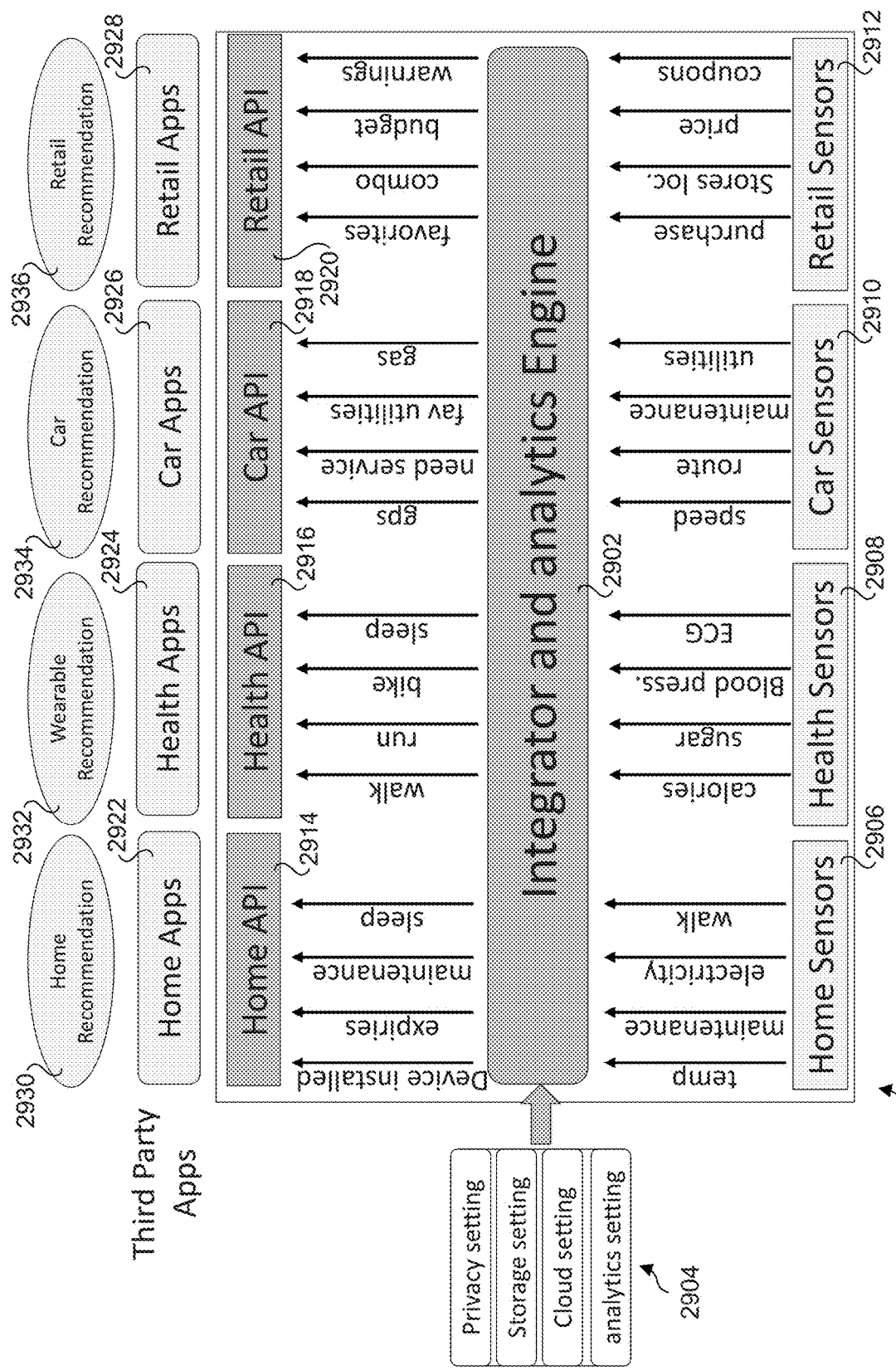
FIG. 29 is a block schematic diagram illustrating a software API for the LDE, according to one embodiment.

FIG. 29 shows a software API 2900 for the LDE, according to one embodiment. At its core, software API 2900 includes and integrator and analytics engine 2902 that receives input settings 2904, such as privacy settings, storage settings, cloud settings, and analytics settings. Integrator and analytics engine 2902 receives input from home sensors 2906, health sensors 2908, car sensors 2910 and retail sensors 2912, noting other the integrator and analytics engine may receive inputs from other types of sensors (not shown). Integrator and analytics engine 2902 provides inputs to a home API 2914, a health API 2916, a Car API 2918, and a retail API 2920. Each of these APIs provides a programming interface to a related third-party application class, which in turn provides associated recommendations. For example, the third party applications include home apps 2922, health apps 2924, car apps 2926, and retail apps 2928, each of which makes a respective recommendation depicted as home recommendation 2930, wearable recommendation 2932, car recommendation 2934, and retail recommendation 2936.

Figure 30:
FIG. 30 is a table illustrating a personal analytics usage model 2200, according to one embodiment.

FIG. 30 illustrates a personal analytics usage model 3000, according to one embodiment. Person analytics usage model 3000 is laid out as a table including a Retail column 3002, a Home column 3004, and a Health column 3006, a Sense row 3008, an Integrate row 3010, and a Recommend row 3012. The process flow traverses downward from receiving sensor data (i.e., as depicted in Sense row 3008), integrating the data (Integrate row 3010), and generating a recommendation (Recommend row 3012). By way of example, the analytics usage model for a user's health may include sensing one or more of the user's pulse, skin temperature, exercise activity (e.g., walking, biking, etc.), sleep, and dietary information. The information is integrated with inputs from Retail column 3002 and Home column 3004 and processed to produce a calendar, dining options, home environment data, and weather data. Recommendations are then provided, including recommended exercises, eating improvements, and regular activities.

Figure 31:
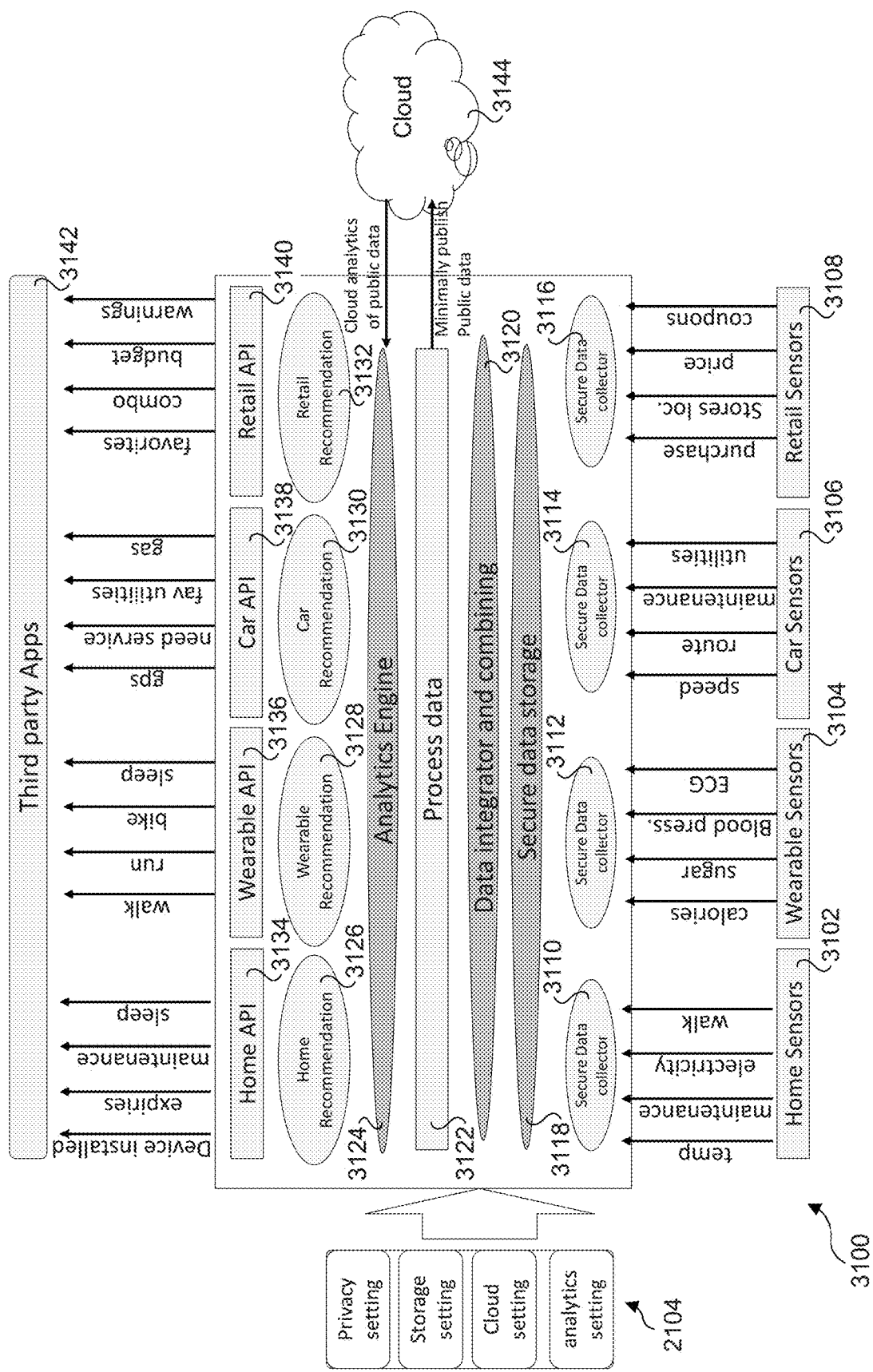
FIG. 31 is a block schematic diagram illustrating an implementation architecture that illustrates further integration of components discussed herein.

FIG. 31 shows an implementation architecture 3100 that illustrates further integration of components discussed above. Implementation architecture 3100 includes home sensors 3102, wearable sensors 3104, car sensors 3106, retail sensors 3108, secure data collectors 3110, 3112, 3114, and 3116, secure data storage 3118, data integrator and combining 3120, process data 3122, an analytics engine 3124, a home recommendation 3126, a wearable recommendation 3128, a car recommendation 3130, a retail recommendation 3132, a home API 3134, a wearable API 3136, a car API 3138, a retail API 3140, third party applications 3142, and a cloud 3144.

Process data 3122 represents data that is generated through processing various sensor inputs and other input data. As discussed above with reference to FIG. 27, a user can selectively publish whatever portion of process data 3122 to cloud 3144 the user desires. This enables cloud-based analytics of the data, which is received by analytics engine 3124. Recommendations including one or more of home recommendation 3126, wearable recommendation 3128, car recommendation 3130, and retail recommendation 3132 are generated by analytics engine 3124, either entirely locally or combined with cloud-based recommendations.

Computing Card with USB Type-C Connector

Figure 32:
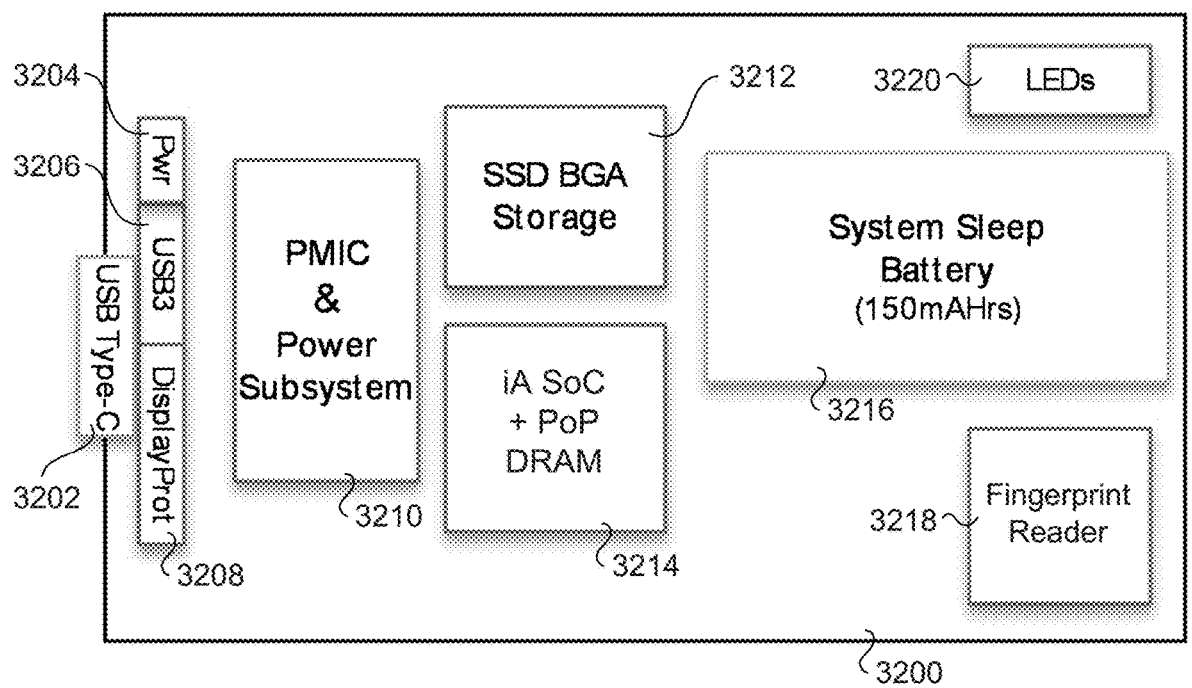
FIG. 32 is a schematic block diagram of one embodiment of a computing card employing a USB Type-C connector.

FIG. 32 shows one embodiment of a computing card 3200 that employs a USB Type-C connector 3202 as a single unified interface. Computing card 3200 further includes an internal power interface 3204, a USB 3 interface 3206, and a DisplayPort interface 3208, a Power Management IC (PMIC) and power subsystem 3210, a solid-state drive ball grid array (SSD BGA) storage device 3212, an Intel® architecture (IA) SoC 3214 with dynamic random access memory (DRAM) coupled to the SoC using packet-on-package (PoP) packaging, a system sleep battery 3216, a fingerprint reader 3218, and LEDs 3220.

In addition to the components shown in FIG. 32, a computing card employing a USB Type-C connector may include other circuitry, such as illustrated in other computing card embodiments herein including computing card 300 of FIG. 3. However, rather than employing a dock connector with multiple connectors, a single USB Type-C connector is used.

Figure 33:
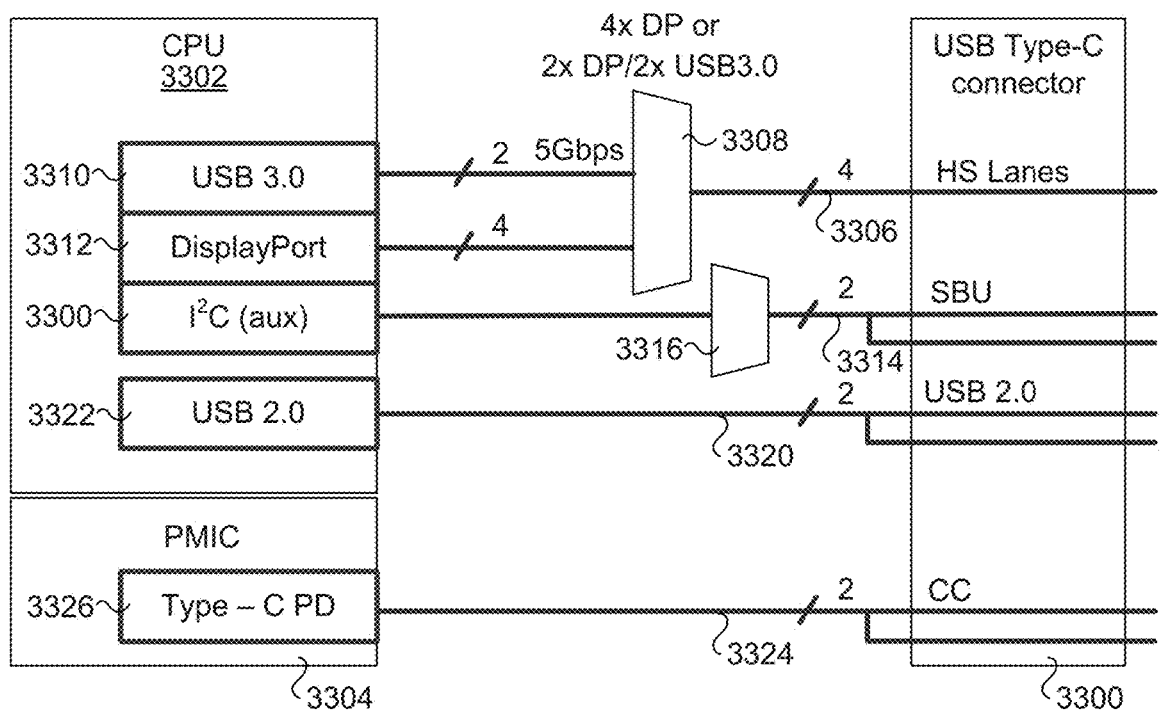
FIG. 33 is a schematic diagram illustration interface circuitry between a USB Type-C connector and a CPU and a PMIC, according to one embodiment.

FIG. 33 shows one embodiment of interface circuitry between a USB Type-C connector 3300, a CPU 3302, and a PMIC 3304. The four high-speed USB Type-C lanes 3306 are multiplexed via a multiplexer 3308, with two lines on the left-side of multiplexer 3308 coupled to a USB 3.0 interface 3310, while four lines are coupled to a DisplayPort interface 3312. The two Sideband Use (SBU) signals 3314 are coupled to a multiplexer 3316 which is used to selectively enable an I2C auxiliary interface 3318 to communicate with devices coupled to USB connector 3300. The two USB 2.0 signals 3320 are coupled to a USB 2.0 interface 3322. Meanwhile, the two control channel (CC) signals 3324 are coupled to a Type-C PD interface 3326 on PMIC 3304.

Figure 34A:
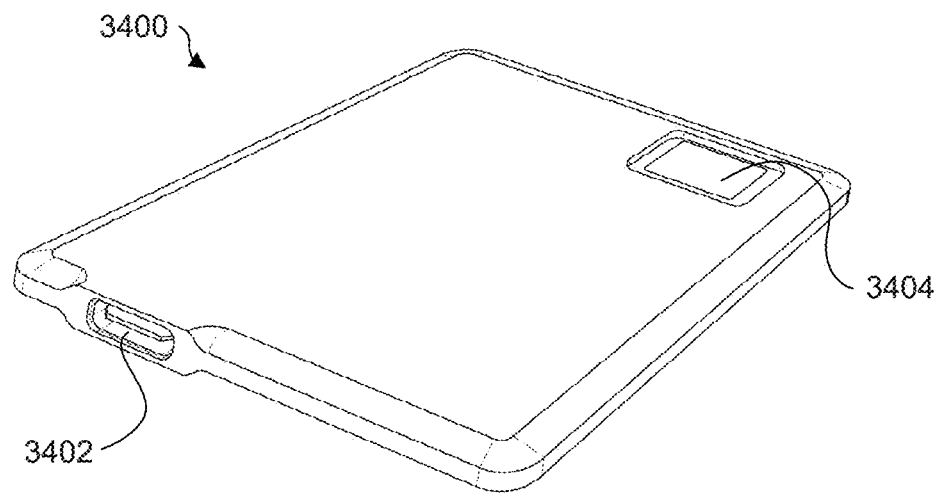
FIGS. 34a and 34b are perspective views of a computing card that includes a USB Type-C connector and a fingerprint reader, according to one embodiment.
Figure 34B:
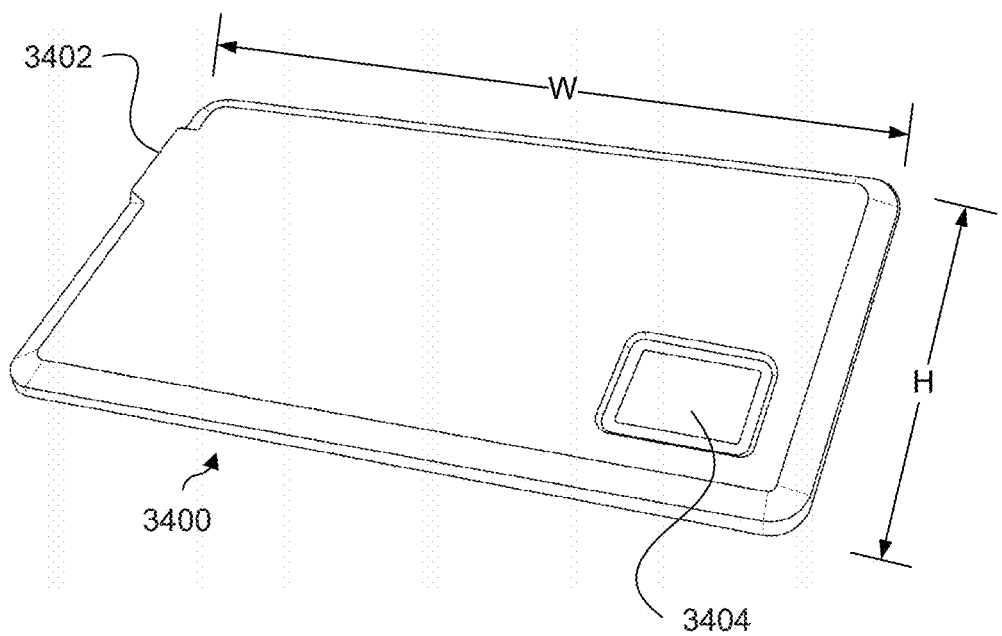

FIGS. 34*a* and 34*b* show perspective views of a computing card 3400 that includes a USB Type-C connector 3402 and a fingerprint reader 3404. Computing card 3400 further includes a circuit board including the circuitry and components of computing card 3200. In one embodiment the height (H) and width (W) of the computing card is approximately the same dimensions as a standard credit card, while the thickness is approximately four credit cards.

Figure 35B:
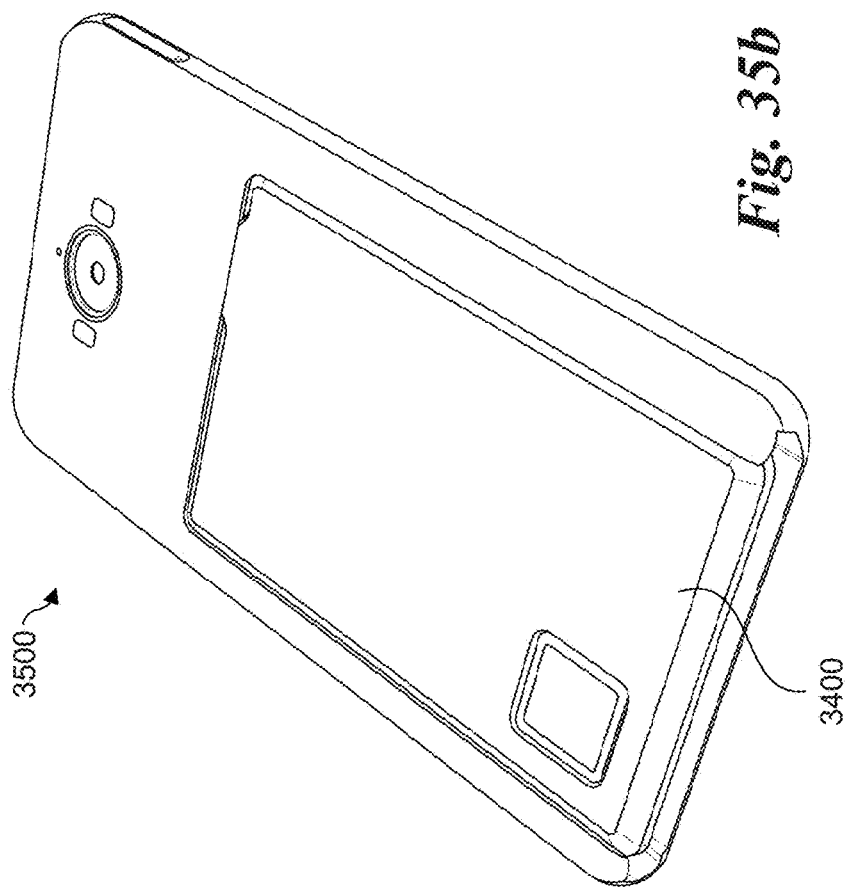
FIGS. 35a and 35b respectively show front-side and back-side isometric views of a mobile phone mated with the computing card of FIGS. 34a and 34b, according to one embodiment.
Figure 35A:
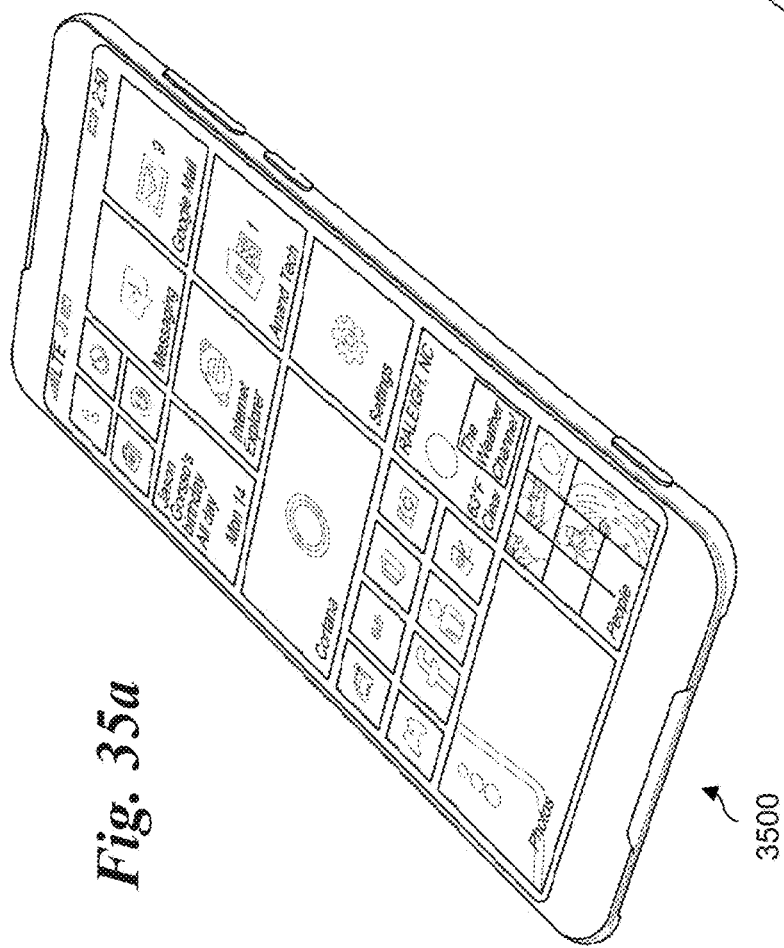

FIGS. 35*a* and 35*b* respectively show isometric views of one embodiment of a mobile phone 3500 mated to a computing card 3400. In one embodiment, computing card 3200 is inserted into a slot in the back of mobile phone 3500, as depicted in FIG. 35*b*. Optionally, computing card 3400 may be contained within a housing of a mobile phone, such as disposed beneath a back cover plate of the mobile phone (not shown).

The embodiments disclosed herein provide significant advantages over existing approaches requiring multiple devices to support access to user's favorite Android applications, while also supporting access to native Window application as opposed to cloud-based server-side applications. The fundamental limitation of Android not supporting virtualized environments is overcome by running Windows on physical hardware that not only supports full desktop versions of Windows. This means substantially any Windows application supported by the desktop OS is available via the integrated Android/Windows solutions provided herein.

Further aspects of the subject matter described herein are set out in the following numbered clauses:

1. An apparatus, comprising:
 a first processor board, including,
 a first processor;
 a graphics processor unit (GPU), either built into the first processor or operatively coupled to the first processor;
 first memory, operably coupled to the first processor;
 display output circuitry, either built into one of the first processor GPU or operatively coupled to at least one of the first processor and GPU;
 a touchscreen display, communicatively coupled to the display output circuitry; and
 non-volatile storage in which first instructions are stored comprising an Android operating system and a plurality of Android applications;

a second processor board, communicatively coupled to the first processor board, including;
a second processor;
second memory, operatively coupled to the second processor; and
non-volatile storage in which second instructions are stored comprising a Windows operating system and a plurality of Windows applications,
wherein, upon operation the apparatus enables a user to selectively run the plurality of Android applications and the plurality of Windows applications, and wherein the plurality of Windows application are executed on the second processor board.

2. The apparatus of clause 1, wherein one of the Android applications comprises an Android remote desktop client application, wherein the Windows operating system includes a remote desktop server, and wherein the remote desktop server and Android remote desktop client enable a user to remotely run Windows applications on the second processor board via user inputs to the touchscreen display.

3. The apparatus of clause 1 or 2, wherein the first processor board includes an Android graphics rendering subsystem including the GPU, wherein the second instructions include software for implementing a native graphics command thrower, the second processor board is configured to throw native graphics commands to the first processor board, and the first instructions include a native graphics command catcher that is configured to catch the native graphics commands from the first processor board and submit them to the Android graphics rendering subsystem.

4. The apparatus of clause 3, wherein the first instructions include a remote desktop client and the second instructions include a remote desktop server, and wherein the remote desktop client is configured to capture user inputs made via the touchscreen display and forward corresponding user input commands and/or events to the remote desktop server.

5. The apparatus of any of the preceding clauses, wherein the second processor board comprises a computing card that is configured to throw native Windows graphics commands including DirectX commands to a catcher running on the first processor board, and the catcher is configured to receive the DirectX commands and convert them to corresponding OpenGL commands.

6. The apparatus of any of the preceding clauses, wherein the second processor board comprises a computing card that is configured to convert native Windows graphics commands including DirectX commands into native Android graphics commands including OpenGL commands and throw the OpenGL commands to an Android graphics catcher running on the first processor board, and the Android graphics catcher is configured to submit the OpenGL commands to an Android graphics subsystem implemented on the first processor board.

7. The apparatus of any of the preceding clauses, wherein the first processor board is coupled to the second processor board via a Universal Serial Bus (USB) connection, and wherein data is exchanged between the first processor board and the second processor board via an Internet Protocol (IP) implemented over the USB connection to form an IP/USB link.

8. The apparatus of any of the preceding clauses, wherein the apparatus comprises an Android device including a housing in which both the first and second processor boards are installed.

9. The apparatus of any of the preceding clauses, wherein the apparatus comprises an Android device containing the first processor board that is coupled to a backpack containing the second processor board.

10. The apparatus of clause 9, wherein the first processor board is housed inside of the backpack.

11. The apparatus of clause 9, wherein the first processor board is encapsulated within a housing and is part of a computing card that includes a connector that is configured to mate with a mating connector on the backpack to enable the computing card to be installed in the backpack.

12. The apparatus of any of the preceding clauses, wherein the second processor supports execution of x86 instructions.

13. The apparatus of any of the preceding clauses, wherein the second processor includes a plurality of little cores and at least one big core, and the second processor is configured to operate in a reduced power mode under which execution of instructions is performed by at least one of the plurality of little cores, and wherein the second processor is further configured to operate in a high performance mode under which execution of instructions is performed by at least one big core.

14. The apparatus of any of the preceding clauses, wherein the second processor includes a plurality of low-power cores.

15. The apparatus of any of the preceding clauses, wherein the second processor board has width and height dimension that are approximately the size of a credit card or smaller, and the Windows operating system is a full-version of a Windows operating system configured to be implemented on a desktop or laptop computer.

16. The apparatus of any of the preceding clauses, wherein the first instructions include an Android graphics thrower that is configured to throw OpenGL commands to a remote display device, and wherein when a user is running a Windows application a display of the Windows application is enabled to be displayed on the remote display device.

17. An apparatus, comprising,
a backpack, configured to couple to an Android device including a first Universal Serial Bus (USB) connector, the backpack housing including a second USB connector that is configured to mate with the first USB connector on the Android device when the Android device is coupled to the backpack;
a processor board, communicatively coupled to the second USB connector in the backpack housing, including,
a processor;
memory, operatively coupled to the processor; and
non-volatile storage in which instructions are stored comprising a Windows operating system and a plurality of Windows applications,
wherein, upon operation when the Android device is coupled to the backpack, a user of the Android device is enabled to selectively run a plurality of Android applications on the Android device and remotely run the plurality of Windows applications via the Android device, and wherein the plurality of Windows application are executed on the processor board.

18. The apparatus of clause 17, wherein the Android device has a touchscreen display and includes an Android remote desktop client application, wherein the Windows operating system includes a remote desktop server, and wherein the remote desktop server and Android remote desktop client enable a user to remotely run Windows applications on the processor board via user inputs to the touchscreen display.

19. The apparatus of clause 17 or 18, wherein the Android device includes a native graphics catcher, wherein the instructions include software for implementing a native graphics command thrower, and wherein the processor board is configured to throw native graphics commands to the Android device.

20. The apparatus of clause 19, wherein the Android device includes a remote desktop client and the instructions include a remote desktop server, and wherein the remote desktop server is configured to receive user input commands and/or events generated by the remote desktop client and submit the user input commands and/or events to the Windows operating system.

21. The apparatus of any of clauses 17-20, wherein the processor board comprises a computing card that is configured to throw native Windows graphics commands including DirectX commands to a Windows graphics catcher running on the Android device.

22. The apparatus of any of clauses 17-21, wherein the processor board comprises a computing card that is configured to convert native Windows graphics commands including DirectX commands into native Android graphics commands including OpenGL commands and throw the OpenGL commands to an Android graphics catcher running on the Android device.

23. The apparatus of any of clauses 17-22, wherein data is exchanged between the processor board and Android device via an Internet Protocol (IP) implemented over a USB connection to form an IP/USB link.

24. The apparatus of any of clauses 17-23, wherein the processor board is housed inside of the backpack such that it is not externally exposed when the Android device is coupled to the backpack.

25. The apparatus of any of clauses 17-24, wherein the processor board is encapsulated within a housing and is part of a computing card that includes a connector that is configured to mate with a mating connector on the backpack to enable the computing card to be installed in the backpack.

26. The apparatus of any of clauses 17-25, wherein the processor supports execution of x86 instructions.

27. The apparatus of any of clauses 17-26, wherein the processor includes a plurality of little cores and at least one big core, and the processor is configured to operate in a reduced power mode under which execution of instructions is performed by at least one of the plurality of little cores, and wherein the processor is further configured to operate in a high performance mode under which execution of instructions is performed by at least one big core.

28. The apparatus of any of clauses 17-27, wherein the processor includes a plurality of low-power cores.

29. The apparatus of any of clauses 17-28, wherein the processor board has width and height dimension that are approximately the size of a credit card or smaller, and the Windows operating system is a full-version of a Windows operating system configured to be implemented on a desktop or laptop computer.

30. An apparatus, comprising,
a processor board, including,
a processor;
a Universal Serial Bus (USB) interface, operatively coupled to the processor;
memory, operatively coupled to the processor; and
non-volatile storage in which instructions are stored comprising a Windows operating system and a plurality of Windows applications,
wherein the USB interface of the processor board is configured to be communicatively coupled to a USB connector on an Android device, and wherein, upon operation when the USB connector of the Android device is communicatively coupled to the USB interface of the processor board, a user of the Android device is enabled to remotely run the plurality of Windows applications via the Android device, wherein the plurality of Windows application are executed on the processor board.

31. The apparatus of clause 30, wherein the Android device has a touchscreen display and includes an Android remote desktop client application, wherein the Windows operating system includes a remote desktop server, wherein, upon operation when the USB connector of the Android device is communicatively coupled to the USB interface of the processor board the remote desktop server and Android remote desktop client enable a user to remotely run Windows applications on the processor board via user inputs to the touchscreen display.

32. The apparatus of clause 30 or 31, wherein the Android device includes a native graphics catcher, wherein the instructions include software for implementing a native graphics command thrower, and wherein the processor board is configured to throw native graphics commands to the Android device.

33. The apparatus of clause 32, wherein the Android device includes a remote desktop client and the instructions include a remote desktop server, and wherein the remote desktop server is configured to receive user input commands and/or events generated by the remote desktop client and submit the user input commands and/or events to the Windows operating system.

34. The apparatus of any of clauses 30-33, wherein the processor board is configured to throw native Windows graphics commands including DirectX commands to the Android device.

35. The apparatus of any of clauses 30-34, wherein the Android device includes an Android graphics catcher, and wherein the processor board is configured to convert native Windows graphics commands including DirectX commands into native Android graphics commands including OpenGL commands and throw the OpenGL commands to the Android graphics catcher upon operation when the USB connector of the Android device is communicatively coupled to the USB interface of the processor board.

36. The apparatus of any of clauses 30-35, wherein data is exchanged between the processor board and Android device via an Internet Protocol (IP) implemented over a USB connection to form an IP/USB link.

37. The apparatus of any of clauses 30-36 wherein the apparatus comprises a computing card including a housing in which the processor board is disposed, wherein the processor board includes an edge connector and the housing is configured such that the edge connector is external to the housing, and the computing card has width and height dimension that are approximately the size of the width and height of a credit card or smaller 38. The apparatus of any of clauses 30-37, wherein the processor supports execution of x86 instructions.

39. The apparatus of any of clauses 30-38, wherein the processor includes a plurality of little cores and at least one big core, and the processor is configured to operate in a reduced power mode under which execution of instructions is performed by at least one of the plurality of little cores, and wherein the processor is further configured to operate in a high performance mode under which execution of instructions is performed by at least one big core.

40. The apparatus of any of clauses 30-39, wherein the processor includes a plurality of low-power cores.

41. The apparatus of any of clauses 30-40, wherein the processor board has width and height dimension that are approximately the size of the width and height of a credit card or smaller, and the Windows operating system is a full-version of a Windows operating system configured to be implemented on a desktop or laptop computer.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
   a housing;
   a first processor board, including,
     a first processor;
     a graphics processor unit (GPU), either built into the first processor or operatively coupled to the first processor;
     first memory, operably coupled to the first processor;
     display output circuitry, either built into one of the first processor and the GPU or operatively coupled to at least one of the first processor and the GPU;
     a touchscreen display, communicatively coupled to the display output circuitry; and
     non-volatile storage in which first instructions are stored comprising an Android operating system and a plurality of Android applications;
   a second processor board, communicatively coupled to the first processor board, including,
     a second processor;
     second memory, operatively coupled to the second processor; and
     non-volatile storage in which second instructions are stored comprising a Windows operating system and a plurality of Windows applications,
   wherein, upon operation the apparatus enables a user to selectively run the plurality of Android applications and the plurality of Windows applications, wherein the plurality of Android applications are executed on the first processor board and the plurality of Windows application are executed on the second processor board, and wherein the first processor board is installed within the housing and the second processor board is one of installed within the housing or installed in a backpack coupled to the housing.

2. The apparatus of claim 1, wherein one of the Android applications comprises an Android remote desktop client application, wherein the Windows operating system includes a remote desktop server, and wherein the remote desktop server and Android remote desktop client enable the user to remotely run Windows applications on the second processor board via user inputs to the touchscreen display.

3. The apparatus of claim 1, wherein the first processor board includes an Android graphics rendering subsystem including the GPU, wherein the second instructions include software for implementing a native graphics command thrower, the second processor board is configured to throw native graphics commands to the first processor board, and the first instructions include a native graphics command catcher that is configured to catch the native graphics commands from the second processor board and submit them to the Android graphics rendering subsystem.

4. The apparatus of claim 3, wherein the first instructions include a remote desktop client and the second instructions include a remote desktop server, and wherein the remote desktop client is configured to capture user inputs made via the touchscreen display and forward corresponding user input commands and/or events to the remote desktop server.

5. The apparatus of claim 1, wherein the second processor board comprises a computing card that is configured to throw native Windows graphics commands including DirectX commands to a catcher running on the first processor board, and the catcher is configured to receive the DirectX commands and convert them to corresponding OpenGL commands.

6. The apparatus of claim 1, wherein the second processor board comprises a computing card that is configured to convert native Windows graphics commands including DirectX commands into native Android graphics commands including OpenGL commands and throw the OpenGL commands to an Android graphics catcher running on the first processor board, and the Android graphics catcher is configured to submit the OpenGL commands to an Android graphics subsystem implemented on the first processor board.

7. The apparatus of claim 1, wherein the first processor board is coupled to the second processor board via a Universal Serial Bus (USB) connection, and wherein data is exchanged between the first processor board and the second processor board via an Internet Protocol (IP) implemented over the USB connection to form an IP/USB link.

8. The apparatus of claim 1, wherein the second processor board has width and height dimension that are approximately the size of a credit card or smaller, and the Windows operating system is a full-version of a Windows operating system configured to be implemented on a desktop or laptop computer.

9. The apparatus of claim 1, wherein the first instructions include an Android graphics thrower that is configured to throw OpenGL commands to a remote display device, and wherein when the user is running a Windows application a display of the Windows application is enabled to be displayed on the remote display device.

10. An apparatus, comprising,
    a backpack, configured to couple to an Android device including a first Universal Serial Bus (USB) connector, the backpack including a second USB connector that is configured to mate with the first USB connector on the Android device when the Android device is coupled to the backpack;
    a processor board, communicatively coupled to the second USB connector in the backpack, including,
    a processor;
    memory, operatively coupled to the processor; and
    non-volatile storage in which instructions are stored comprising a Windows operating system and a plurality of Windows applications,
    wherein, upon operation when the Android device is coupled to the backpack, a user of the Android device is enabled to selectively run a plurality of Android applications on the Android device and remotely run the plurality of Windows applications via the Android device, and wherein the plurality of Windows application are executed on the processor board.

11. The apparatus of claim 10, wherein the Android device has a touchscreen display and includes an Android remote desktop client application, wherein the Windows operating system includes a remote desktop server, and wherein the remote desktop server and Android remote desktop client enable the user to remotely run Windows applications on the processor board via user inputs to the touchscreen display.

12. The apparatus of claim 10, wherein the Android device includes a native graphics catcher, wherein the instructions include software for implementing a native graphics command thrower, and wherein the processor board is configured to throw native graphics commands to the Android device.

13. The apparatus of claim 12, wherein the Android device includes a remote desktop client and the instructions include a remote desktop server, and wherein the remote desktop server is configured to receive user input commands and/or events generated by the remote desktop client and submit the user input commands and/or events to the Windows operating system.

14. The apparatus of claim 10, wherein the processor board comprises a computing card that is configured to throw native Windows graphics commands including DirectX commands to a Windows graphics catcher running on the Android device.

15. The apparatus of claim 10, wherein the processor board comprises a computing card that is configured to convert native Windows graphics commands including DirectX commands into native Android graphics commands including OpenGL commands and throw the OpenGL commands to an Android graphics catcher running on the Android device.

16. The apparatus of claim 10, wherein data is exchanged between the processor board and Android device via an Internet Protocol (IP) implemented over a USB connection to form an IP/USB link.

17. The apparatus of claim 10, wherein the processor supports execution of x86 instructions.

18. The apparatus of claim 10, wherein the processor board has width and height dimension that are approximately the size of a credit card or smaller, and the Windows operating system is a full-version of a Windows operating system configured to be implemented on a desktop or laptop computer.

19. An apparatus, comprising,
a processor board, including,,
a processor;
a Universal Serial Bus (USB) interface, operatively coupled to the processor;
memory, operatively coupled to the processor; and
non-volatile storage in which instructions are stored comprising a Windows operating system and a plurality of Windows applications,
wherein the USB interface of the processor board is configured to be communicatively coupled to a USB connector on an Android device, and
wherein, upon operation when the USB connector of the Android device is communicatively coupled to the USB interface of the processor board, a user of the Android device is enabled to remotely run the plurality of Windows applications via the Android device, wherein the plurality of Windows application are executed on the processor board.

20. The apparatus of claim 19, wherein the Android device has a touchscreen display and includes an Android remote desktop client application, wherein the Windows operating system includes a remote desktop server, wherein, upon operation when the USB connector of the Android device is communicatively coupled to the USB interface of the processor board the remote desktop server and Android remote desktop client enable the user to remotely run Windows applications on the processor board via user inputs to the touchscreen display.

21. The apparatus of claim 19, wherein the Android device includes a native graphics catcher, wherein the instructions include software for implementing a native graphics command thrower, and wherein the processor board is configured to throw native graphics commands to the Android device.

22. The apparatus of claim 21, wherein the Android device includes a remote desktop client and the instructions include a remote desktop server, and wherein the remote desktop server is configured to receive user input commands and/or events generated by the remote desktop client and submit the user input commands and/or events to the Windows operating system.

23. The apparatus of claim 22, wherein the Android device includes an Android graphics catcher, and wherein the processor board is configured to convert native Windows graphics commands including DirectX commands into native Android graphics commands including OpenGL commands and throw the OpenGL commands to the Android graphics catcher upon operation when the USB connector of the Android device is communicatively coupled to the USB interface of the processor board.

24. The apparatus of claim 1, wherein the apparatus is configured to provide access to both Android applications and Windows application via a unified user interface displayed on the touchscreen display.

25. The apparatus of claim 1, wherein the apparatus comprises a mobile device comprising a mobile phone or tablet.

* * * * *